United States Patent [19]

Uemoto et al.

[11] Patent Number: 5,497,320
[45] Date of Patent: Mar. 5, 1996

[54] TWO-LEVEL DOCUMENT PROCESSING METHOD

[75] Inventors: Kenji Uemoto; Tokuji Ohta; Shigeharu Kawai, all of Kawasaki, Japan

[73] Assignee: Fuji Electric Co., Ltd., Kawasaki, Japan

[21] Appl. No.: 229,272

[22] Filed: Apr. 18, 1994

[30] Foreign Application Priority Data

Apr. 19, 1993 [JP] Japan .................................. 5-115343

[51] Int. Cl.⁶ .............................. G06F 3/14; G06F 17/24
[52] U.S. Cl. .................................. 364/419.17; 364/419.1; 395/145; 395/146
[58] Field of Search .......................... 364/419.1, 419.17, 364/419.19, 468; 395/144, 145, 146, 147, 148, 600

[56] References Cited

U.S. PATENT DOCUMENTS 4,051,459   9/1977   Steranko et al. .

FOREIGN PATENT DOCUMENTS 1458510   12/1976   United Kingdom .

OTHER PUBLICATIONS

Veikko Seppänen, "Acquisition, organisation and reuse of software design knowledge", *Software Engineering Journal*, Jul. 1992, pp. 238–246.

Primary Examiner—Robert A. Weinhardt
Assistant Examiner—Stephen R. Tkacs
Attorney, Agent, or Firm—Spencer & Frank

[57] ABSTRACT

A two level document processing method which prepares a downstream document on the basis of an upstream document associated with software. The upstream document is one used by users of a software product or the like, and the downstream document is one used by designers of the software product or the like. The downstream document is prepared by comparing the upstream document with an upstream deletion document including information which is particular to the upstream document and is unnecessary for the downstream document (steps SA1–SA4), by continuing to search a deletion candidate to be eliminated from the upstream document until the last one, and by performing deletion/non-deletion of the deletion candidate from the upstream document in accordance with the results of the search (steps SA7–SA 16). This makes it possible to improve efficiency of preparing a document, to refine the document, and to exploit potential information.

38 Claims, 30 Drawing Sheets

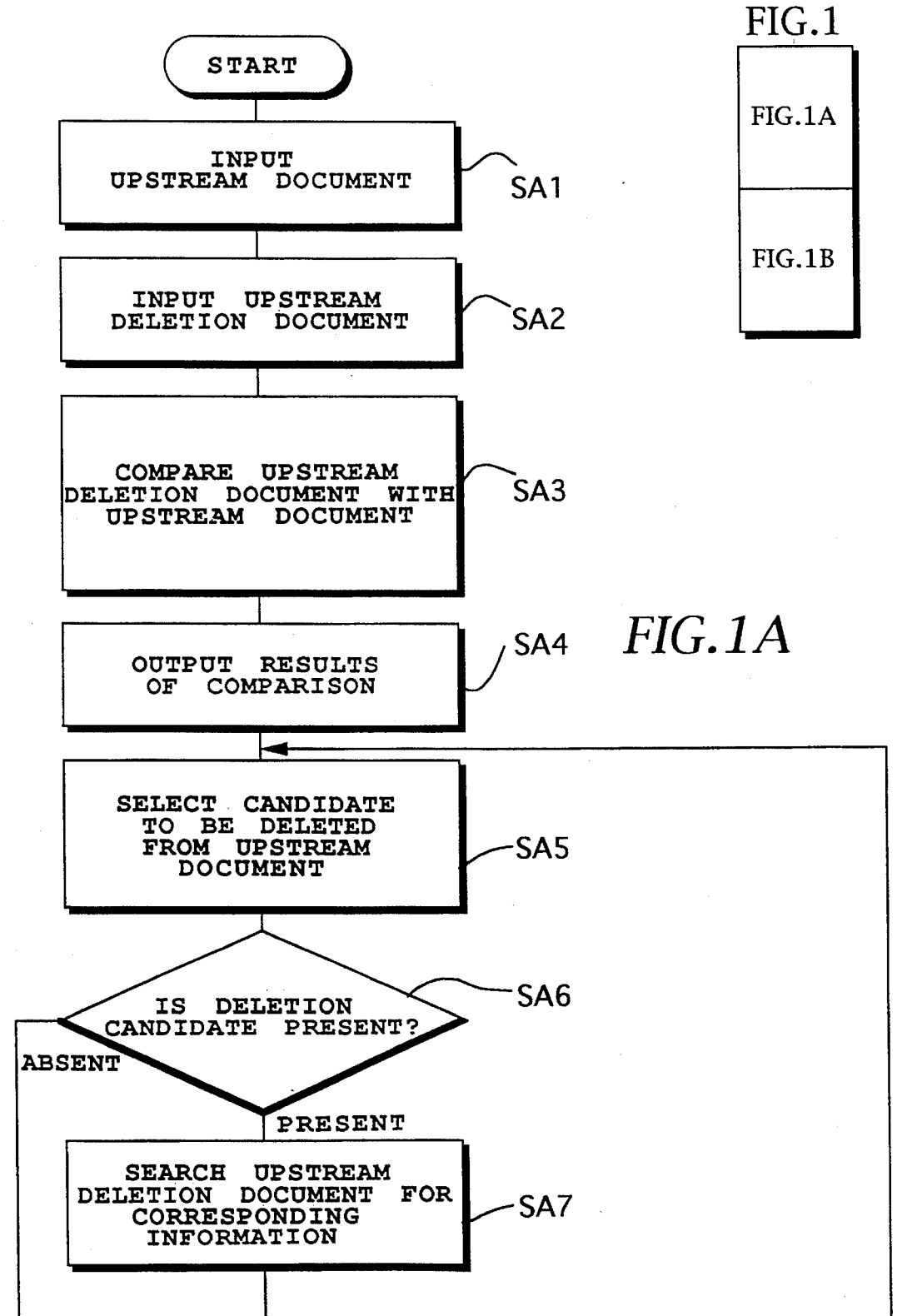

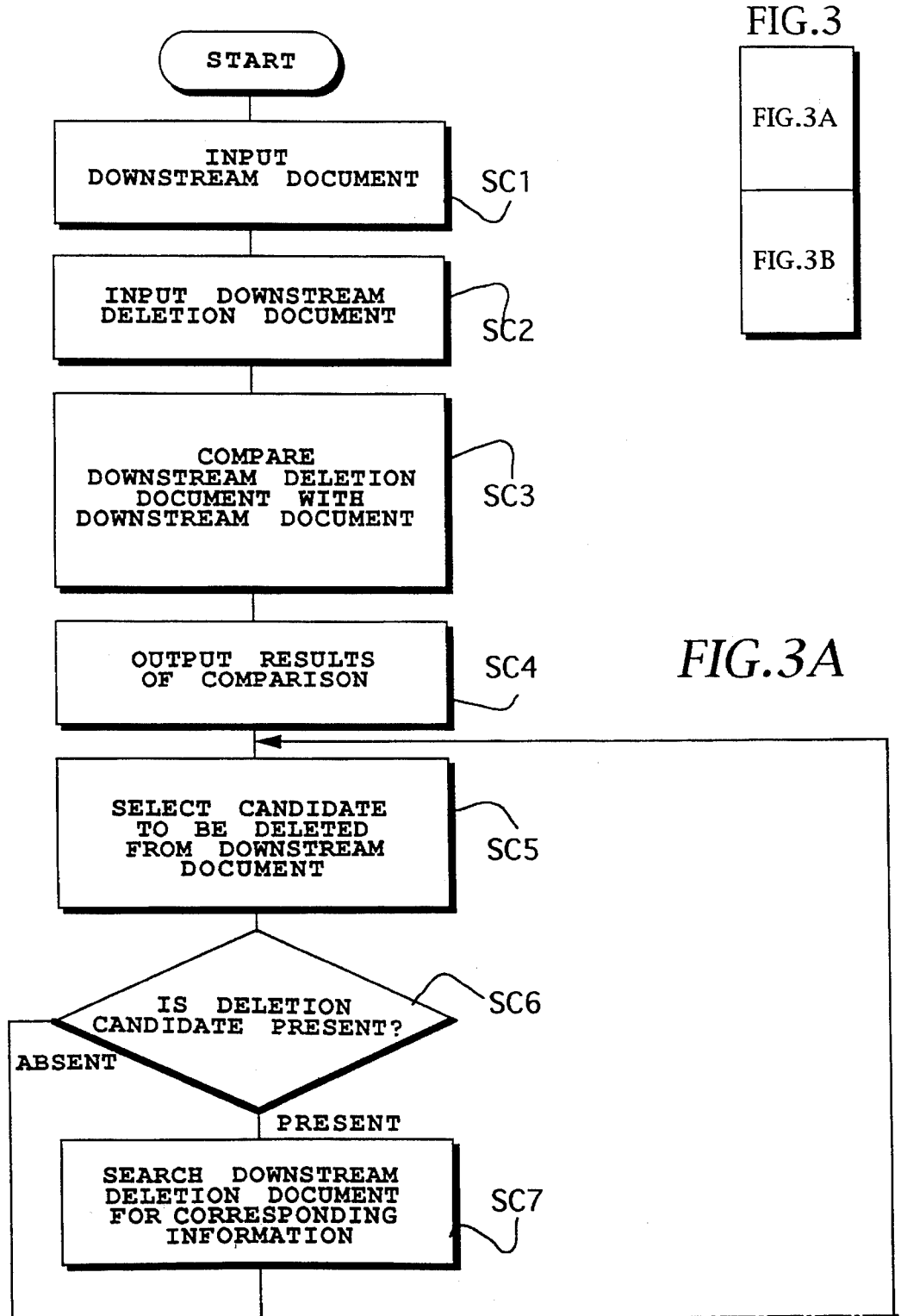

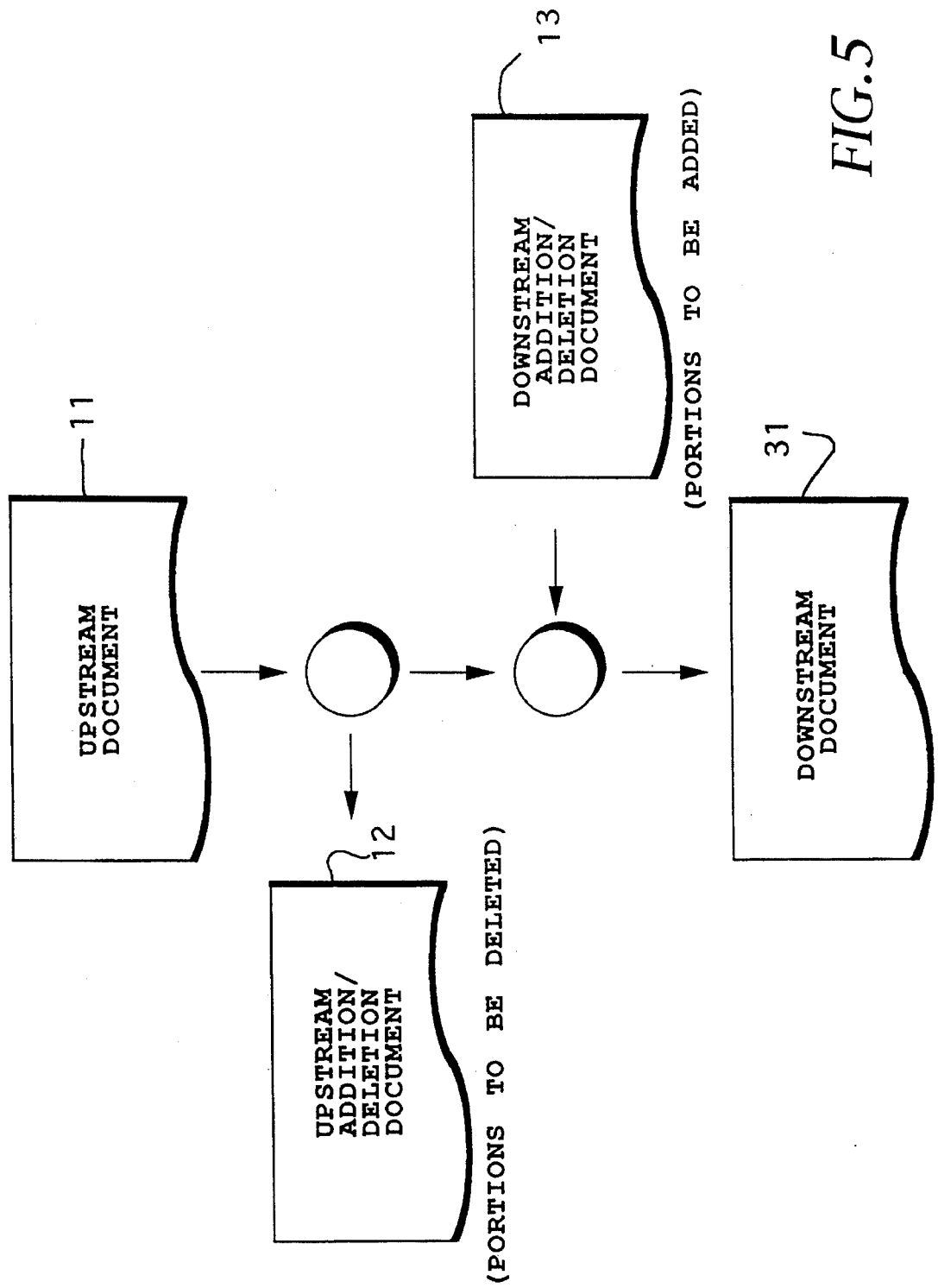

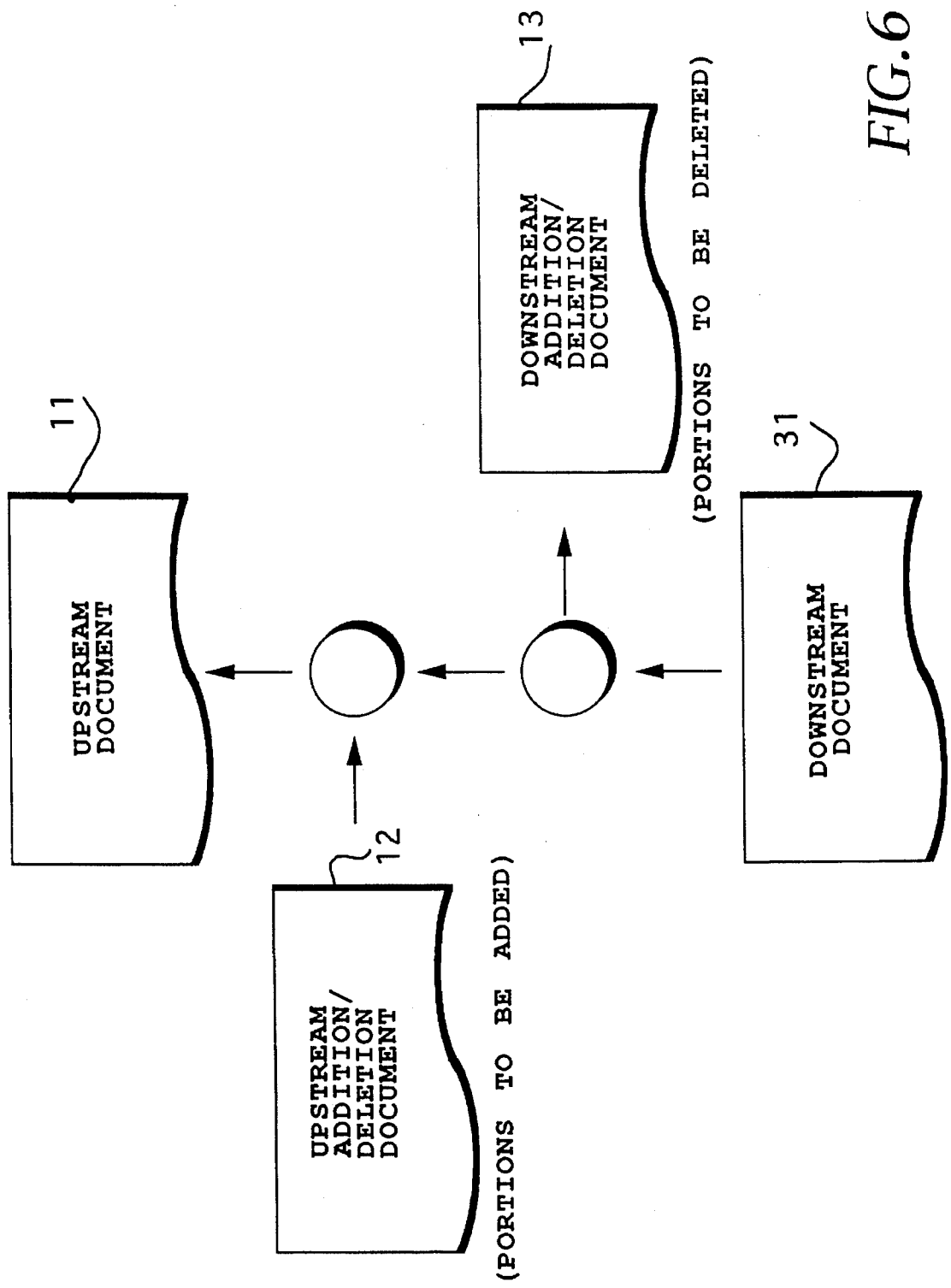

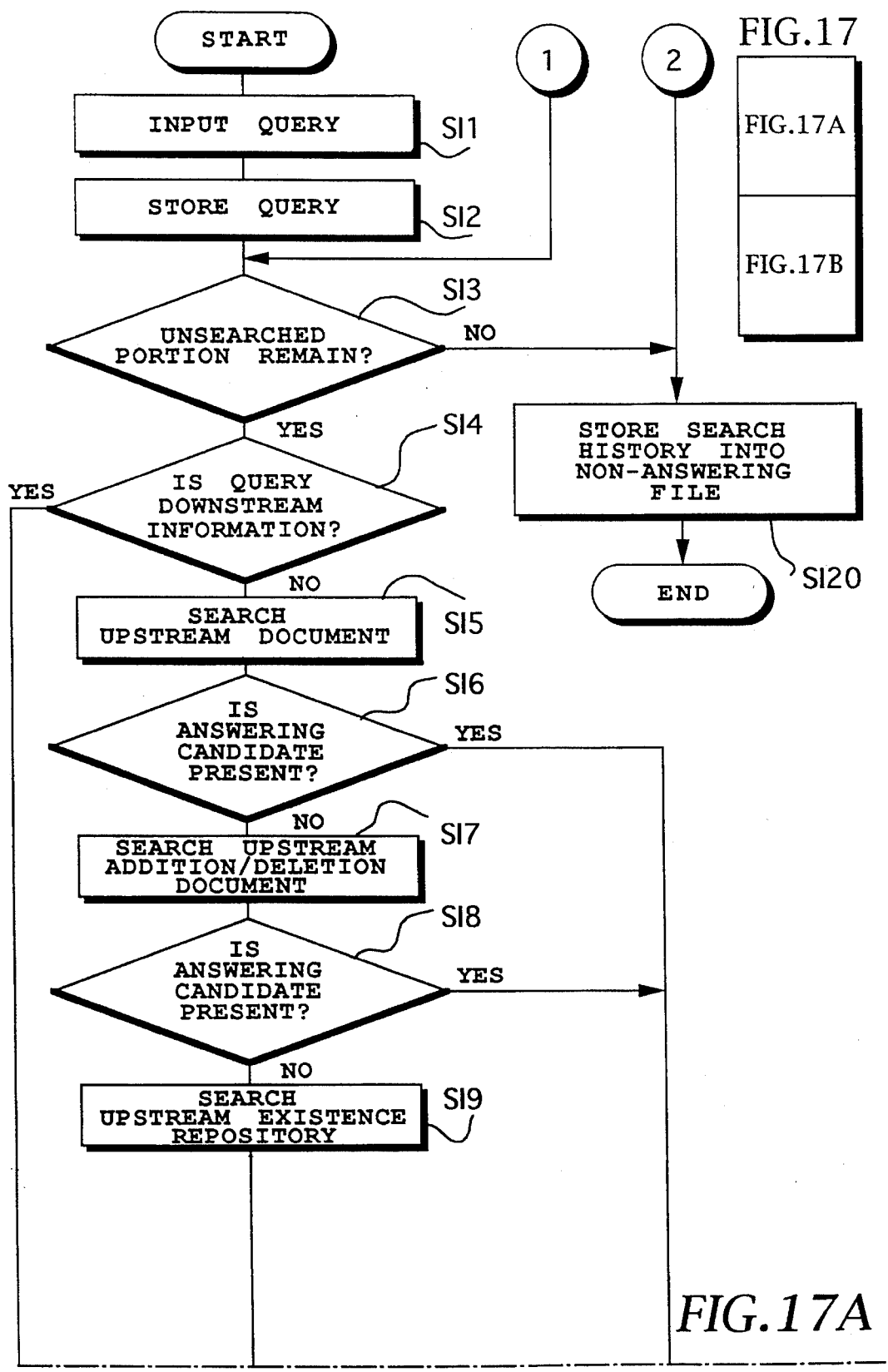

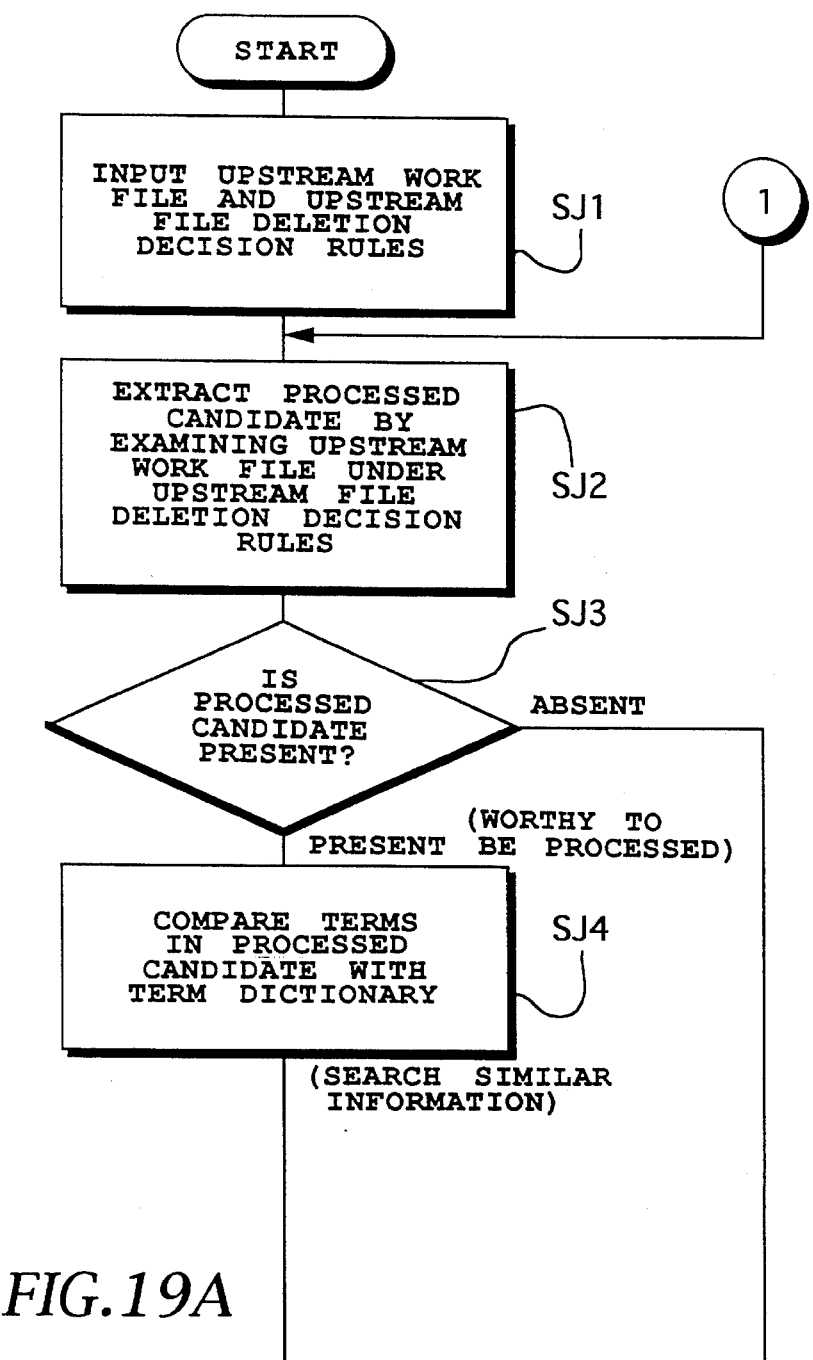
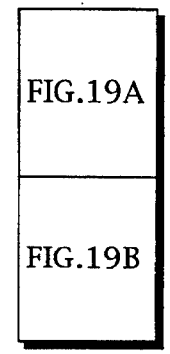
FIG.19A

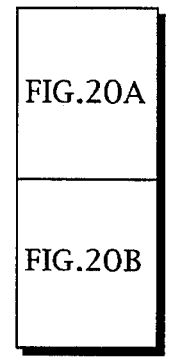
FIG.20
FIG.20A
FIG.20B
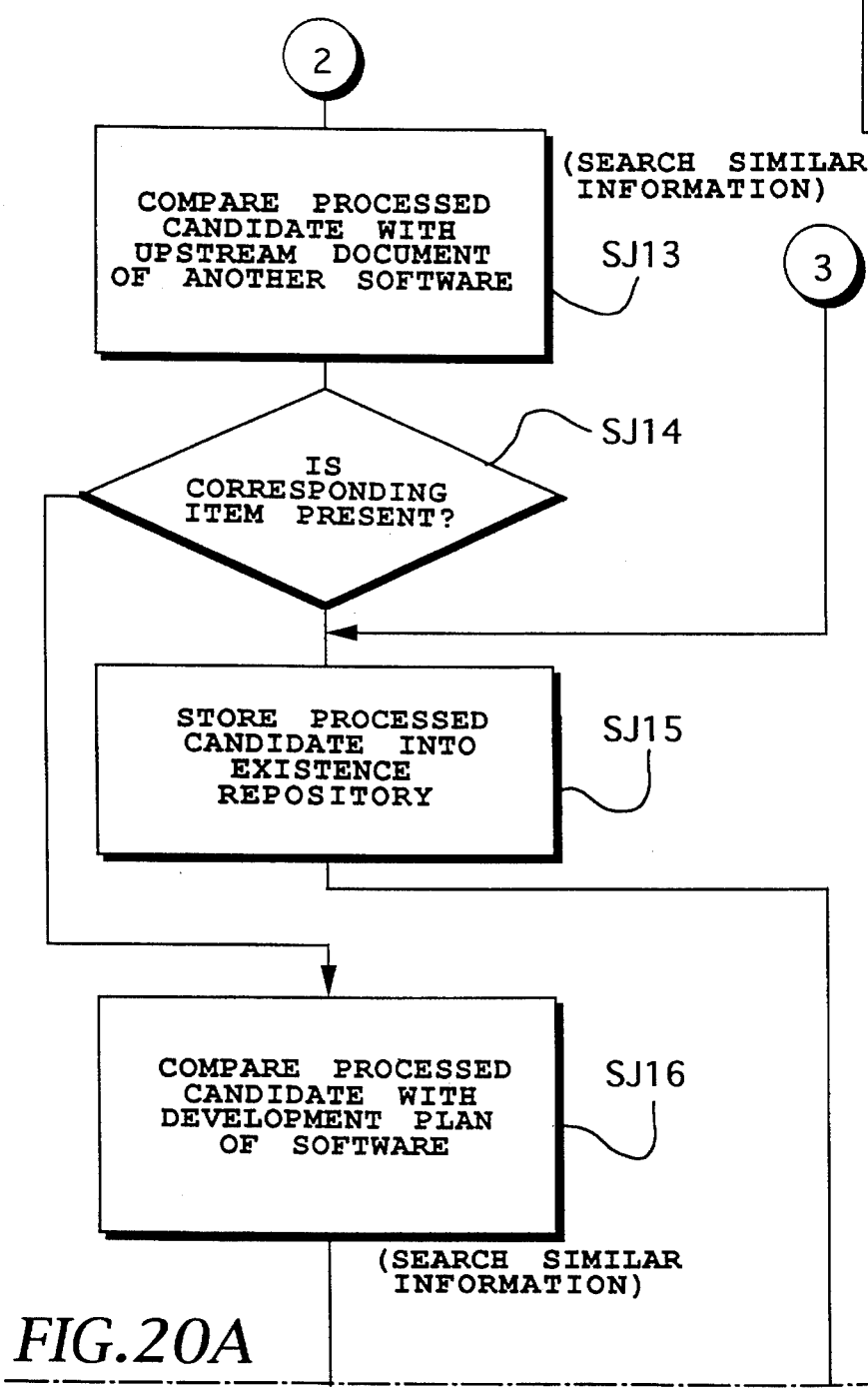
FIG.20A

TWO-LEVEL DOCUMENT PROCESSING METHOD

BACKGROUND OF THE INVENTION

Field of the Invention

The present invention relates to a two-level document processing method, and particularly to a method for converting an upstream document into a downstream document, or vice versa, for bringing out an addition/deletion document including information to be added or deleted during the conversion, for refining the addition/deletion document, and for storing reusable information as technical resources. Here, the upstream document and the downstream document constitute a two-level structure, where both document are associated, for example, with software as a product, and the upstream document is a document prepared for and placed near a user, and the downstream document is a document prepared for and placed near a maker.

Description of Related Art

In a series of processes of preparing software and selling it to customers, two types of documents are generally made: A document which is placed near users of the software, and used in an inquiry or estimation, such as specifications or system manuals; and a document which is placed near makers of the software, and used by the makers or other system engineers, such as system survey manuals, or technical specifications.

Assuming that the user side is upstream because the need for the software specification arises therefrom, and the maker side is downstream, the former document may be referred to as an "upstream document" and the latter document as a "downstream document".

Generally speaking, the volume of an upstream document is smaller than that of the downstream document. Since the upstream document is mainly used in activities for receiving orders or business, it does not usually include detailed technical information that would be required by system engineers and described in the downstream document.

On the other hand, information required by users, such as utilization results of the software, comparison of performance with other products, or the like, will be described in the upstream document, but often omitted from the downstream document.

Preparing a new upstream document or downstream document by reusing an existing downstream document or upstream document associated with a particular software product, can be readily carried out if information to be added to or deleted from the original document is clearly designated. Here, prparing means converting an upstream document to a dowstream document by adding and/or deleting information, or vice versa.

These addition and/or deletion items (a document including addition/deletion items will be referred to as addition/deletion document below), however, cannot be readily exploited because they are hidden in personal knowledge or experience, or stored in files of a company. This will cause a great difficulty in improving efficiency of preparing a document.

This presents technical problems in that the addition/deletion document, which exists between the two-level upstream and downstream documents, should be made explicit as technical resources, and that the efficiency of preparing documents should be increased by reusing the addition/deletion document, upstream document and downstream document.

The conversions between the upstream document and the downstream document as described above are common to system engineering work.

More specifically, the system engineering work begins from preparing a demand specification as an upstream document by researching and implementing the need of customers at the upstream side, and ends with actual system design, in which the contents of the demand specification are reflected onto a design specification as a downstream document. Thus, preparing a downstream document from an upstream document, for example, is similar to a series of processes of the system engineering work, in which the system design is carried out in accordance with the need of customers.

Accordingly, once the technical problem of improving the document preparation efficiency has been solved, the method would be applied to the system engineering work. Thus, such solution has been strongly desired.

SUMMARY OF THE INVENTION

It is therefore an object of the present invention to provide a two-level document processing method which can improve efficiency of document conversions and document preparation efficiency by reusing and refining an upstream document, downstream document and addition/deletion document, which can make implicit information explicit in order to exploit that information as resources of technical information, and which can be applied to the system engineering work.

According to a first aspect of the present invention, there is provided a two-level document processing method preparing a downstream document on the basis of an upstream document, the upstream document being a document associated with a product and placed near a user, and the downstream document being a document associated with the product and placed near a maker, the method comprising the steps of:

comparing the upstream document with an upstream deletion document including information which is particular to the upstream document and is unnecessary for the downstream document;

selecting, from the upstream document and based on results of the step of comparing, a deletion candidate to be deleted from the upstream document until no more deletion candidate is found; and preparing the downstream document by performing deletion or non-deletion of the deletion candidate from the upstream document in accordance with results of the step of selecting.

According to this aspect of the present invention, technical information or the like, which will be necessary to a user side but not necessary to a maker side, is deleted from the upstream document, so that the downstream document of a minimum amount is prepared.

According to a second aspect of the present invention, the step of preparing may comprise the steps of:

searching the upstream deletion document for corresponding information corresponding to the deletion candidate;

displaying, if the corresponding information is present in the upstream deletion document, the deletion candidate and the corresponding information to have approval of deletion;

deleting the deletion candidate from the upstream document if the deletion of the deletion candidate is approved; and storing the deletion candidate and the corresponding information into a deletion file.

According to this aspect of the present invention, the deletion candidate is deleted from the upstream document, and the deletion candidate and the corresponding information are stored into the deletion file in order to be inspected as information of the upstream deletion document.

According to a third aspect of the present invention, the step of preparing may comprise the steps of:

searching in the upstream deletion document for corresponding information corresponding to the deletion candidate;

displaying, if the corresponding information is present in the upstream deletion document, the deletion candidate and the corresponding information to have approval of deletion;

storing the deletion candidate and the corresponding information into a non-deletion file without deleting the deletion candidate from the upstream document if the deletion of the deletion candidate is not approved.

According to this aspect of the present invention, decision is made for each deletion candidate whether it is reasonable to eliminate that deletion candidate, and if it is decided that the deletion candidate should not be eliminated, the deletion candidate is left intact. This is performed because some of the deletion candidates are necessary for a maker side, even if corresponding information corresponding to the deletion candidates is present in the upstream deletion document. The deletion candidate which is not deleted and its corresponding information are stored into a non-deletion file to be inspected as information of the upstream deletion document.

According to a fourth aspect of the present invention, the step of preparing may comprise the steps of:

searching in the upstream deletion document for corresponding information corresponding to the deletion candidate; and storing the deletion candidate into an upstream special candidate file without deleting the deletion candidate from the upstream document, if the corresponding information corresponding to the deletion candidate is absent in the upstream deletion document.

According to this aspect of the present invention, the deletion candidate is stored into the upstream special candidate file as a special candidate in order to accumulate new information, even if corresponding information associated with the deletion candidate to be deleted in principle is absent in the upstream deletion document. This benefits much to improve an insufficient upstream deletion document.

According to a fifth aspect of the present invention, there is provided a two-level document processing method preparing a downstream document on the basis of an upstream document, the method comprising the steps of:

comparing the upstream document with a downstream addition document including information which is particular to the downstream document and is unnecessary for the upstream document;

selecting, from the downstream addition document and based on the results of the step of comparing, an addition candidate to be added to the upstream document until no more addition candidate is found; and preparing the downstream document by performing addition or non-addition of the addition candidate to the upstream document in accordance with results of the step of selecting.

According to this aspect of the present invention, a high automation efficiency of the forward conversion from the upstream document to the downstream document is achieved, because the downstream document is generally generated by adding a large amount of information to the upstream document. In this case, the starting upstream document may be the original upstream document, or the upstream document which has undergone the deletion processings mentioned above.

According to a sixth aspect of the present invention, the step of preparing may comprise the steps of:

searching the downstream addition document for corresponding information corresponding to the addition candidate;

displaying, if the corresponding information is present in the downstream addition document, the addition candidate and the corresponding information to have approval of addition;

adding the addition candidate to the upstream document if the addition of the addition candidate is approved; and storing the addition candidate and the corresponding information into an addition file.

According to this aspect of the present invention, the addition candidate is added to the upstream document, and the addition document and its corresponding information are stored into an addition file to be inspected as information of the downstream addition document.

According to a seventh aspect of the present invention, the step of preparing may comprise the steps of:

searching the downstream addition document for corresponding information corresponding to the addition candidate;

displaying, if the corresponding information is present in the downstream addition document, the addition candidate and the corresponding information to have approval of addition; and storing the addition candidate and the corresponding information into a non-addition file without adding the addition candidate to the upstream document, if the addition of the addition candidate is not approved.

According to this aspect of the present invention, decision is made for each addition candidate whether it is reasonable to add that addition candidate, and if it is decided that the addition candidate should not be added, the addition candidate is not added. This is performed because some of the addition candidates are unnecessary for a maker side, even if corresponding information corresponding to the addition candidates is present in the downstream addition document. The addition candidate which is not added and its corresponding information are stored into a non-addition file to be inspected as information of the downstream addition document.

According to an eighth aspect of the present invention, the step of preparing may comprise the steps of:

searching the downstream addition document for corresponding information corresponding to the addition candidate; and storing the addition candidate into a downstream special candidate file without adding the addition candidate to the upstream document, if the corresponding information corresponding to the addition candidate is absent in the downstream addition document.

According to this aspect of the present invention, the addition candidate is stored into the downstream special candidate file as a special candidate in order to accumulate new information, even if corresponding information associated with the addition candidate to be added in principle is absent in the downstream addition document. This benefits much to improve an insufficient downstream addition document.

According to a ninth aspect of the present invention, the processings from the first to eighth aspects of the present invention are carried out, and the input upstream document and the output downstream document are outputted contrastively in order to clarify the addition and deletion portions.

According to this aspect of the present invention, the upstream document is contrastively displayed with the downstream document which is obtained as a result of the addition and deletion to and from the upstream document, together with the addition and deletion portions which have been stored in the addition file and the deletion file. This makes it possible to support an examination of quality of the forward conversion.

According to a 10th aspect of the present invention, there is provided a two-level document processing method preparing an upstream document on the basis of a downstream document, the method comprising the steps of:

comparing the downstream document with a downstream deletion document including information which is particular to the downstream document and is unnecessary for the upstream document;

selecting, from the downstream deletion document and based on results of the step of comparing, a deletion candidate to be deleted from the downstream document until no more deletion candidate is found; and preparing the upstream document by performing deletion or non-deletion of the deletion candidate from the downstream document in accordance with results of the searching.

According to this aspect of the present invention, the upstream document of a minimum amount is prepared by deleting information which is unnecessary to the upstream document from the downstream document. As the downstream deletion document in this case, the same document as the downstream addition document in the fifth aspect of the present invention can be used.

According to an 11th aspect of the present invention, the step of preparing may comprise the steps of:

searching the downstream deletion document for corresponding information corresponding to the deletion candidate;

displaying, if the corresponding information is present in the downstream deletion document, the deletion candidate and the corresponding information to have approval of deletion;

deleting the deletion candidate from the downstream document if the deletion of the deletion candidate is approved; and storing the deletion candidate and the corresponding information into a deletion file.

According to this aspect of the present invention, which corresponds to the second aspect, the deletion candidate which has been deleted and the corresponding information are stored into the deletion file in order to be inspected as information of the downstream deletion document.

According to a 12th aspect of the present invention, the step of preparing may comprise the steps of:

searching the downstream deletion document for corresponding information corresponding to the deletion candidate;

displaying, if the corresponding information is present in the downstream deletion document, the deletion candidate and the corresponding information to have approval of deletion; and storing the deletion candidate and the corresponding information into a non-deletion file without deleting the deletion candidate from the downstream document, if the deletion of the deletion candidate is not approved.

According to this aspect of the present invention, which corresponds to the third aspect, decision is made for each deletion candidate whether it is reasonable to eliminate that deletion candidate, and if it is decided that the deletion candidate should not be eliminated, the deletion candidate is left intact. This is performed because some of the deletion candidates are necessary for a user side, even if corresponding information corresponding to the deletion candidates is present in the downstream deletion document. The deletion candidate which is not deleted and its corresponding information are stored into a non-deletion file to be inspected as information of the downstream deletion document.

According to a 13th aspect of the present invention, the step of preparing may comprise the steps of:

searching the downstream deletion document for corresponding information corresponding to the deletion candidate; and storing the deletion candidate into a downstream special candidate file without deleting the deletion candidate from the downstream document, if the corresponding information corresponding to the deletion candidate is absent in the downstream deletion document.

According to this aspect of the present invention, which corresponds to the fourth aspect, the deletion candidate is stored into the downstream special candidate file as a special candidate in order to accumulate new information, even if corresponding information associated with the deletion candidate is absent in the downstream deletion document. This benefits much to improve an insufficient downstream deletion document.

According to a 14th aspect of the present invention, there is provided a two-level document processing method preparing an upstream document on the basis of a downstream document, the method comprising the steps of:

comparing the downstream document with an upstream addition document including information which is particular to the upstream document and is unnecessary for the downstream document;

selecting, from the upstream addition document and based on results of the step of comparing, an addition candidate to be added to the downstream document until no more addition candidate is found; and preparing the upstream document by performing addition or non-addition of the addition candidate to the downstream document in accordance with results of the searching.

This aspect of the present invention corresponds to the fifth aspect. In this case, the starting downstream document may be the original downstream document, or the downstream document which has undergone the deletion processings in the 10th–13th aspects of the present invention. As the upstream addition document in this aspect, the same document as the upstream deletion document in the first aspect can be used.

According to a 15th aspect of the present invention, the step of preparing may comprise the steps of:

searching the upstream addition document for corresponding information corresponding to the addition candidate;

displaying, if the corresponding information is present in the upstream addition document, the addition candidate and the corresponding information to have approval of addition;

adding the addition candidate to the downstream document if the addition of the addition candidate is approved; and storing the addition candidate and the corresponding information into an addition file.

According to this aspect of the present invention, which corresponds to the sixth aspect, the addition candidate is added to the downstream document, and the addition document and its corresponding information are stored into an addition file to be inspected as information of the upstream addition document.

According to a 16th aspect of the present invention, the step of preparing may comprise the steps of:

searching the upstream addition document for corresponding information corresponding to the addition candidate;

displaying, if the corresponding information is present in the upstream addition document, the addition candidate and the corresponding information to have approval of addition; and storing the addition candidate and the corresponding information into a non-addition file without adding the addition candidate to the downstream document if the addition of the addition candidate is not approved.

According to this aspect of the present invention, which corresponds to the seventh aspect, decision is made for each addition candidate whether it is reasonable to add that addition candidate, and if it is decided that the addition candidate should not be added, the addition candidate is not added. This is performed because some of the addition candidates are unnecessary for a user side, even if corresponding information corresponding to the addition candidates is present in the upstream addition document. The addition candidate which is not added and its corresponding information are stored into a non-addition file to be inspected as information of the upstream addition document.

According to a 17th aspect of the present invention, the step of preparing may comprise the steps of:

searching the upstream addition document for corresponding information corresponding to the addition candidate; and storing the addition candidate into an upstream special candidate file without adding the addition candidate to the downstream document, if the corresponding information corresponding to the addition candidate is absent in the upstream addition document.

According to this aspect of the present invention, corresponding to the eighth aspect, the addition candidate is stored into the downstream special candidate file as a special candidate in order to accumulate new information, even if corresponding information associated with the addition candidate is absent in the upstream addition document. This benefits much to improve an insufficient upstream addition document.

According to an 18th aspect of the present invention, the processings from the 10th to 17th aspects of the present invention are carried out, and the input downstream document and the output upstream document are contrastively outputted in order to clarify the addition and deletion portions.

According to this aspect of the present invention, which corresponds to the ninth aspect, the downstream document is contrastively displayed with the upstream document which is obtained as a result of the addition and deletion to and from the downstream document, together with the addition and deletion portions which have been stored in the addition file and the deletion file. This makes it possible to support an examination of quality of the inverse conversion.

According to a 19th aspect of the present invention, there is provided a two-level document processing method comprising:

inputting an upstream document and a downstream document, comparing the upstream document with the downstream document to extract differences between the two documents;

storing information, which is present in the upstream document and absent in the downstream document, as an upstream addition/deletion document; and storing information, which is present in the downstream document and absent in the upstream document, as a downstream addition/deletion document.

According to this aspect of the present invention, a first stage addition/deletion document is prepared by extracting differences between existing upstream document and downstream document under predetermined rules. Since this addition/deletion document depends on the existing upstream document and downstream document, a refining processing described below will be required.

According to a 20th aspect of the present invention, there is provided a two-level document processing method comprising the steps of:

selecting shortage candidate from an upstream document under shortage decision rules used as a reference to decide whether some kinds of information are lacking or not;

searching an upstream addition/deletion document for corresponding information corresponding to the shortage candidate;

repeating the steps of selecting and searching until no more shortage candidate is found in the upstream document; and performing addition or non-addition of the corresponding information to the upstream document in accordance with results of the step of searching.

According to this aspect of the present invention, if a shortage candidate is found in the upstream document, this is considered that an excessive deletion is carried out in accordance with the upstream addition/deletion document, and hence, the corresponding information is added to the upstream document, and is eliminated from the upstream addition/deletion document.

According to a 21st aspect of the present invention, the step of performing may comprise the steps of:

storing the shortage candidate and the corresponding information into an excessive deletion file under a decision that an excessive deletion has been made if the corresponding information corresponding to the shortage candidate is present in the upstream addition/deletion document; and adding the corresponding information to the upstream document, and deleting the corresponding information from the upstream addition/deletion document.

According to this aspect of the present invention, since the corresponding information, which causes the excessive deletion from the upstream addition/deletion document, is deleted, the refinement of the upstream addition/deletion document as well as that of the upstream document will be carried out. In addition, since the shortage candidate and its corresponding information is stored into the excessive deletion file, an appropriate generation of the upstream addition/deletion document thereafter is performed with reference to the excessive deletion file.

According to a 22nd aspect of the present invention, the step of performing may comprise the steps of:

searching a repository for the corresponding information corresponding to the shortage candidate if the corresponding information is not present in the upstream addition/deletion document, the repository being resources of information; and adding the corresponding information to the upstream document, and storing the shortage candidate and the corresponding information to an addition file, if the corresponding information is present in the repository, and if the addition of the corresponding information is decided to be reasonable.

According to this aspect of the present invention, if the corresponding information is present in the result repository or the like, it is stored into the upstream document, even if the corresponding information is absent in the upstream addition/deletion document. In this case, since the shortage candidate of the upstream document is stored into the addition file, an appropriate preparation of the upstream addition/deletion document thereafter will be carried out.

According to a 23rd aspect of the present invention, the step of performing may comprise the steps of:

searching a repository for the corresponding information corresponding to the shortage candidate if the corresponding information is not present in the upstream addition/deletion document; and storing the shortage candidate and the corresponding information into a non-addition file without adding the corresponding information to the upstream document, if the corresponding information is present in the repository, and the addition of the corresponding information is decided to be unreasonable.

According to this aspect of the present invention, even if the corresponding information is present in the result repository, decision is made for each corresponding information whether it is reasonable to add it, and the corresponding information is not added if inappropriate to do so. Then, the corresponding information is stored into the non-addition file in order to accumulated it as beneficial information for the upstream addition/deletion document, thereby utilizing the corresponding information.

According to a 24th aspect of the present invention, the step of performing may comprise the steps of:

searching a repository for the corresponding information corresponding to the shortage candidate if the corresponding information is not present in the upstream addition/deletion document; and storing the shortage candidate into an upstream shortage candidate file without adding the corresponding information to the upstream document, if the corresponding information is absent in the repository.

According to this aspect of the present invention, the corresponding information is absent in the result repository as well. In this case, the shortage of the upstream document cannot be compensated. The shortage candidate should be checked whether it is convertible into a product which a user demands before it is added as technical information. The shortage candidate which is not added is accumulated into the upstream document shortage file as beneficial information for the upstream addition/deletion document.

According to a 25th aspect of the present invention, there is provided a two-level document processing method comprising the steps of:

selecting an excessive candidate from an upstream document under excess decision rules used as a reference to decide whether some kinds of information are excessive or not, after no more shortage candidate is found in the upstream document under shortage decision rules;

searching an upstream addition/deletion document for corresponding information corresponding to the excessive candidate, the upstream addition/deletion document storing information which is present in the upstream document and is absent in the downstream document;

repeating the steps of selecting and searching until no more excessive candidate is found in the upstream document; and performing deletion or non-deletion of the excessive candidate to the upstream document in accordance with results of the step of searching.

According to this aspect of the present invention, the excessive addition to the upstream document, which may be carried out in accordance with the upstream addition/deletion document, is checked under predetermined decision rules, and if the excessive addition is confirmed, the excessive candidate is deleted from the upstream document, and the corresponding information is deleted from the upstream addition/deletion document.

According to a 26th aspect of the present invention, the performing may comprise the steps of:

storing the excessive candidate and the corresponding information into an excessive addition file under a decision that an excessive addition has been made, if the corresponding information corresponding to the excessive candidate is present in the upstream addition/deletion document; and deleting the excessive candidate from the upstream document, and deleting the corresponding information from the upstream addition/deletion document.

This aspect of the present invention is effective to delete low priority information. Such a case will occur, for example, when the upstream document is prepared from the downstream document, where restrictions on the document volume is severe. Contents of the excessive addition file are information beneficial to preparing the upstream addition/deletion document.

According to a 27th aspect of the present invention, the step of performing may comprise the step of:

deleting the excessive candidate from the upstream document and storing the excessive candidate into a deletion file, if the corresponding information corresponding to the excessive candidate is absent in the upstream addition/deletion document, and if the deletion of the excessive candidate is decided to be reasonable.

According to this aspect of the present invention, the excessive candidate is deleted from the upstream document, and stored into the deletion file. Thus, beneficial information is accumulated for the upstream addition/deletion document.

According to a 28th aspect of the present invention, the step of performing may comprise the step of:

storing the excessive candidate into a non-deletion file without deleting the excessive candidate from the upstream document, if the corresponding information corresponding to the excessive document is absent in the upstream addition/deletion document, and the deletion of the excessive candidate is decided to be unreasonable.

According to this aspect of the present invention, although the excessive candidate comes under the deletion decision rules, it is decided not to be deleted. Accordingly, reinspection of the deletion decision rules or of the expression should be carried out. Contents of the non-deletion file are used for the reinspection.

According to a 29th aspect of the present invention, there is provided the processings from the 20th to 28th aspects of the present invention are carried out, and the upstream document and the upstream addition/deletion document are contrastively outputted in order to clarity the addition and deletion portions before and after refinement.

According to this aspect of the present invention, the upstream document and the upstream addition/deletion document are refined by the addition processing and the deletion processing. In addition, information for studying the repository is generated. The upstream document and the upstream addition/deletion document are outputted to clarify amended and changed portion by the refinement.

According to a 30th aspect of the present invention, the processings from the 20th to 28th aspects of the present invention are carried out, and the downstream document and the downstream addition/deletion document are contrastively outputted in order to clarity the addition and deletion portions before and after refinement.

According to this aspect of the present invention, the downstream document and the downstream addition/deletion document are refined. After that, results of the refinement are confirmed by preparing the downstream document by performing forward conversion on the upstream document using the upstream addition/deletion document and the downstream addition/deletion document, and by preparing the upstream document by performing inverse conversion on the downstream document using the upstream addition/deletion document and the downstream addition/deletion document.

According to a 31st aspect of the present invention, there is provided a two-level document processing method comprising the steps of:

deciding whether a query about a product relates to upstream information or downstream information;

searching an upstream document, upstream addition/deletion document, upstream repository, downstream document, downstream addition/deletion document, and downstream repository, for an answering candidate, in accordance with results of the step of deciding until non-searched portion remains;

presenting the answering candidate if it is found; and storing an unsatisfied answering candidate, or a fact that no answering candidate is found, into a non-answering file.

According to this aspect of the present invention, the upstream document or downstream document, which are public or secret, are searched in accordance with the type of a query, and an answering candidate is presented and outputted. If the answering candidate is satisfactory, the processing ends. If no answering candidate is found, or the answer candidate is not satisfactory, this is stored in the non-answering file, thereby calling attention to the fact that expansion of the repository is necessary.

According to a 32nd aspect of the present invention, the processings from the first to 31st aspects of the present invention are carried out, followed by the following steps: deciding information value of information associated with the upstream under upstream file elimination decision rules, the information associated with the upstream being stored in the deletion file, non-deletion file, addition file, non-addition file, special candidate file, document shortage file, excessive deletion file, excessive addition file, and non-answering file; extracting valuable information as a processed candidate; comparing the processed candidate with technical information as past results, until the last processed candidate; and storing the processed candidate into the repository in accordance with results of comparison.

According to this aspect of the present invention, information of high utility value in the upstream work file is not eliminated, but stored in the repository in such a form that it can be reused in accordance with the characteristics of the information.

According to a 33rd aspect of the present invention, the two-level document processing method may further comprise the steps of:

comparing the processing candidate with a term dictionary as technical information;

adding the processing candidate to the term dictionary if a term corresponding to the processing candidate is not present in the term dictionary; and storing the processing candidate into an existence repository as another expression of existing information if a term corresponding to the processing candidate is not present in the term dictionary.

According to this aspect of the present invention, a new term in the processed candidate is stored into the term dictionary as a new term.

According to a 34th aspect of the present invention, the two-level document processing method may further comprise the steps of:

comparing the processing candidate with background knowledge as technical information;

deciding whether or not the processing candidate is eligible for the background knowledge under background knowledge adoption decision rules, if information corresponding to the processing candidate is not found in the background knowledge;

adding the processing candidate to the background knowledge if the processing candidate satisfies the rules; and storing the processing candidate into an existence repository as another expression of existing information if the processing candidate satisfies the rules.

According to this aspect of the present invention, information having utility value as background knowledge is added to the background knowledge, and stored into the existence repository as well.

According to a 35th aspect of the present invention, the two-level document processing method may further comprise the steps of:

comparing the processing candidate with an upstream document of another product as technical information; and storing the processing candidate into an existence repository as another expression of existing information, if the processing candidate has corresponding information in the upstream document of another product.

According to this aspect of the present invention, if the processed candidate is present in the document associated with another actual product, it is stored into the existence repository as a new expression which is usable as repository. This is because the fact that the processed candidate is included in the work file associated with the product of interest means that the processed candidate is incomplete in the upstream document associate with the produce of interest, and hence, is not included in the repository.

According to a 36th aspect of the present invention, the two-level document processing method may further comprise the steps of:

comparing the processing candidate with information associated with a development plan of a product; and storing the processing candidate into a plan repository as another expression of the information associated with the development plan, if the processing candidate has corresponding information in the information associated with the development plan.

According to this aspect of the present invention, the processed candidate, which is absent in documents associated with an existing product, is compared with a development plan of a product, and is stored into a plan repository if it is decided that the processed candidate belongs to the information associated with the plan.

According to a 37th aspect of the present invention, the two-level document processing method may further comprise the steps of:

deciding whether or not the processing candidate is eligible for future repository under producibility decision rules; and storing the processing candidate into the future repository as another expression if the processing candidate satisfies the rules.

According to this aspect of the present invention, the processed candidate, which is absent in the development plan of a product, is subject to a test deciding possibility of realization as a product. If it is realizable, the processed candidate is stored into the future repository as contents for the future. The processed candidate having no possibility of realization is adopted as the background knowledge if it is versatile. Otherwise, the processed candidate is eliminated even if it has utility value.

According to a 38th aspect of the present invention, the processings from the first to 31st aspects of the present invention are carried out, and then, the processings of the 32nd to 37th aspects of the present invention are carried out for information associated with the downstream, the information associated with the downstream being stored in the deletion file, non-deletion file, addition file, non-addition file, special candidate file, document shortage file, excessive deletion file, excessive addition file, and non-answering file.

According to this aspect of the present invention, the utility value of the repository increases because the repository associated with the upstream information and the repository associated with the downstream information are separately generated.

The two-level document processing method in accordance with the present invention can effectively prepare a reasonable volume document of each level by inputting the upstream document or the downstream document, along with the addition/deletion document. This makes it possible to reduce labor, time and cost involved in preparing the document.

An initial addition/deletion document used in the conversion processing can be easily prepared by extracting differences between existing upstream document and downstream document. The addition/deletion document can be improved, together with the upstream document and the downstream document, by the refining processing.

In addition, since an addition/deletion document, which could exist potentially before, can be made explicit if necessary, technical information can be effectively utilized at the upstream and downstream sides.

Furthermore, since a so-called query-and-answering processing can be carried out using the upstream information and downstream information which have been hierarchically stored, acquisition and utilization of necessary information can be achieved in the upstream and downstream sides by effectively circulating not only published information but also potential information. This serves to reinforce business and technical power.

A wide variety of information resources, which are prepared as repository, and are organized systematically, can be utilized for improving document expression or the like.

Finally, the principle of the present invention is not only applicable to documents of three or more levels, but also to fields other than documents, such as the system engineering.

The above and other objects, effects, features and advantages of the present invention will become more apparent from the following description of the embodiments thereof taken in conjunction with the accompanying drawings.

BRIEF DESCRIPTION OF THE DRAWINGS

FIGS. 1, 1A, 1B, 2, 2A, and 2B are flowcharts showing the operation of a first embodiment in accordance with the present invention;

FIGS. 3, 3A, 3B, 4, 4A, and 4B are flowcharts showing the operation of a second embodiment in accordance with the present invention;

FIG. 5 is a block diagram showing a forward conversion in the first embodiment;

FIG. 6 is a block diagram showing a inverse conversion in the second embodiment;

FIGS. 12, 12A, 12B, 13, 13A, 13B, and 14 are flowcharts showing the operation of a fourth embodiment in accordance with the present invention;

FIGS. 17, 17A and 17B are flowchart showing the operation of a fifth embodiment in accordance with the present invention;

FIGS. 19, 19A, 19B, 20, 20A, and 20B are flowcharts showing the operation of a sixth embodiment in accordance with the present invention.

DETAILED DESCRIPTION OF PREFERRED EMBODIMENTS

The invention will now be described with reference to the accompanying drawings.

EMBODIMENT 1

FIGS. 1A–2B show a first embodiment in accordance with the present invention, which relates to a forward conversion processing for preparing a downstream document from an upstream document.

As mentioned above, an upstream document is a document at the side of users of a product, and a downstream document is a document at the side of producers of the product. In general, the amount of an upstream document is much less than that of a downstream document.

Figure 7:
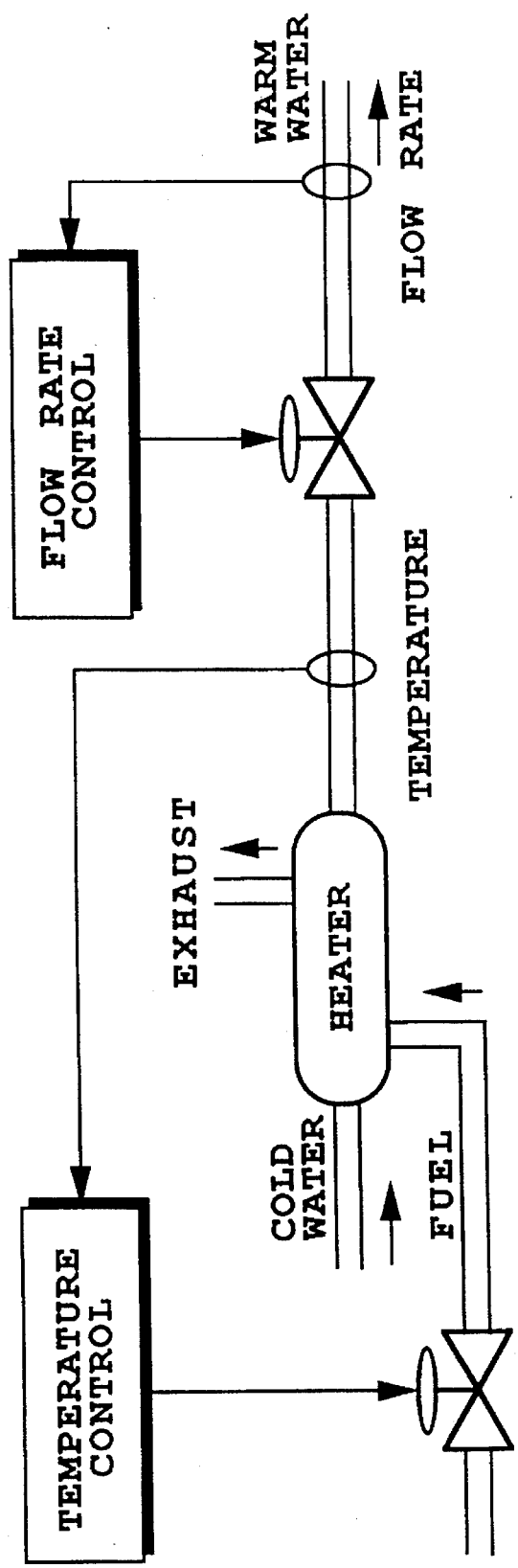
FIG. 7 is a block diagram showing a hot water heater control system as a background of the first and second embodiments.

The first embodiment is assumed to relate to a hot water heater control system as shown in FIG. 7, and business materials for the software for controlling temperature are supposed to be an upstream document, and design materials for system engineers are supposed to be a downstream material.

When preparing design materials (a downstream document) from business materials (an upstream document), although special technical information for design may be unnecessary for the business materials, some technical information will be necessary for users.

For example, when the PI control is adopted in the software for controlling the hot water heater, information which shows rich application results of the PI control will be necessary as a business material to emphasize the advantages of the PI control. This type of information, however, will not be necessary as a design material.

On the contrary, operational equations and types of control parameters of the PI control are essential to the design materials, though they are unnecessary for the business materials.

Considering these facts, in a forward conversion from an upstream document to a downstream document, a downstream document 31 is prepared by eliminating deletion portions (upstream deletion document) of an upstream addition/deletion document 12 from an upstream document 11, and by adding additional portions (downstream addition document) in a downstream addition/deletion document 13 to the upstream document 11, as shown in FIG. 5.

Figure 1B:
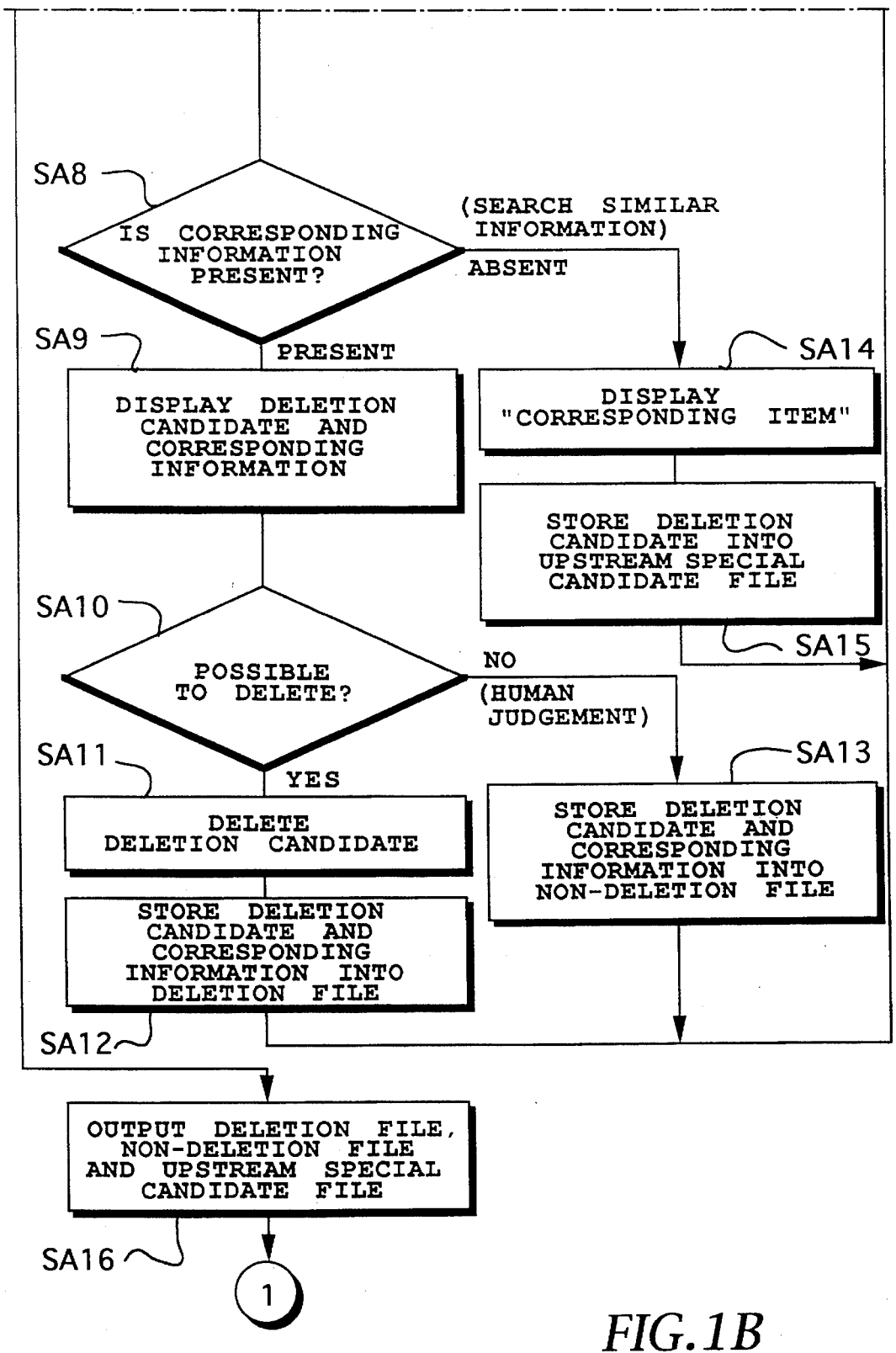

The procedures of the forward conversion processing will be described below. In FIGS. 1A and 1B, an upstream document and an upstream deletion document are inputted at steps SA1 and SA2. Here, the upstream deletion document contains information to be eliminated from the upstream document in the form of corresponding information.

The two documents are compared at step SA3, and results of the comparison are produced at step SA4. Then, deletion candidates to be eliminated from the upstream document are selected based on the results of the comparison at step SA5. Subsequently, at steps SA6 and SA7, the upstream deletion document is searched for the corresponding information until the last deletion candidate.

If the corresponding information is found at step SA8, both the deletion candidate and the corresponding information are displayed at step SA9. If an operator decides that the deletion candidate can be eliminated at step SA10, the deletion candidate is eliminated at step SA11, and is stored with the corresponding information into a deletion file at step SA12. On the other hand, if the operator decides that the deletion candidate should not be eliminated, both the deletion candidate and the corresponding information are stored into a non-deletion file as new information of the addition/deletion document at step SA13, and the processing returns to step SA5.

The validity of deletion is decided here because there are some cases where the deletion candidate should not be eliminated even if the corresponding information is found.

For example, special operational equations of the PI control, which are used to reduce production cost, may not be understood by designers without explanation, and may cause a misunderstanding. Therefore, it is sometimes necessary to explain the current development of the PI control, which would usually be unnecessary for the downstream document. In such a case, a part of the general description of the PI control will be left for the downstream document. The undeleted information is stored into the non-deletion file at step SA13, and the processing returns to step SA5.

At step SA8, if no corresponding information is found, this fact is displayed in a phrase of "corresponding item" at step SA14, and the current deletion candidate is stored in an upstream special candidate file at step SA15. Subsequently, the processing returns to step SA5.

The upstream addition/deletion document (upstream deletion document) is originally made by picking up information to be deleted from the upstream document. The upstream addition/deletion document, however, may sometimes be incomplete in a new application field.

For example, a manufacturer of a heat exchanger, who is beginning to produce a hot water heater system for domestic use, has no previous instances for deleting various information for domestic user from the upstream document. Accordingly, he must pick up information for domestic user from the upstream addition/deletion document. Thus, the fact that no corresponding information is present should be utilized by storing the deletion candidate into a special candidate file in order to prepare new information.

At step SA6, if the deletion candidate is no more found, the deletion file, the non-deletion file, and the upstream special candidate file are outputted as the results of the processings at step SA16.

Figure 2A:
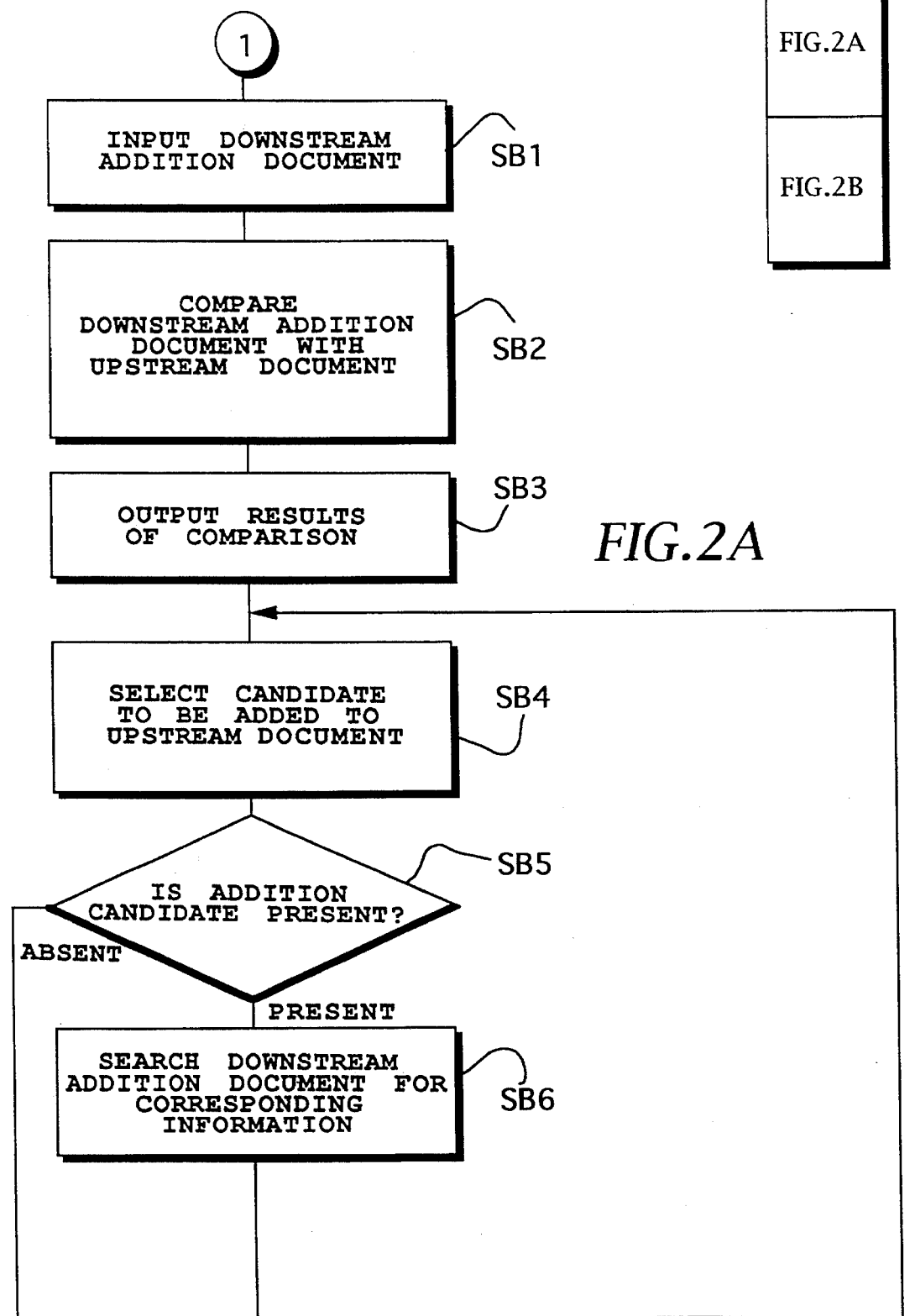
Figure 2B:
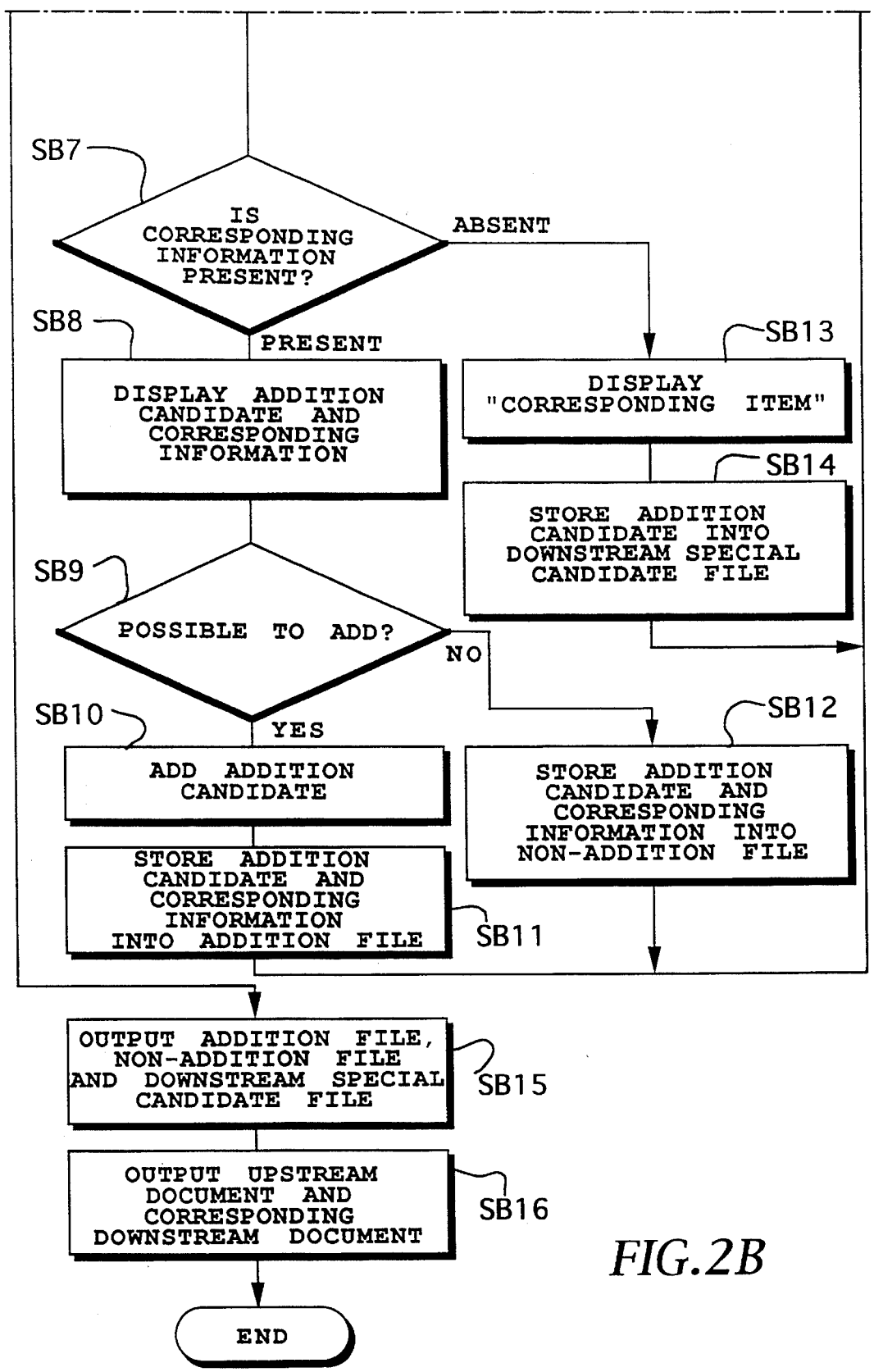

After that, at step SB1 in FIG. 2A, a downstream addition document is inputted on the assumption that the deletion processing as shown in FIGS. 1A and 2B has already been carried out with the upstream document. Then, the upstream document is compared with the downstream addition document at step SB2, and results of the comparison are produced at step SB3. Subsequently, candidates to be added to the upstream document are selected based on the results of the comparison at step SB4.

If an addition candidate is present, the downstream addition document is searched for the corresponding information at step SB6. If the corresponding information is found at step SB7, both the addition candidate and the corresponding information are displayed at step SB8. Subsequently, the operator tests the validity of addition, and if he decides that the addition candidate can be added at step SB9, the addition candidate is added to the upstream document at step SB10. Then, the addition candidate and the corresponding information are stored in an addition file at step SB11. After that, the processing returns to step SB4.

On the other hand, if the operator decides that the addition candidate should not be added at step SB9, both the addition candidate and the corresponding information are stored in a non-addition file at step SB12, and the processing returns to step SB4.

At step SB7, if the corresponding information is not found, this fact is indicated by displaying a phase "corresponding item" at step SB13, and the addition candidate is stored in a downstream special candidate file at step SB14 for the same reason described above. Subsequently, the processing returns to step SB4.

At step SB5, if no more addition candidate is found, the addition file, the non-addition file, and the downstream special candidate file are outputted as the results of the processings at step SB15. Subsequently, the upstream document and the downstream document are outputted contrastively at step SB16 so that the addition and deletion portions are clarified.

This step is necessary because it is difficult for the operator to decide whether the results are correct or not unless the original upstream document is shown in comparison with the downstream document, which is prepared by adding to and deleting from the upstream document, thereby indicating the differences between the two documents. The addition and deletion portions outputted simultaneously are those which have been stored in the deletion file and the addition file. This will help the operator to decide whether the forward conversion processing is appropriate or not.

In FIGS. 1A–2B, steps SA1–SA16 correspond to the first aspect of the present invention, steps SA1–SA12 correspond to the second aspect of the present invention, steps SA1–SA10 and SA13 correspond to the third aspect of the present invention, steps SA1–SA8, SA14 and SA15 correspond to the fourth aspect of the present invention, steps SB1–SB16 correspond to the fifth aspect of the present invention, steps SB1–SB11 correspond to the sixth aspect of the present invention, steps SB1–SB9 and SB12 correspond to the seventh aspect of the present invention, steps SB1–SB7, SB13 and SB14 correspond to the eighth aspect of the present invention, and steps SA1–SA16 and SB1–SB16 correspond to the ninth aspect of the present invention.

EMBODIMENT 2

FIGS. 3A–4B show a second embodiment of the present invention.

Generally, the forward conversion will be a normal conversion processing because software is usually produced in accordance with an order from a user. Sometimes, however, the business materials may be prepared from the design materials of a software product. The second embodiment relates to the inverse conversion processing, in which the upstream document 11 is prepared by eliminating deletion portions (downstream deletion document) of the downstream addition/deletion document 13 from the downstream document 31, and by adding addition portions (upstream addition document) of the upstream addition/deletion document 12 to the downstream document 31, as shown in FIG. 6.

In this case, the deletion portions in the forward conversion are addition portions in the inverse conversion, and the addition portions in the forward conversion are deletion portions in the inverse conversion. Therefore, both the forward and inverse conversions can share the same upstream addition/deletion document 12 and downstream addition/deletion document 13.

Figure 3B:
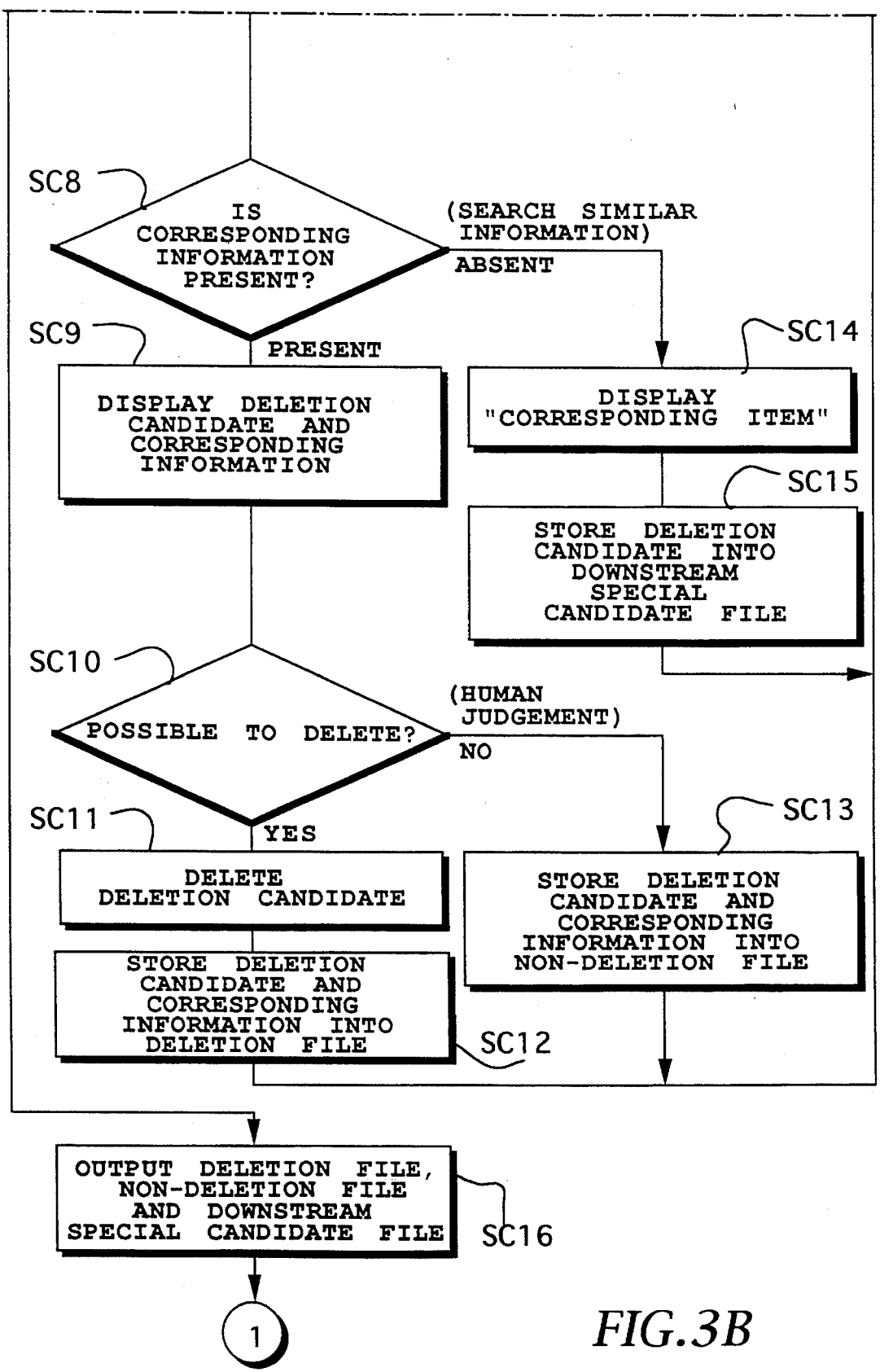

FIGS. 3A and 3B show the inverse conversion from the downstream document to the upstream document. Through this procedure, information which is particular to the downstream document and unnecessary for the upstream document is deleted.

The process is substantially the same as that of FIGS. 1A and 1B, and differs only in that the upstream document is replaced with the downstream document, the upstream deletion document is replaced with the downstream deletion document, and the upstream special candidate file is replaced with the downstream special candidate file. Hence, repeated descriptions thereof will be omitted here.

Figure 4A:
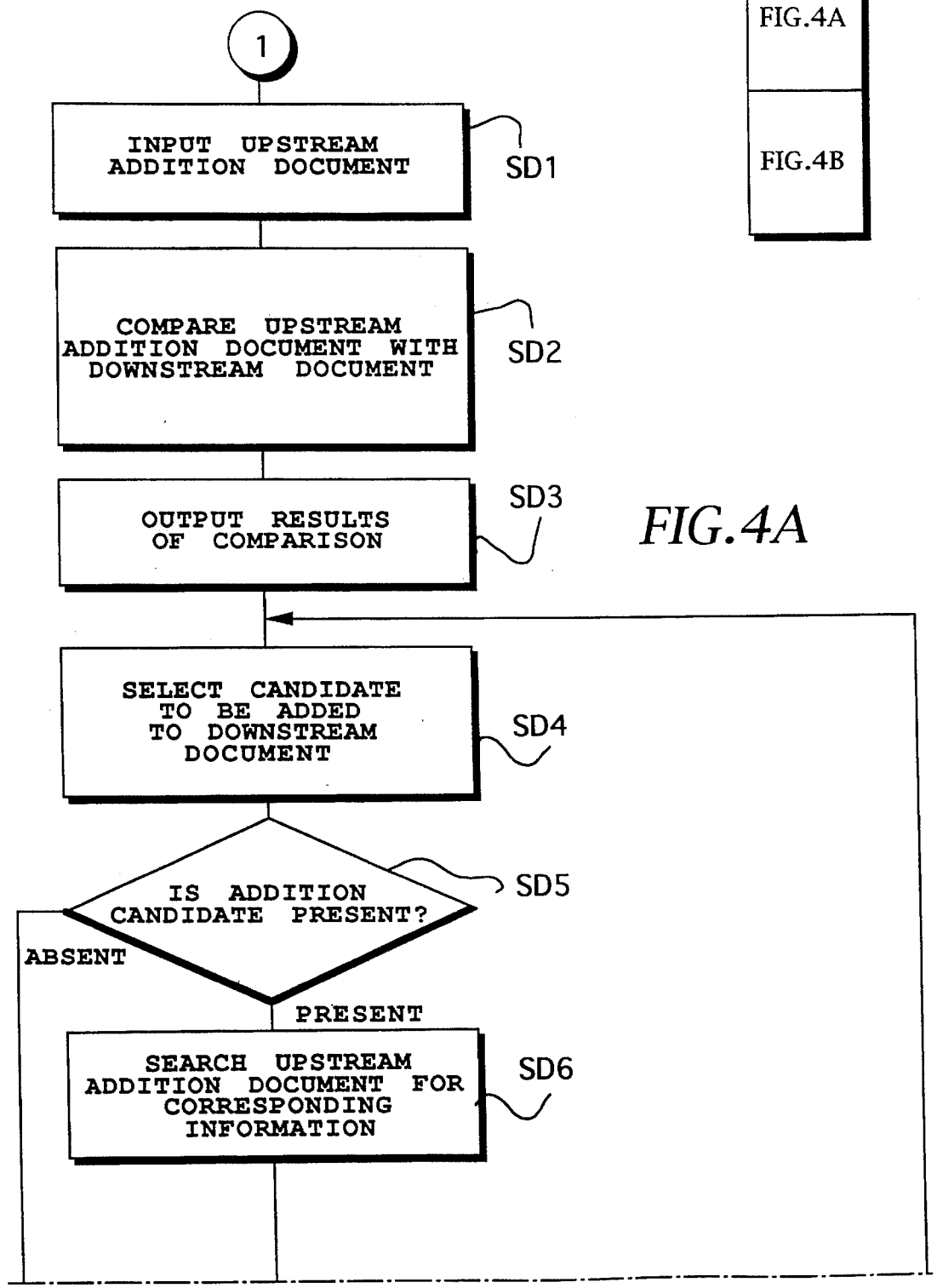
Figure 4B:
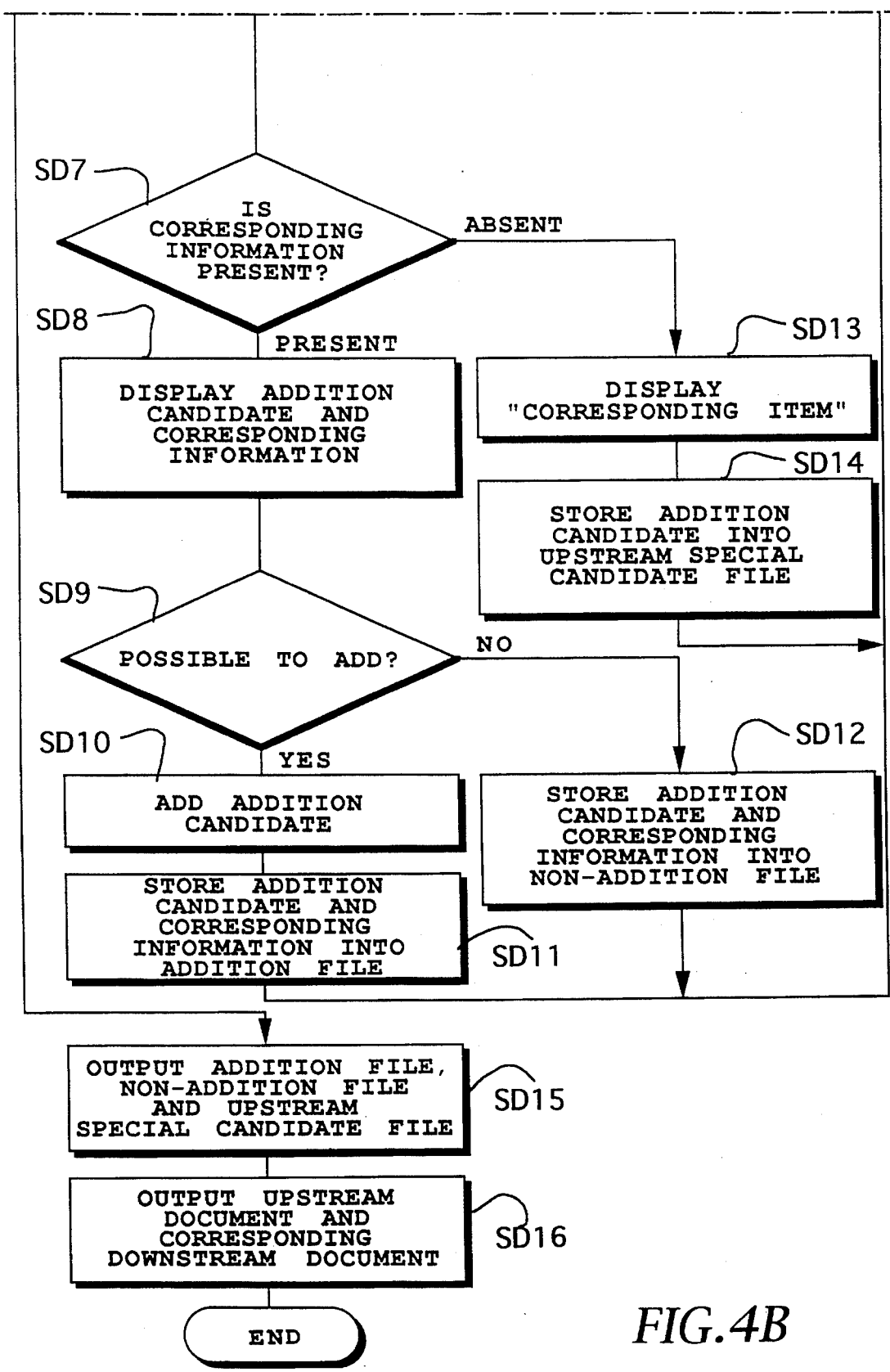

FIGS. 4A and 4B show the inverse conversion from the downstream document to the upstream document, in which information which is particular to the upstream document and not contained in the downstream document is added to the downstream document.

The process is substantially the same as that of FIGS. 2A and 2B, and differs only in that the downstream document is replaced with the upstream document, the downstream addition document is replaced with the upstream addition document, and the downstream special candidate file is replaced with the upstream special candidate file. Hence, repeated descriptions thereof will be omitted here.

In FIGS. 3A–4B, steps SC1–SC16 correspond to the 10th aspect of the present invention, steps SC1–SC12 correspond to the 11th aspect of the present invention, steps SC1–SC10 and SC13 correspond to the 12th aspect of the present invention, steps SC1–SC8, SC14 and SC15 correspond to the 13th aspect of the present invention, steps SD1–SD16 correspond to the 14th aspect of the present invention, steps SD1–SD11 correspond to the 15th aspect of the present invention, steps SD1–SD9 and SD12 correspond to the 16th aspect of the present invention, steps SD1–SD7, SD13 and SD14 correspond to the 17th aspect of the present invention, and steps SC1–SC16 and SD1–SD16 correspond to the 18th aspect of the present invention.

Figure 8:
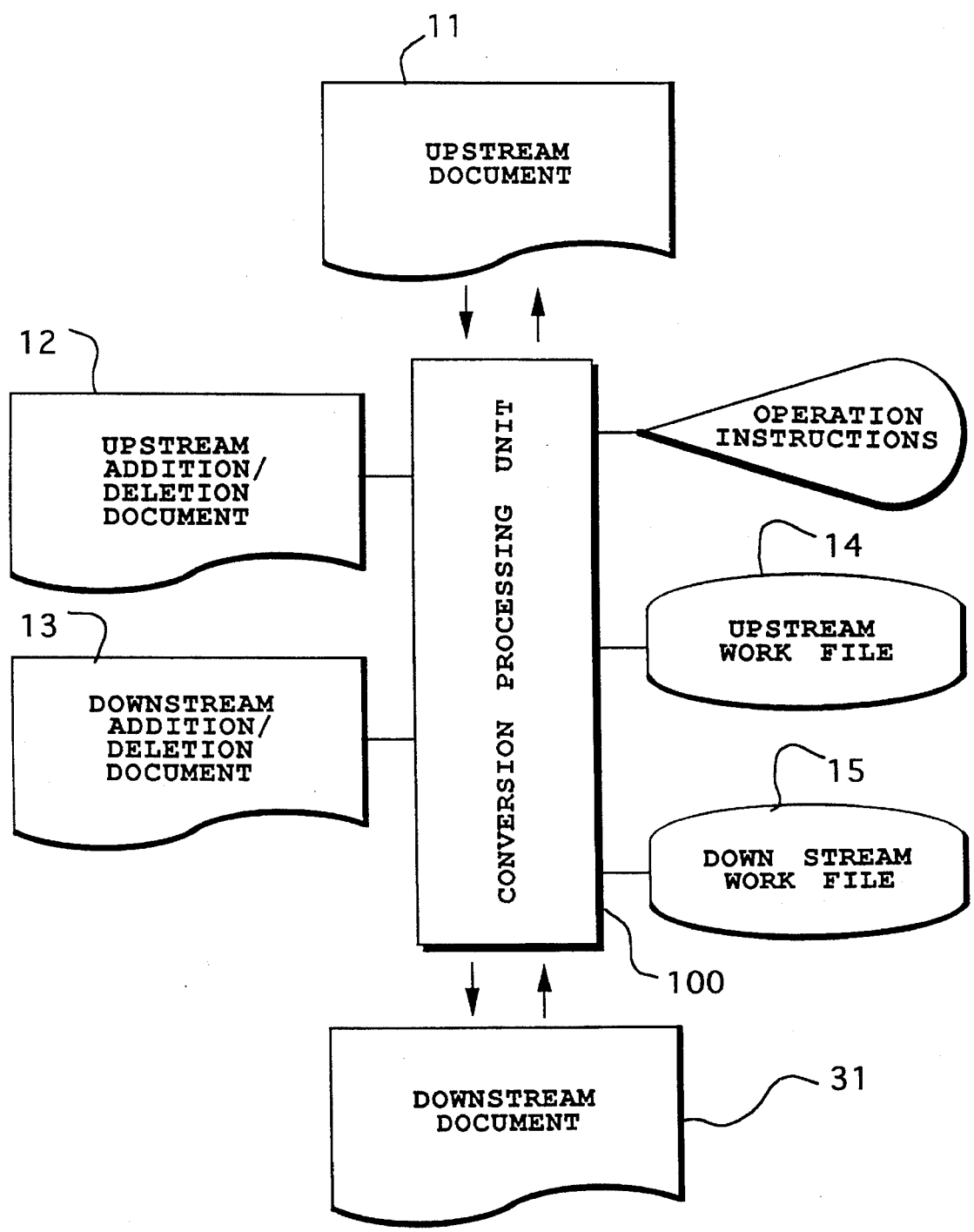
FIG. 8 is a block diagram showing a system of the first and second embodiments.

FIG. 8 shows a system for the first and second embodiments. In this figure, the reference numeral 100 designates a conversion processing unit including a computer for performing the forward conversion and the inverse conversion. The reference numerals 14 and 15 designate the upstream work file and the downstream work file, each of which includes the deletion file, the non-deletion file, the addition file, the non-addition file, the upstream special candidate file, and the downstream special candidate file.

EMBODIMENT 3

Figure 9:
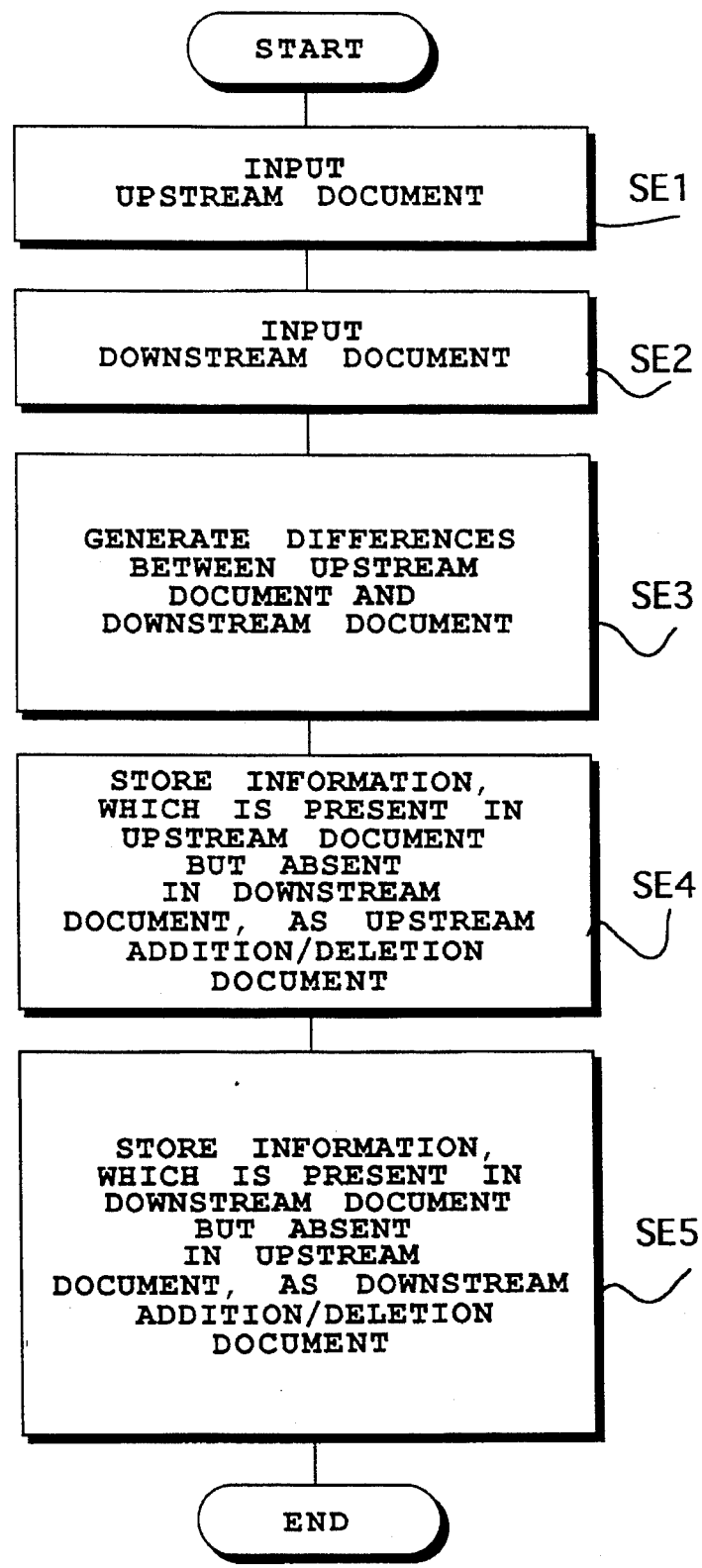
FIG. 9 is a flowchart showing the operation of a third embodiment in accordance with the present invention.

FIG. 9 shows a third embodiment in accordance with the present invention, in which an initial addition/deletion document is prepared.

In the above-described embodiments, it is assumed that the addition/deletion document has been prepared in advance. The contents of the upstream addition/deletion document and the downstream addition/deletion document can be prepared by utilizing standard information stored through processings of existing cases. Preparing an addition/deletion document by inputting an existing upstream document and an existing downstream document, and by extracting necessary information, is more suitable to actual software, and hence is more acceptable to a market.

In view of this, an addition/deletion document is prepared by extracting the differences between existing upstream and downstream documents in this embodiment.

In FIG. 9, an upstream document and a downstream document are inputted at steps SE1 and SE2. Differences between the two documents are extracted in accordance with predetermined extraction rules at step SE3. Subsequently, information which is present in the upstream document and absent in the downstream document is extracted and stored as an upstream addition deletion document at step SE4. Likewise, information which is present in the downstream document and absent in the upstream document is extracted and stored as a downstream addition/deletion document at step SE5.

The forward and inverse conversions become possible for the first time after the addition/deletion document has been arranged. This addition/deletion document prepared by the above-mentioned processing is a prototype before a final arrangement.

Apart from the completeness of the prepared addition/deletion document, an upstream document as a business material and a downstream document as a design material must be prepared. Considering this, a prototype addition/deletion document, which has been prepared by extracting the differences between the two documents, serves to prepare the business material or the design material. Since the contents of the addition/deletion document depends on existing upstream and downstream documents, they must be refined by the processing which will be described later.

Figure 10:
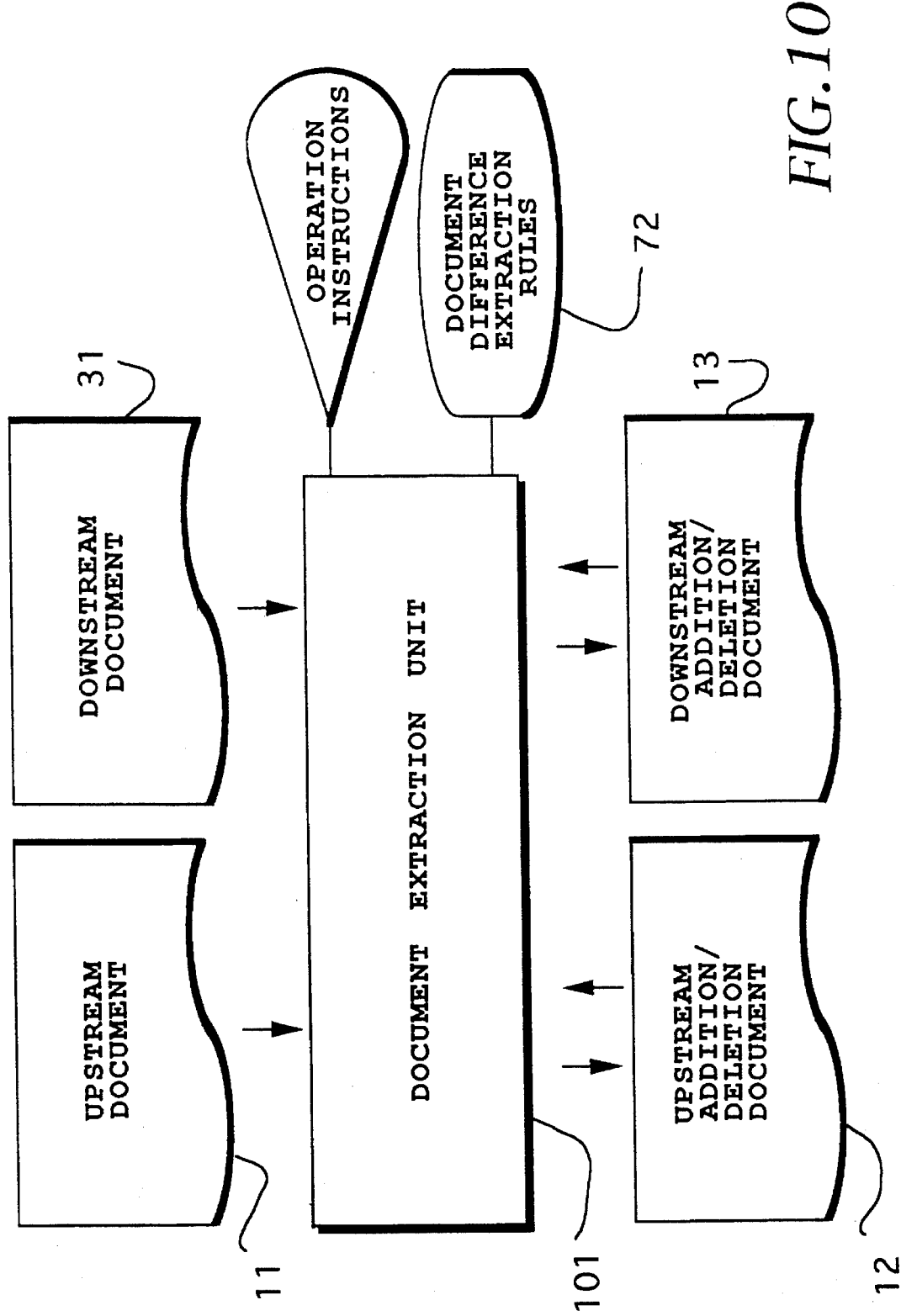
FIG. 10 is a block diagram showing a system for the third embodiment.

FIG. 10 shows a system of this embodiment. In this figure, the reference numeral 72 designates document difference extraction rules, 101 designates a document extraction unit which inputs the upstream document 11, the downstream document 31, extracts the differences between the two documents according to the rules 72, and outputs the upstream addition/deletion document 12 and the downstream addition/deletion document 13.

The upstream addition/deletion document serves to provide designers with the need of users correctly and in detail. For example, let us assume that the hot water heater control system as shown in FIG. 7 incorporates the following standard control methods in the steady state: (1) the PI control; (2) the ratio control in accordance with the volume of water; and (3) the feedforward control of fuel. These control methods are called a low cost type, steady type, and rapid response type, respectively, as other expressions for users. In addition, let us assume that the PI control is widely used as a standard method in the present circumstances.

In such a case, it is necessary to reflect in the design material the present condition, in which (1) the PI control, (2) the ratio control with the volume of water, and (3) the feedforward control of fuel are called a low cost type, steady type, and rapid response type, respectively. Accordingly, if some information implying the low cost type, the steady type, or the rapid response type is included in the upstream addition/deletion document, it should be made explicit.

Furthermore, since the downstream addition/deletion document may include some information serving to explain to users concrete contrivances of designers and technical restrictions, it should also be made explicit.

Thus, although the addition/deletion document does not generally appear to the surface, it is important as technical information. Accordingly, it should be prepared as necessary, with its contents being arranged in the form to be easily maintained so that they can be utilized effectively.

Figure 11:
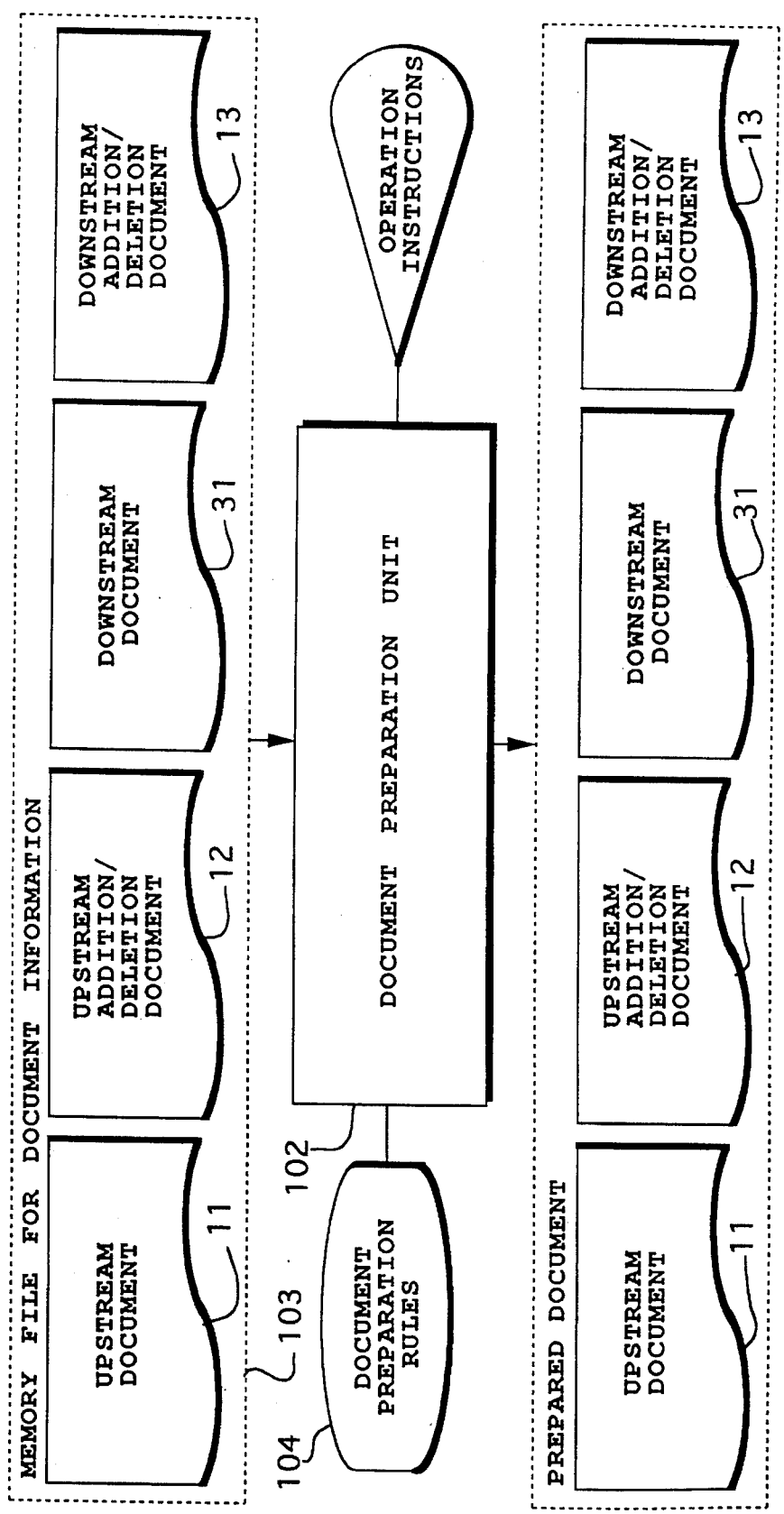
FIG. 11 is a block diagram showing a document preparation processing in the third embodiment.

FIG. 11 shows a system which outputs not only the upstream document 11 and the downstream document 31, but also the upstream addition/deletion document 12 and the downstream addition/deletion document 13 prepared as described above. In this figure, the contents of documents are stored in a memory file 103. A document preparation unit 102 prepares and outputs the upstream document 11, the downstream document 31, the upstream addition/deletion document 12, and the downstream addition/deletion document 13 in accordance with document preparation rules 104.

EMBODIMENT 4

FIGS. 12A–14 show a procedure for refining the upstream document and the downstream document.

This processing refines (improves) the upstream document and the downstream document by improving the addition/deletion document which has been prepared in advance to be used in the forward and inverse conversion processings.

The upstream document is associated with excess or shortage decision rules for the upstream document, and the downstream document is associated with excess or shortage decision rules for the downstream document. The refining processing searches the upstream document and the downstream document for shortage candidates and excessive candidates referring to these decision rules, and adds or deletes these candidates to or from the upstream document and downstream document in the case where these candidates are present, thereby improving the addition/deletion document.

Figure 15:
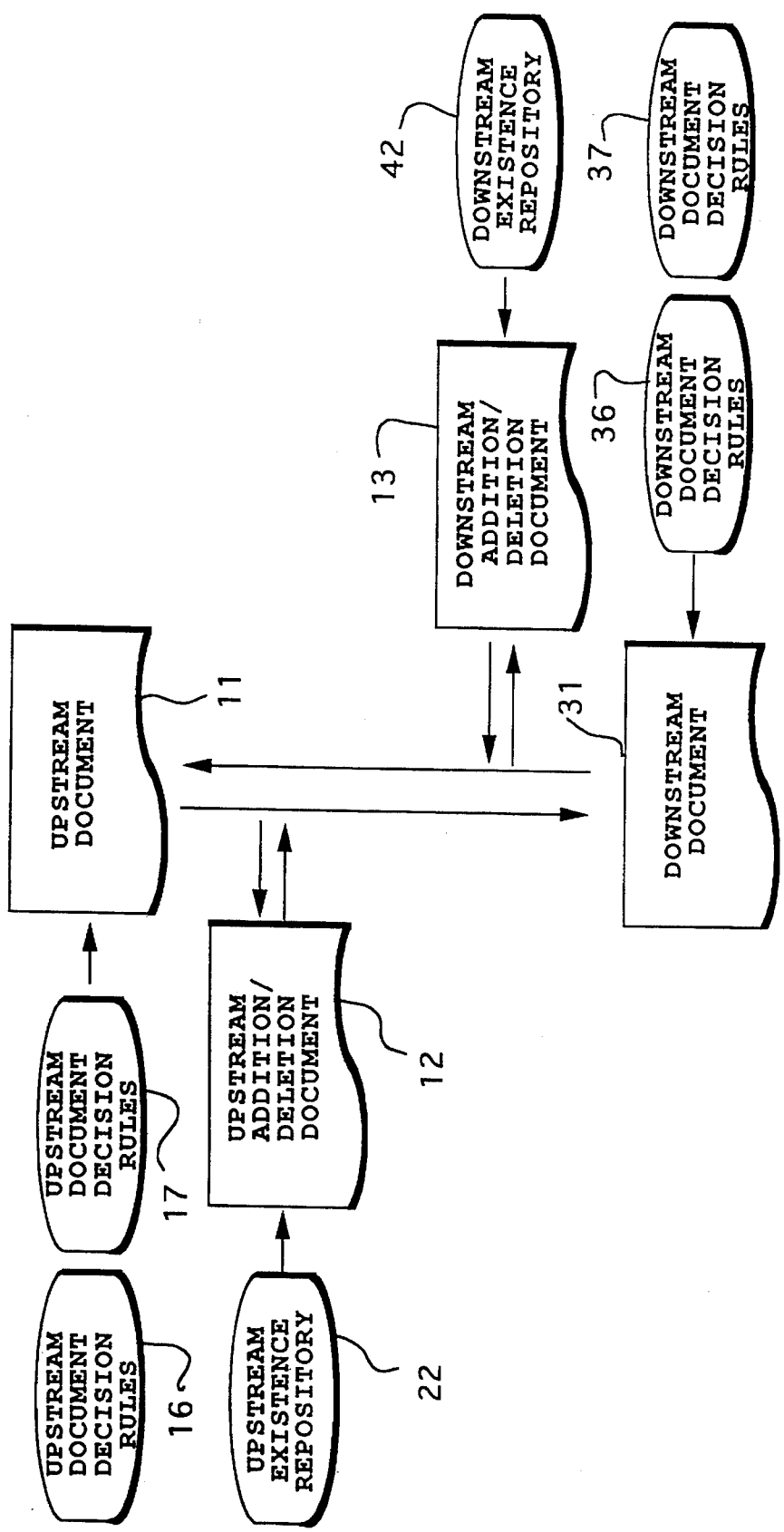
FIG. 15 is a block diagram showing a refining processing in the fourth embodiment.

FIG. 15 shows the relationships between the individual documents associated with the refining processing. By iterating the forward conversion and the inverse conversion by using the improved and corrected upstream addition/deletion document 12 and downward addition/deletion document 13, the finally polished up upstream document 11, downstream document 31, upstream addition/deletion document 12, and downstream addition/deletion document 13 are completed. In this figure, the reference numeral 16 designates the upstream document shortage decision rules, 17 designates the upstream document excess decision rules, 36 designates the downstream document shortage decision rules, and 37 designates the downstream excess decision rules.

In selecting the shortage candidates and excessive candidates, an upstream existence repository 22 and a downstream existence repository 42 are also referred to. The upstream existence repository 22 is a standard general purpose document which is reusable as the upstream document 11 and the upstream addition/deletion document 12, and the downstream existence repository 42 is a standard general purpose document which is reusable as the downstream document 31 and the downstream addition/deletion document 13. Thus, the quality of the refinement depends on the repository to some extent. Accordingly, if the result of the refinement is insufficient, the refining processing is carried out once again after improving the repository.

Figure 12A:
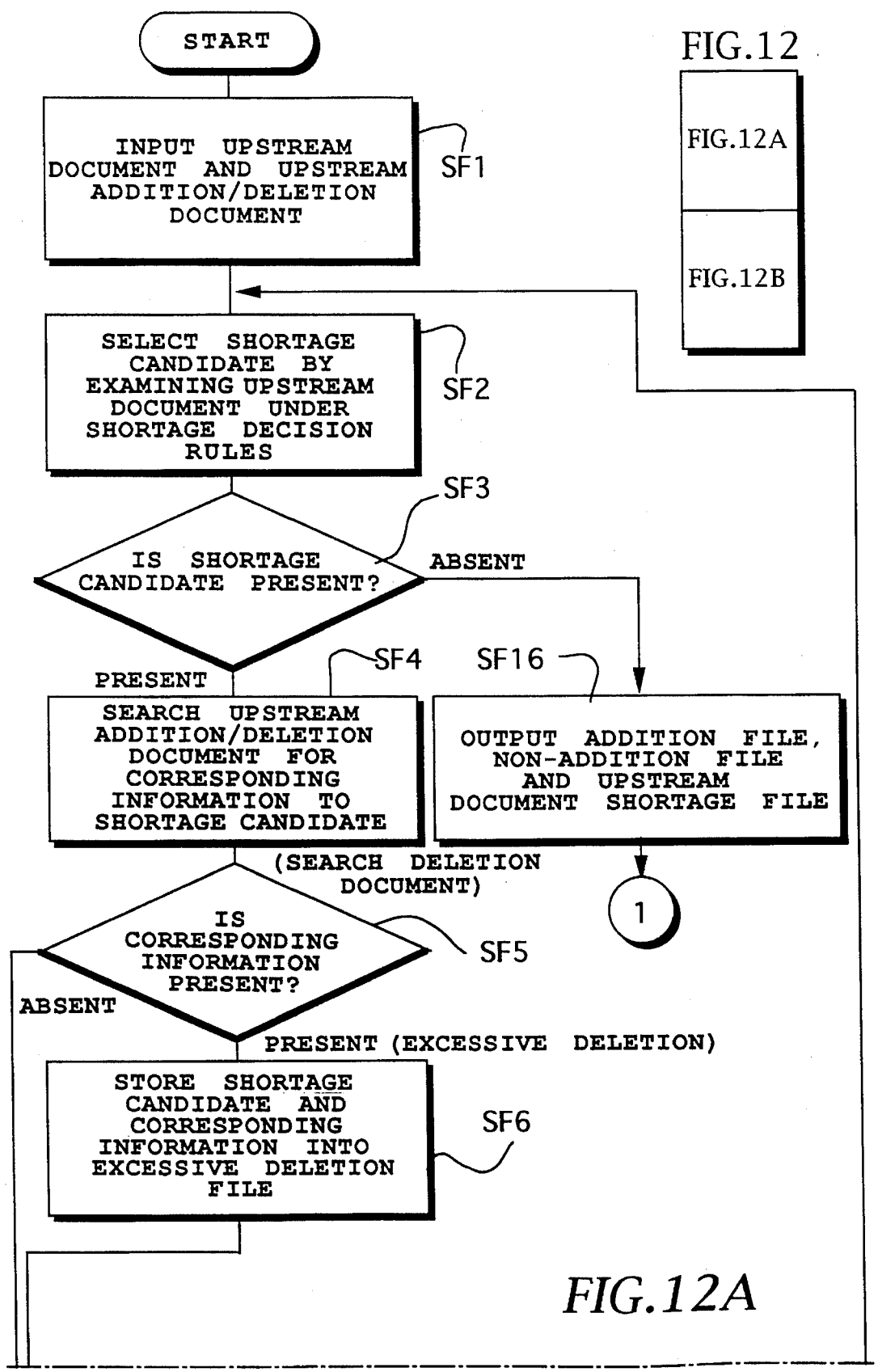
Figure 12B:
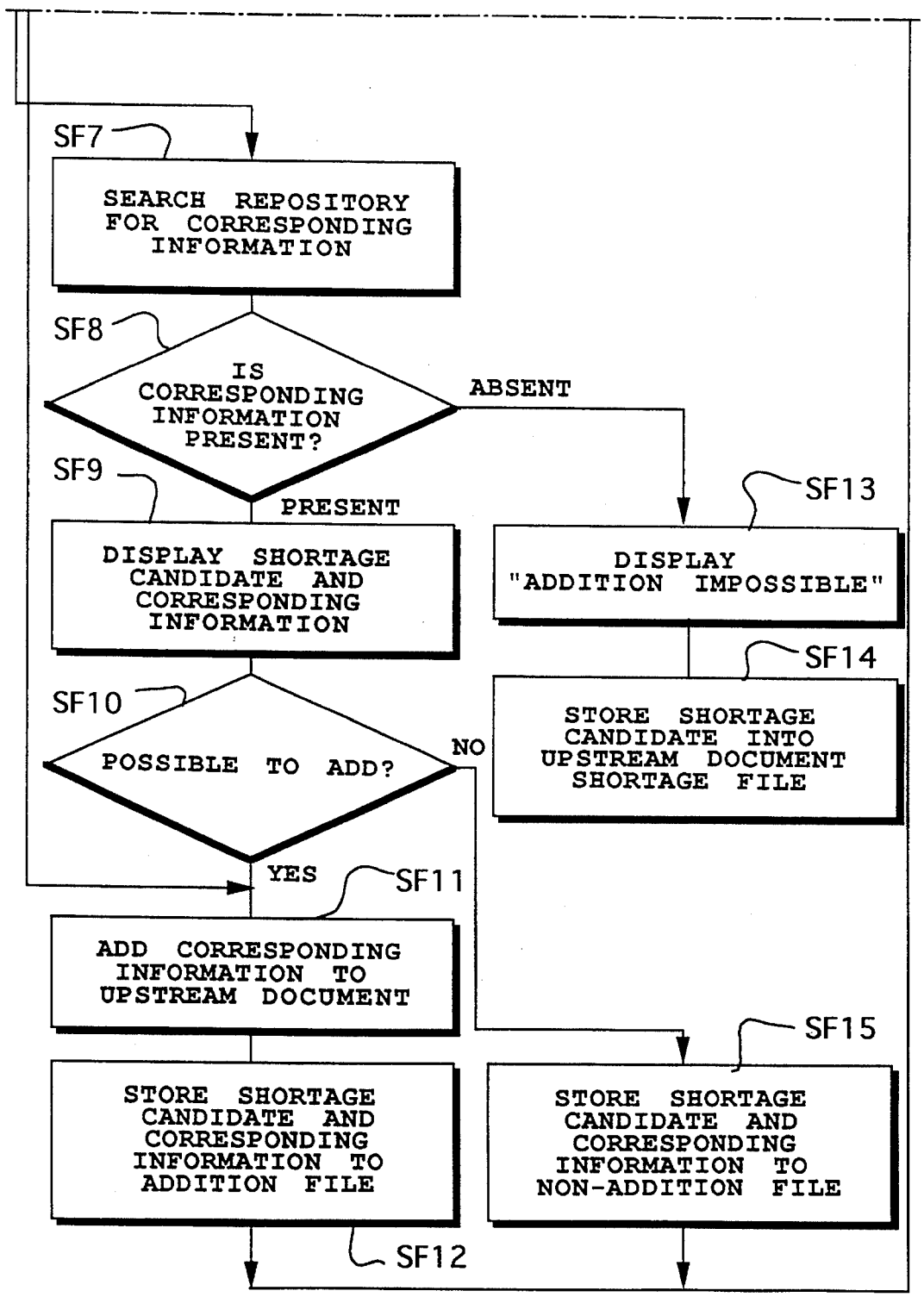

FIGS. 12A and 12B show the processing in more detail. At step SF1, an upstream document and an upstream addition/deletion document are inputted, and at step SF2, shortage candidates are selected by judging the upstream document referring to shortage decision rules. The decision rules associated with the upstream document should include the following: The volume of the upstream document does not exceed a certain value; the cost information is essential; and an explanation of reliability in use must be included. The shortage decision rules include the cost information and an explanation of reliability in use. Actually, there are many decision rules, and the document may be accepted even if it does not satisfy some unimportant rules. Generally speaking, however, the document is not satisfactory unless it satisfies the decision rules. The decision rules will be determined in part depending on the field or technical contents.

If a shortage candidate, such as a lack of cost information, is found at step SF3, the upstream addition/deletion document (upstream deletion document) is searched for information corresponding to the shortage candidate at step SF4. The presence and absence of the corresponding information to the shortage candidate is tested at step SF5.

If the corresponding information is present, that is, if the cost information is present in the upstream deletion document, and the cost information has been eliminated from the upstream document, it is judged that an excessive deletion has been performed. Hence, after storing the shortage candidate and the corresponding information in an excessive deletion file at step SF6, the corresponding information (the shortage candidate) is added to the upstream document at step SF11. At the same time, the corresponding information, that is, the cost information, is eliminated from the upstream deletion document. Thus, the upstream deletion document is corrected so that the cost information will be no more eliminated from the upstream document.

Subsequently, the shortage candidate and the corresponding information are stored in an addition file at step SF12. Thus, the additional information indicating the added one is stored, and the processing is returned to step SF2.

If no corresponding information is found at step SF5, the upstream existence repository is searched for corresponding information at step SF7.

In some cases, neither the upstream document nor the upstream deletion document may include the reliability in use. In such a case, the existence repository is searched. If corresponding information is found at step SF8, the corresponding information and the shortage candidate are displayed at step SF9. Then, the validity of addition is tested at step SF10, and the corresponding information, that is, the description about reliability in use, is added to the upstream document at step SF11.

In this case, since the reliability in use has not been originally contained in the upstream deletion document as a deletion item, only the upstream document is corrected.

The test on validity of addition at step SF10 is performed because some users will become too sensitive to safety once they have known safety measures, and this will degrade usability of the system. Accordingly, contents that would cause mistakes should not be added in a document for those users. In such a case, the shortage candidate is not added, and it is stored in a non-addition file with the corresponding information at step SF15, and the processing returns to step SF2. Then, some measures like expression improvement should be taken referring to the contents of the non-addition file.

If the corresponding information is not found at step SF8, a phase "addition impossible" is displayed at step SF13, and the shortage candidate is stored into the upstream document shortage file at step SF 14. Then, the processing returns to step SF2. In the case where the corresponding information is not present in the existence repository, it is not appropriate to simply add a document to the upstream document. The contents of the document can be added as technical information only after the possibility of commercialization is judged, even if the production is expected by users.

If no shortage candidate is found at step SF3, the addition file, the non-addition file, and the upstream document shortage file are outputted at step SF16, and the following excessive item deletion processing is carried out.

Figure 13A:
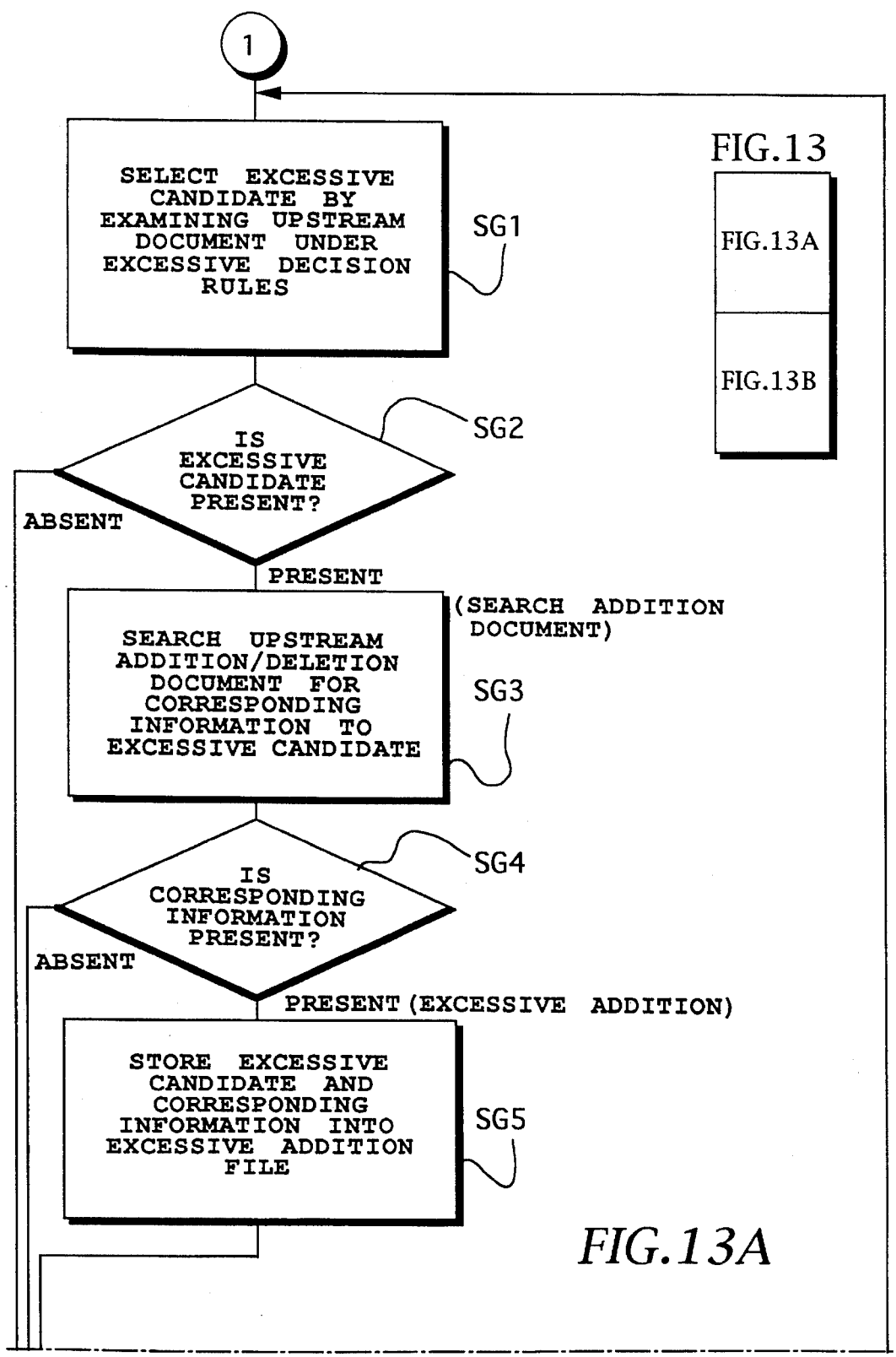
Figure 13B:
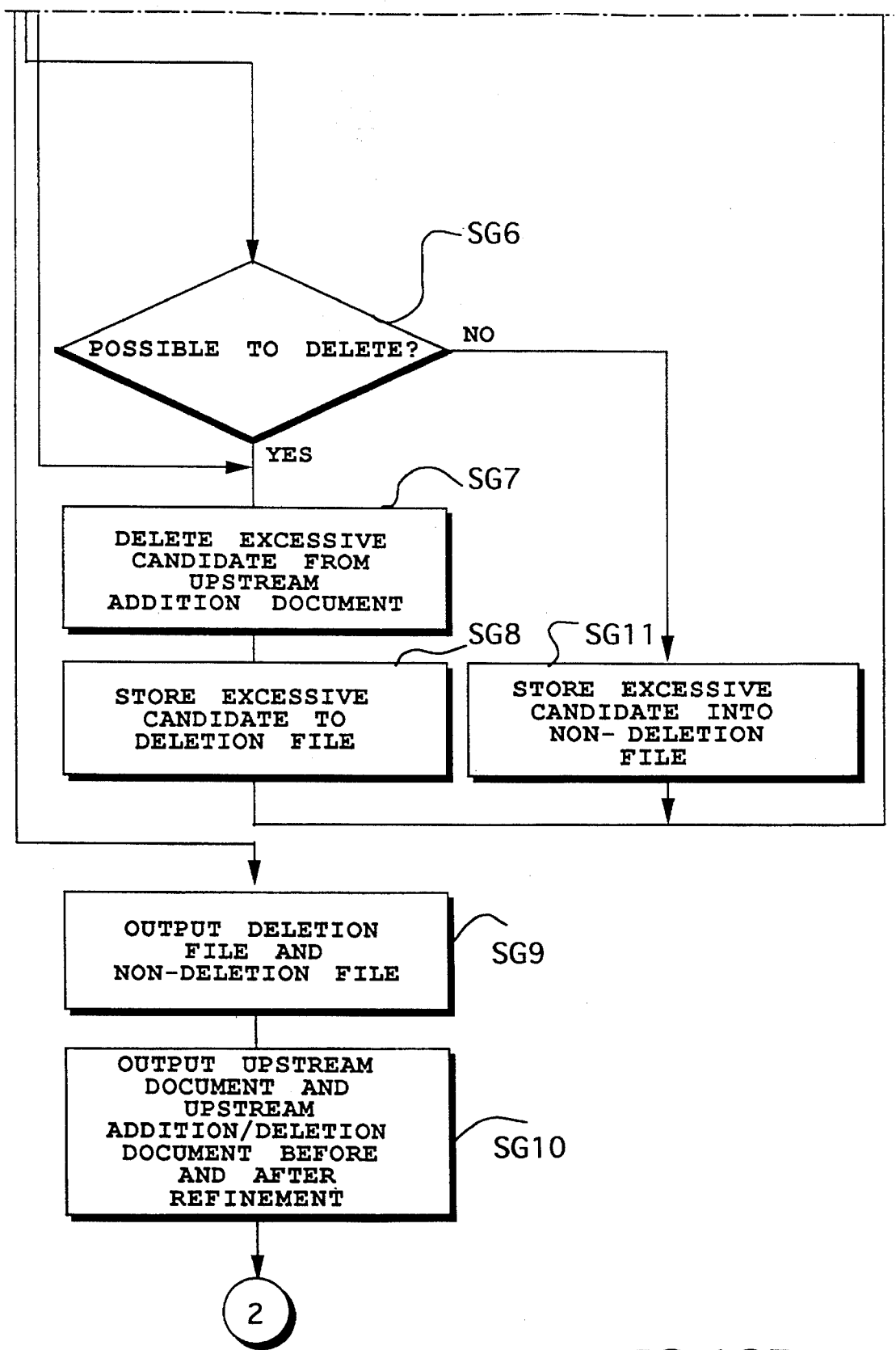

FIGS. 13A and 13B show the excessive item deletion processing, which is performed in view of the fact that the contents of low priority should be eliminated because of restriction of the volume of the upstream document. However, the deletion is easier than addition. In other words, the propriety of the deletion can be decided based on only qualifying conditions as a document. Therefore, the upstream existence repository is not searched in this case.

In FIGS. 13A and 13B, excessive candidates are selected at step SG1 by testing the upstream document in accordance with the excess decision rules. For example, if a business material for a hot water heater for domestic use contains a description of a heat exchanger, this description is selected as an excessive candidate because it will be unnecessary information for the upstream document. If an excessive candidate is present at step SG2, the upstream addition/deletion document (upstream addition document) is searched for corresponding information until no more excessive candidate is found at step SG3, and the presence and absence of the corresponding information is decided at step SG4. If the corresponding information is absent, the validity of deletion of the excessive candidate is decided at step SG6, and the excessive candidate is deleted from the upstream document at step SG7 if it is right to do so.

The corresponding information in the upstream addition document clearly indicates that the excessive candidate occurs because this corresponding information is contained in the upstream addition document. In this case, it is decided that an excessive addition has occurred, and the excessive candidate and the corresponding information are stored in the excessive addition file at step SG5. Then, the excessive candidate and the corresponding information is eliminated from the upstream addition document at step SG7.

After that, the excessive candidate is stored in the deletion file at step SG8, and the processing returns to step SG1.

If it is decided at step SG6 that the excessive candidate should not be eliminated, the excessive candidate is stored into the non-deletion file at step SG11, and the processing returns to step SG1.

If it is decided that the deletion should not be performed after testing the propriety of the deletion, the fact itself that the excessive candidate is selected under the excess decision rules is a problem. In this case, it will be necessary to review or rewrite the decision rules.

For example, such information on a new PI control system that a higher settling speed was obtained at the cost of an increase in overshoot will fall under one of the excess decision rules. Such information, however, will be needed by some users. Accordingly, the propriety of deletion should be decided case by case. In particular, if new production information must be understood by users, such information should be left undeleted.

If the excessive candidates come to an end at step SG2, the deletion file and the non-deletion file are outputted as processing results at step SG9.

Subsequently, the upstream documents and the upstream addition/deletion documents before and after the refinement are outputted at step SG10. The refinement revises the addition/deletion document, and produces information for further improving the repository. To make this clearer, the upstream documents and the upstream addition/deletion documents are outputted.

Figure 14:
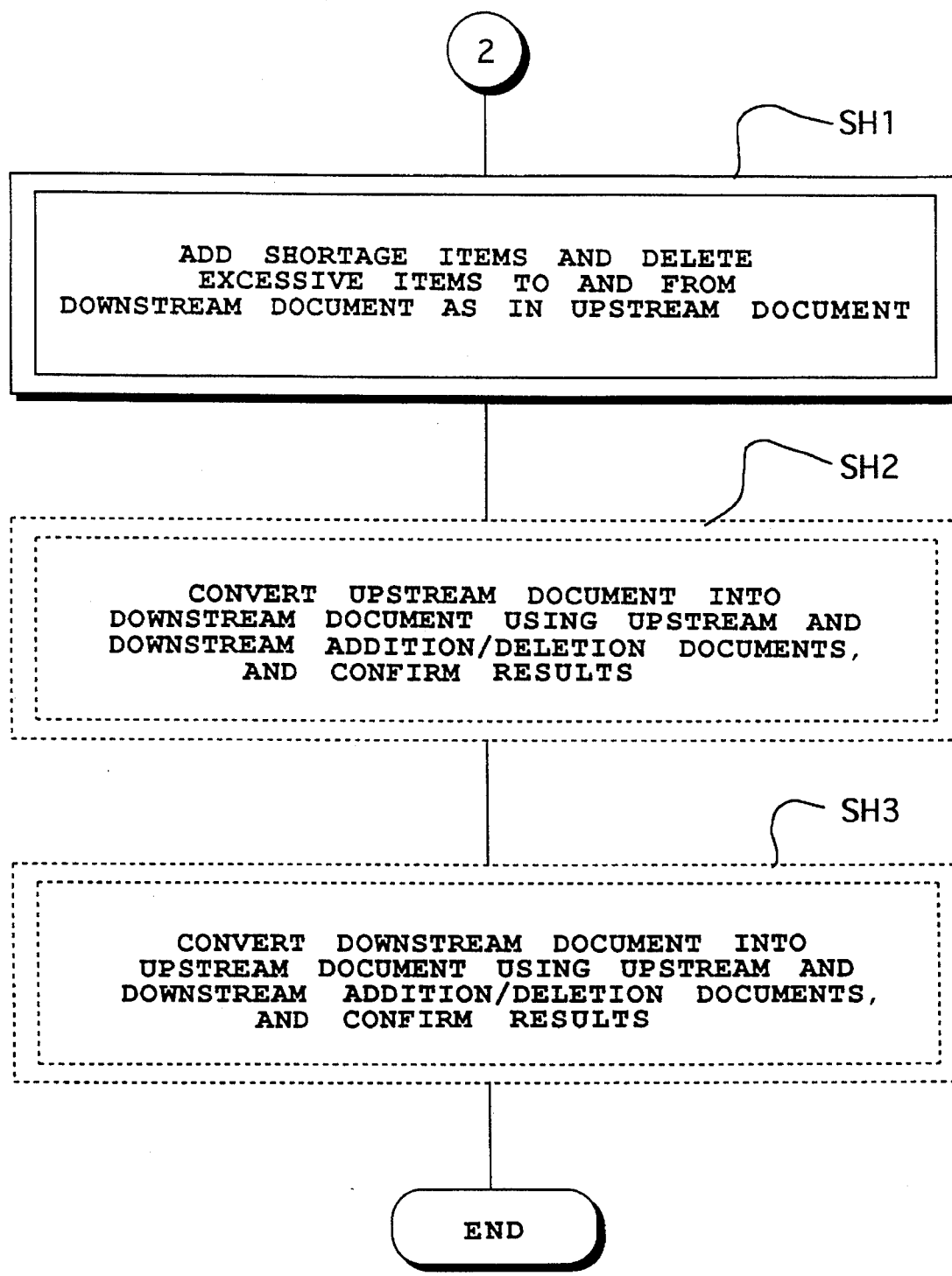

In connection with the hierarchical management of documents, the refining processing as described above is also performed on the downstream document as shown in FIG. 14. The addition of shortage items and the deletion of excessive items, to and from the downstream document, are performed at step SH1. In this way, the downstream document and the downstream addition/deletion document are refined.

After that, at step SH2, the upstream document is converted into the downstream document by the forward conversion using the upstream addition/deletion document and the downstream addition/deletion document to confirm the results of the refinement. Furthermore, at step SH3, the downstream document is converted into the upstream document by the inverse conversion using the upstream addition/ deletion document and the downstream addition/deletion document to confirm the results of the refinement.

In the processings in FIGS. 12A–14, steps SF1–SF16 correspond to the 20th aspect of the present invention, steps SF1–SF6 and SF11 correspond to the 21st aspect of the present invention, steps SF1–SF5 and SF7–SF12 correspond to the 22nd aspect of the present invention, steps SF1–SF5, SF7–SF10, and SF15 correspond to the 23rd aspect of the present invention, steps SF1–SF5, SF7, SF8, SF13, and SF14 correspond to the 24th aspect of the present invention, steps SF16, and SG1–SG9 correspond to the 25th aspect of the present invention, steps SG1–SG5, and SG7 correspond to the 26th aspect of the present invention, steps SG1–SG4 and SG6–SG8 correspond to the 27th aspect of the present invention, steps SG1–SG4, SG6 and SG11 correspond to the 28th aspect of the present invention, steps SF1–SF16 and SG1–SG11 correspond to the 29th aspect of the present invention, and step SH1 (corresponding to SF1–SF16 and SG1–SG11) correspond to the 30th aspect of the present invention.

Figure 16:
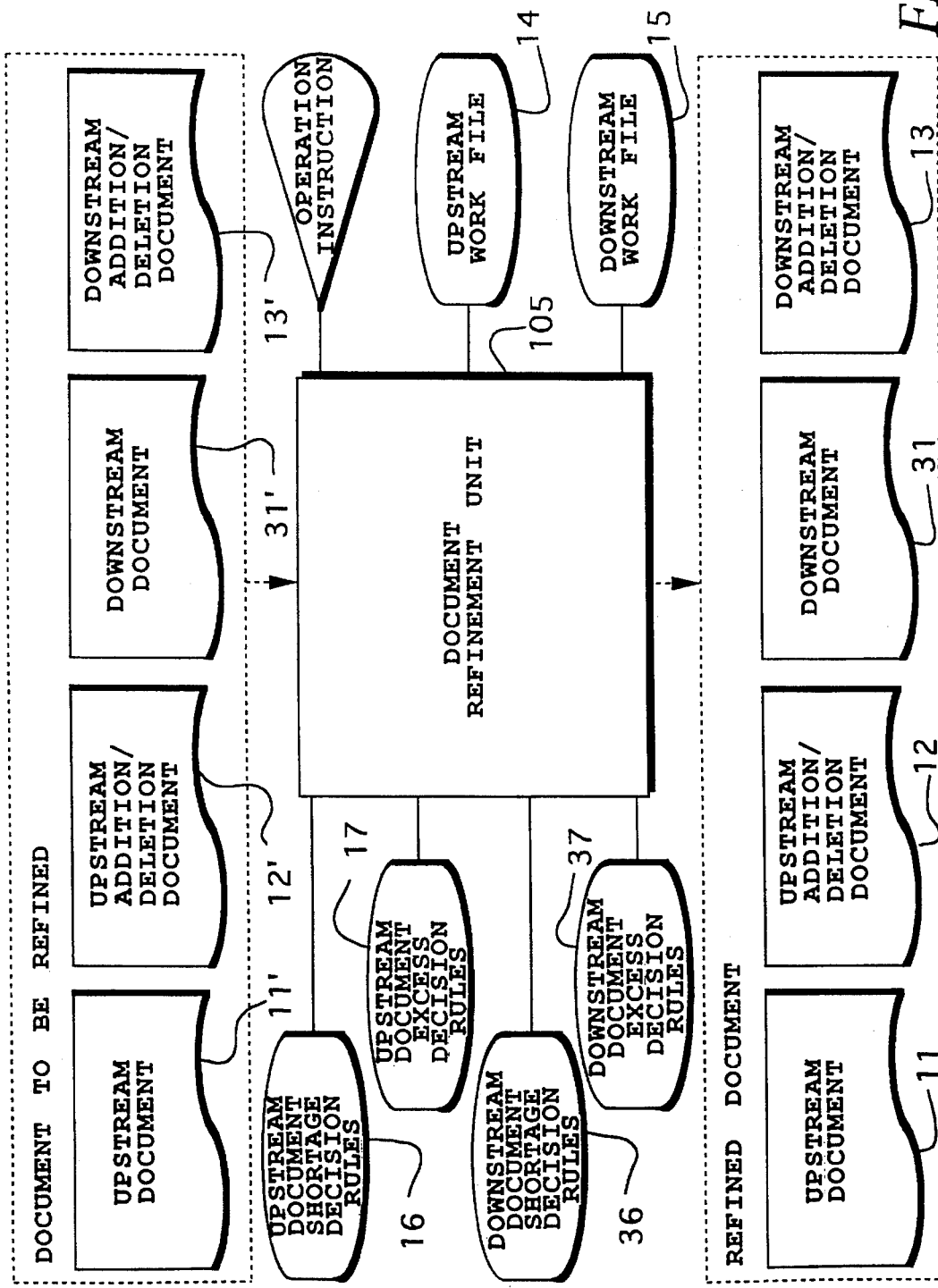
FIG. 16 is a block diagram showing a system for the fourth embodiment.

FIG. 16 shows a system for implementing the refining processing. In this figure, the reference numeral 105 designates a document refinement unit, and 11', 12', 31' and 13' designate respective documents before the refinement.

EMBODIMENT 5

Figure 17B:
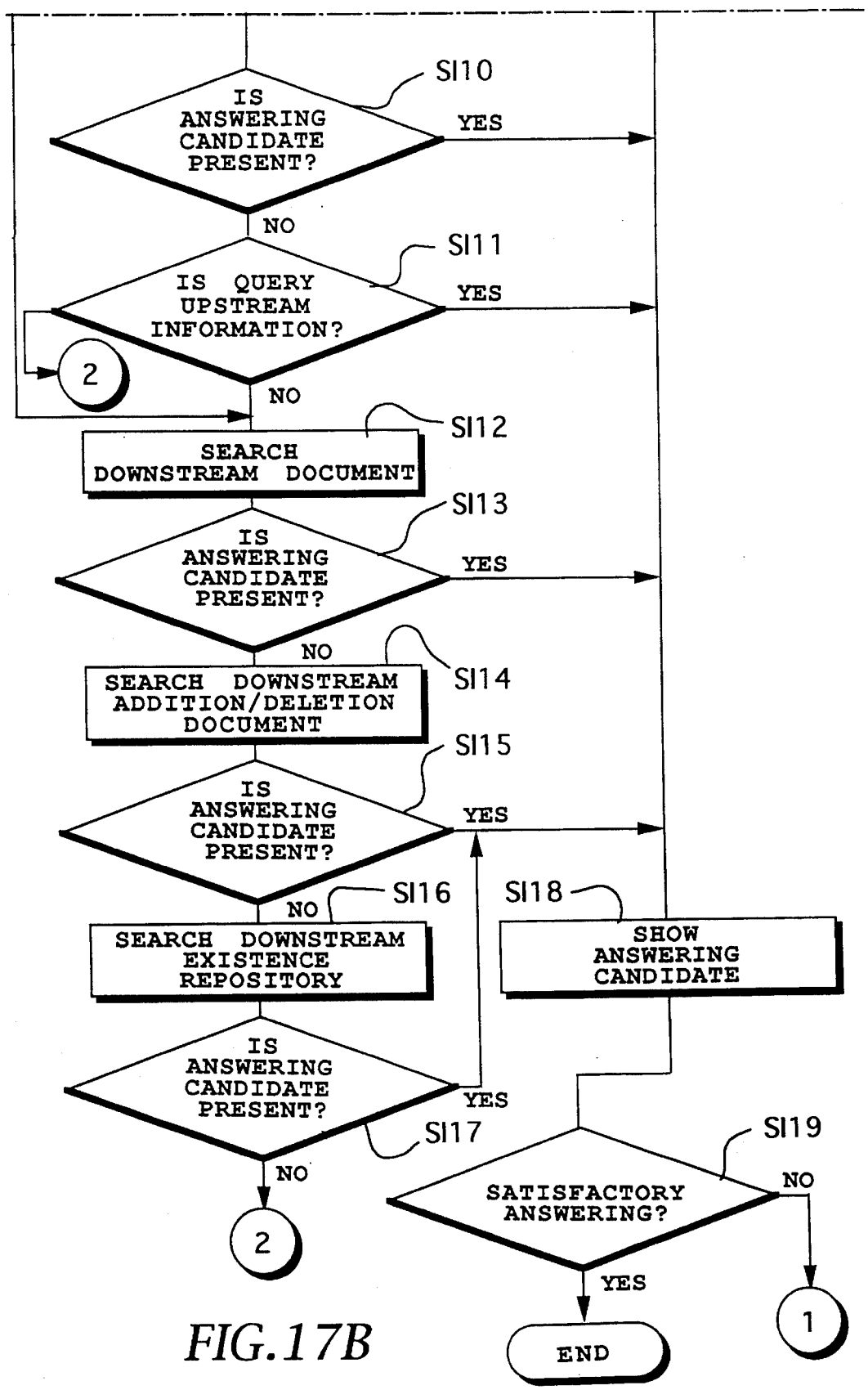

FIGS. 17A and 17B show a fifth embodiment relating to a system which obtains answers to queries about software from various information which is hierarchically managed. In other words, this embodiment provides means for making important information explicit by hierarchically managing utilization information and design information of software, so that the information can be accessed easily.

In conventional document processings, only documents that have been disclosed are circulated, and their contents may sometimes be insufficient for persons other than designers in charge. This embodiment improves a query and answering processing by making implicit information circulate, so that new information on software can be obtained.

It is natural that a conventional query and answering system cannot answer to queries of users in the form of disclosed document in some cases, because there is some information deleted from documents for users. This embodiment makes it possible to circulate such information smoothly, and store new information as a repository.

Figure 18:
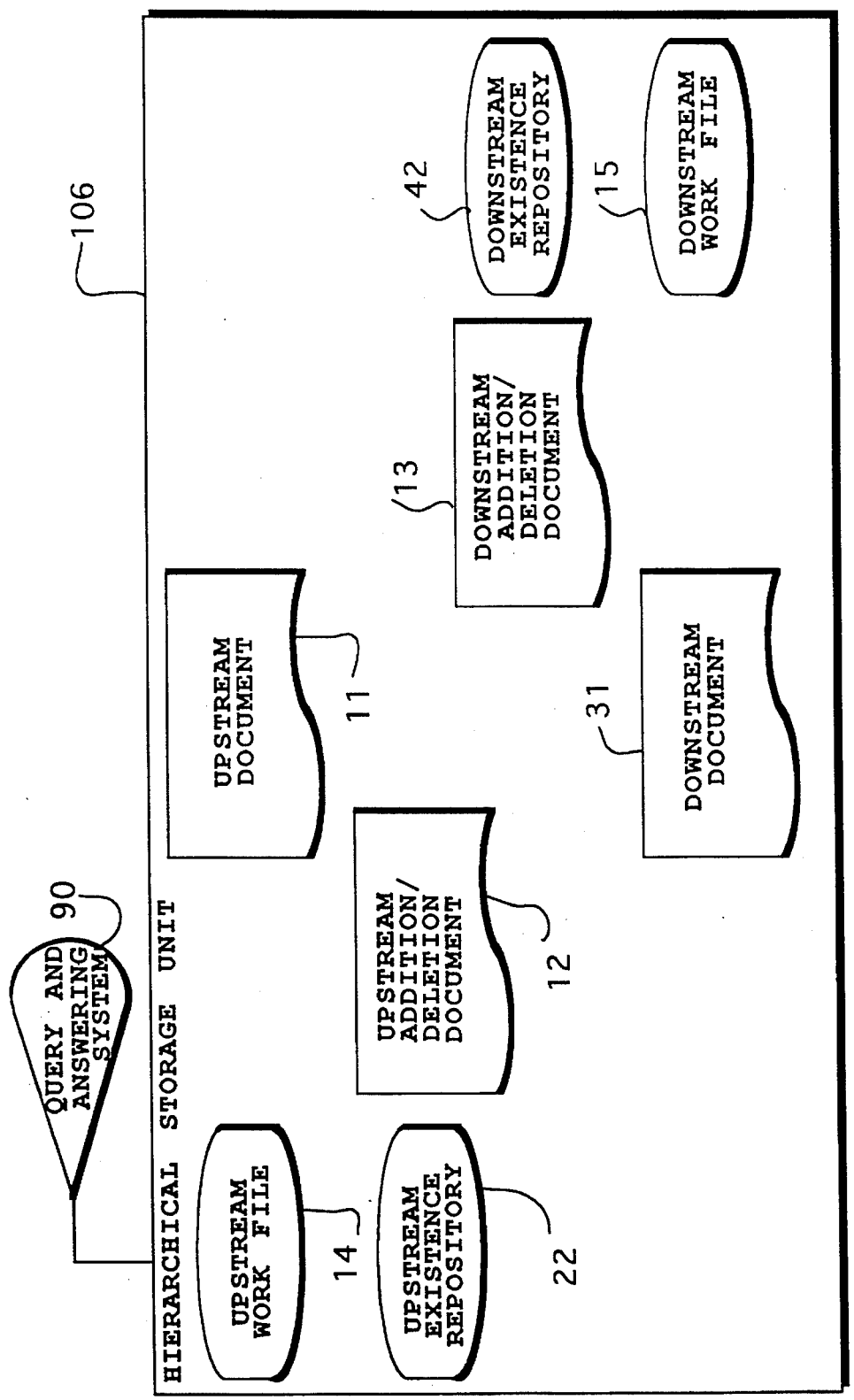
FIG. 18 is a block diagram showing a system for the fifth embodiment.
Figure 19B:
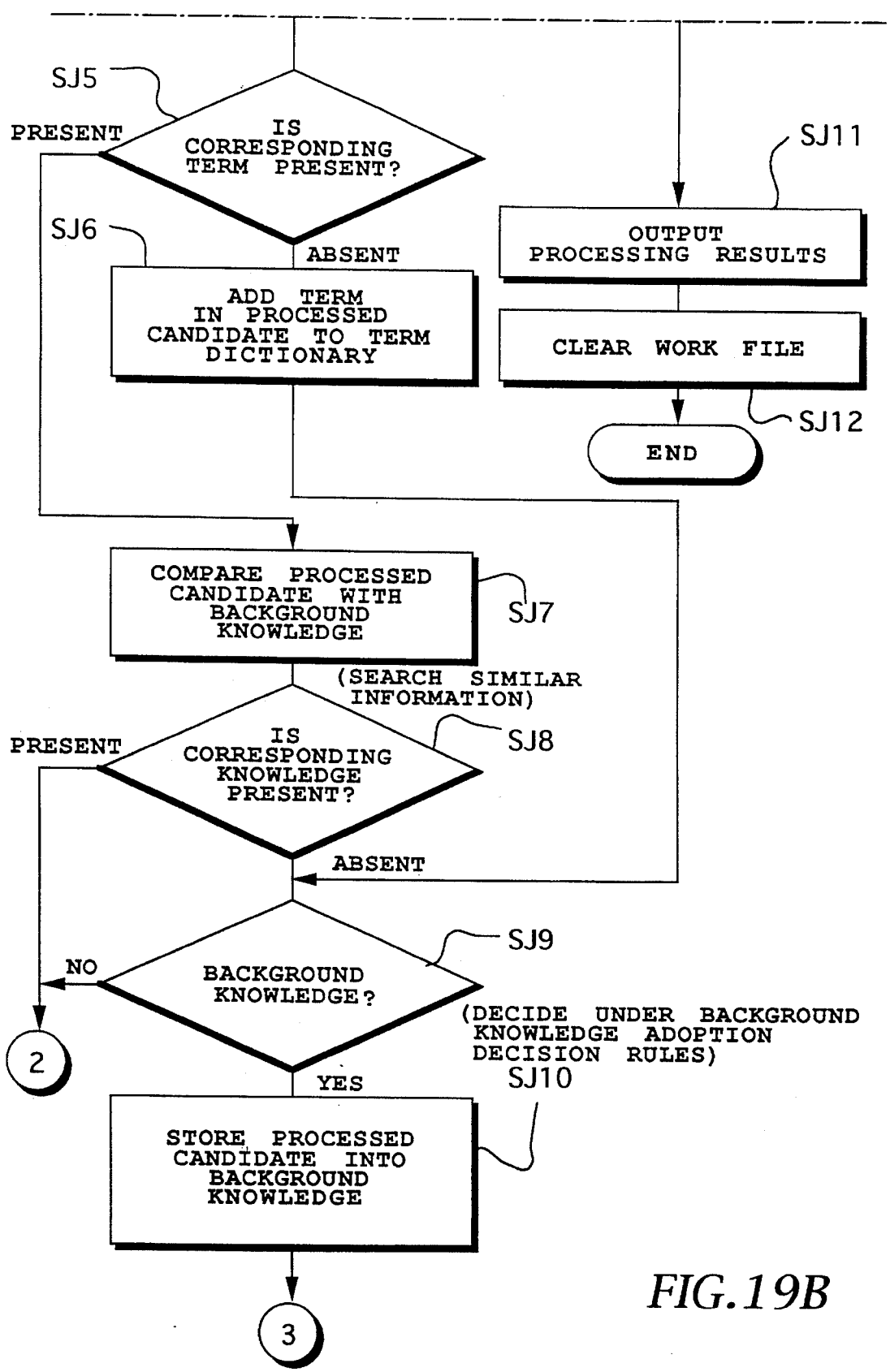
Figure 20B:
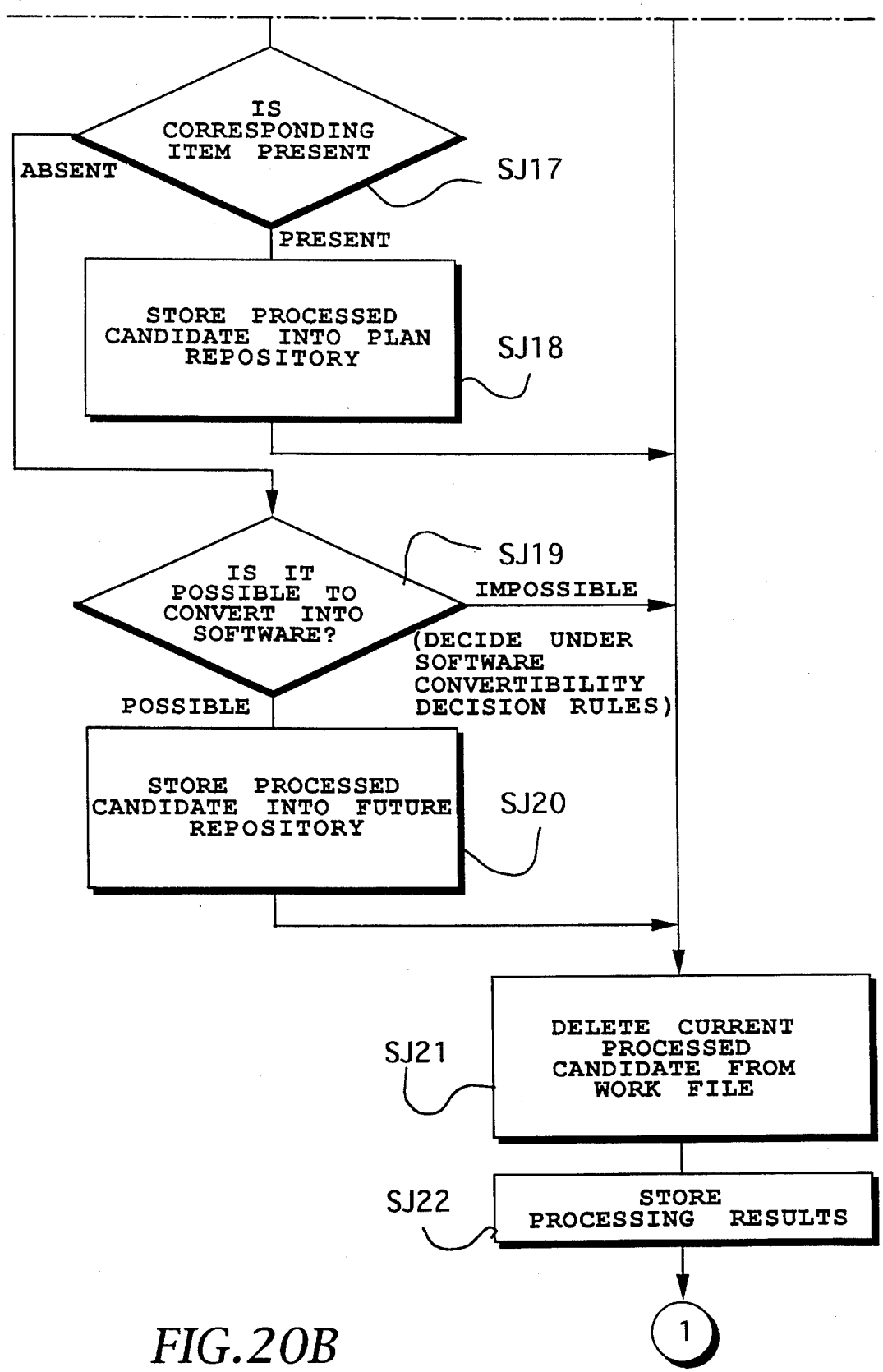

FIG. 18 shows a hierarchical storage unit 106 in a query and answering system 90 in accordance with the present invention. In this storage unit 106, the upstream document 11, the upstream addition/deletion document 12, the upstream work file 14, the upstream existence repository 22, the downstream document 31, the downstream addition/deletion document 13, the downstream work file 15, and the downstream existence repository 42 are hierarchically stored.

First, the outline of the query and answering processing in accordance with the present invention will be explained referring to FIG. 18.

(1) After classifying the input, the system performs the following processings (2)–(5) for queries about the upstream, and the following processings (6)–(9) for queries about the downstream. If it cannot be decided whether a query is about the upstream or the downstream, all the processings (2)–(9) are carried out.

(2) The system searches the upstream document 11 in accordance with the query. If an answering candidate is found, the system indicates its location.

(3) If there is no answering candidate in the upstream document 11, the system searches the upstream addition/deletion document 12. If an answering candidate is found, the system shows its contents.

(4) If there is no answering candidate in the addition/deletion document 12, the system searches the upstream existence repository 22. If the answering candidate is found, the system shows its contents and the fact that the answering candidate is absent in the current software in charge, and records them in the upstream work file 14.

(5) If there is no answering candidate in the upstream existence repository 22, the system answers this fact, and records the input or the query into the upstream work file 14.

(6) The system searches the downstream document 31 in accordance with the query. If an answering candidate is found, the system indicates its location.

(7) If there is no answering candidate in the downstream document 31, the system searches the addition/deletion document 13. If an answering candidate is found, the system shows its contents.

(8) If there is no answering candidate in the addition/deletion document 13, the system searches the downstream existence repository 42. If the answering candidate is found, the system shows its contents and the fact that the answering candidate is absent in the current software in charge, and records them in the downstream work file 15.

(9) If there is no answering candidate in the downstream existence repository 42, the system answers this fact, and records the input or the query into the downstream work file 15.

The query and answering processing is characterized in the following:

(a) The documents are hierarchically classified into the upstream information and the downstream information;

(b) The documents to be searched are classified into explicit documents such as the upstream document and downstream document, and implicit documents such as the addition/deletion documents.

(c) The repositories, which are not a document, are also included in the material to be searched.

(d) The information that cannot be answered by the query and answering processing is stored in the non-answering file for a future processing.

(e) The results of the query and answering processing are used for expanding the repository.

(f) The expansion of the repository is reflected to the document.

This system is characterized by the searching in the storage unit established in the total system, and by the utilization of the information associated with queries that cannot be answered. The query and answering processing themselves except for the part associated with the present invention is a known technique, and various methods for storing, processing and answering are provided, and hence, the description thereof are passed here.

The processing will be described in more detail referring to FIGS. 17A and 17B.

First, an query is inputted at step SI1, and is stored at step SI2. Then, the following processings are carried out until non-retrieved portion is not found any more at step SI13.

First, it is decided whether the query is associated with the downstream information or not at step SI4. If it is not associated with the downstream information, the upstream document is searched first at step SI5. If an answering candidate is found at step SI6, it is presented at step SI18, and the processing is completed if the answer is satisfactory at step SI19. If the answer is not satisfactory, the processing returns to step SI13.

If no answering candidate is found at step SI6, the upstream addition/deletion document is searched at step SI7. If an answering candidate is found at step SI8, the processing moves to step SI18.

If no answering candidate is found at step SI8, the upstream existence repository is searched at step SI9. If an answering candidate is found at step SI10, the processing is transferred to step SI18.

If no answering candidate is found at step SI10, it is checked confirmatively whether the query is associated with the upstream information at step SI11, and if so, the answering is impossible, and the history of the search is stored in the non-answering file at step SI20. Then, the processing is terminated.

If it is decided that the query is associated with the downstream information at step SI4 or SI11, the downstream document is searched at step SI12. If an answering candidate is found at step SI13, the processing proceeds to step SI18.

If no answering candidate is found at step SI13, the downstream addition/deletion document is searched at step SI14. If an answering candidate is found at step SI15, the processing is transferred to step SI18.

If no answering candidate is found at step SI15, the downstream existence repository is searched at step SI16. If an answering candidate is found at step SI17, the processing is transferred to step SI18. If no answering candidate is found at step SI17, the answering is impossible, and the history of the search is stored in the non-answering file at step SI20. Then, the processing is terminated.

The search history stored at step SI20 includes the objects (documents) searched, the fact that no answer was found, and the fact that the answer was unsatisfactory.

EMBODIMENT 6

FIGS. 19A–20B show a sixth embodiment in accordance with the present invention, which produces a repository as a resource of technical information.

This embodiment produces the repository by processing the addition/deletion document, the upstream work file, and the downstream work file, which have been prepared in the processes of the above described document processings. Here, the upstream work file refers to the deletion file, non-deletion file, addition file, non-addition file, special candidate file, document shortage file, excessive deletion file, excessive addition file and non-answered file, which store information associated with the upstream, which has issued from conversations in business activities, but has little results since. On the other hand, the downstream work file refers to those files mentioned above, which store information associated with the downstream, which has issued among engineers in a company, but has little results since.

The outline of the repository generation will be described with reference to FIG. 21.

(1) The upstream work file 14 is inputted into an upstream information characteristic extraction unit 81, which decides whether or not the upstream work file deserves the processing, under the upstream file deletion decision rules. Subsequently, the following processings are carried out. Information which deserves to be processed is handled as a processed candidate.

(2) The processed candidate is tested whether it contains new terms, and the new terms are store in a term dictionary 71 if they are present.

(3) If the processed candidate is background knowledge, it is stored in an upstream background knowledge 21. This is carried out under background knowledge adoption decision rules 74. The upstream background knowledge 21 is not information to be incorporated into software, but information used to describe a specification, such as knowledge about physics or chemistry, or general knowledge about a plant.

(4) If any processed candidate is included in the current software, it is stored into the upstream existence repository 22. As described before, the upstream existence repository 22 refers to versatile, standard documents reusable as the upstream document 11 or the upstream addition/deletion document 12.

(5) If the processed candidate is judged by software convertibility decision rules 73 that the processed candidate can be converted into software, the processed candidate is stored into an upstream plan repository 23. The upstream plan repository refers to upstream information associated with the software to be developed, and includes information, such as research data, which has high estimation accuracy.

(6) If the processed candidate will be convertible into software in future, it is stored into an upstream future repository 24. The upstream future repository 24 refers to upstream information relating to software associated with information outside the company, which information has been researched, but has only a small amount of data, and has low estimation accuracy.

(7) If the processed candidate is not applicable to any one of the above (1)–(6), this fact is recorded, and the information is deleted from the upstream work file 14.

(8) The downstream work file 15 is inputted into a downstream information characteristic extraction unit 82, which decides whether or not the downstream work file deserves the processing under the downstream file deletion decision rules. Subsequently, the above mentioned decisions and processings (2)–(7) are carried out with regard to the processed candidate.

Figure 21:
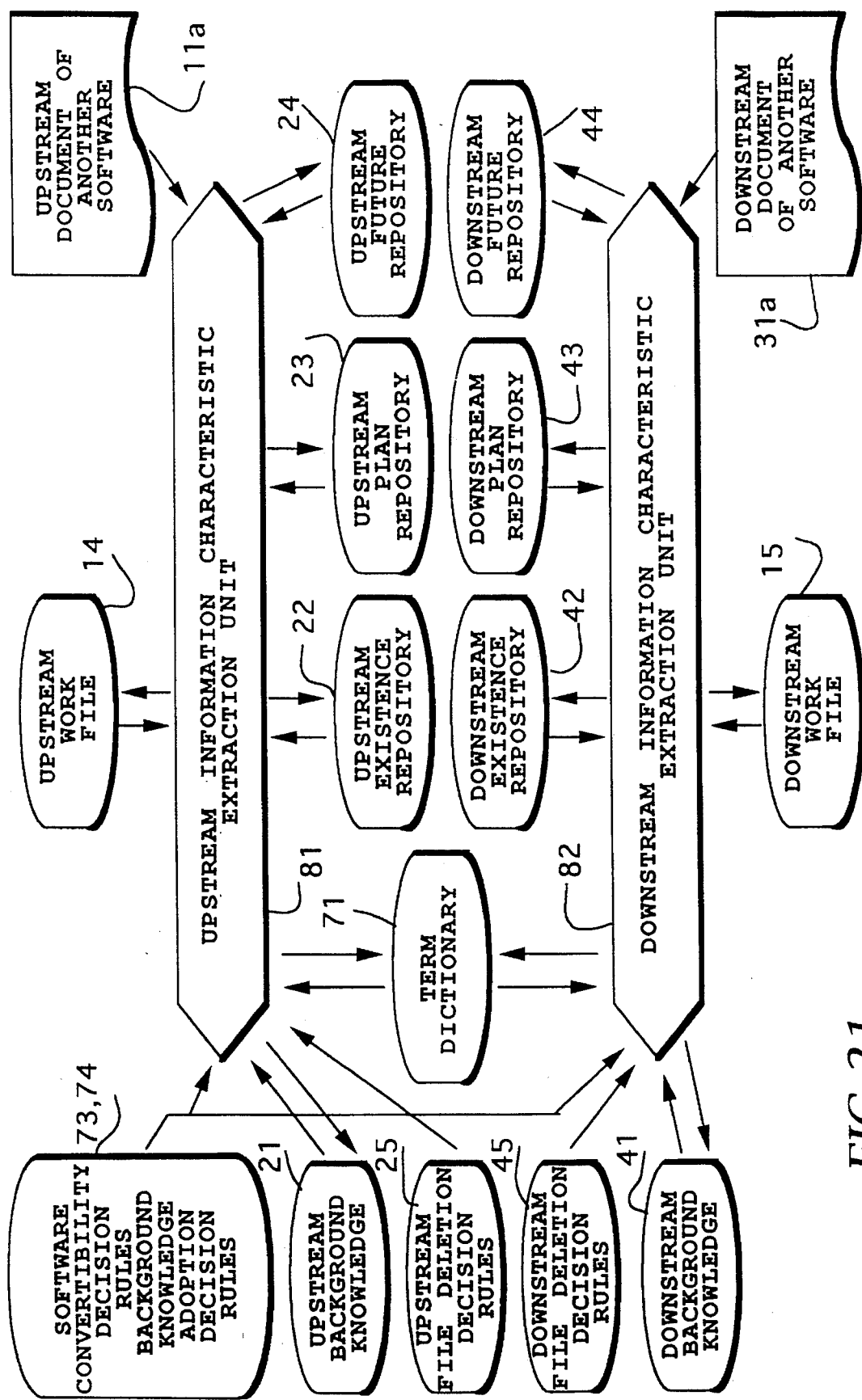
FIG. 21 is a block diagram showing a repository generation processing in the sixth embodiment.

In FIG. 21, the reference numeral 41 designates downstream background knowledge, and 42 designates a downstream existence repository, a standard, versatile document reusable as the downstream document 31 or the downstream addition/deletion document 13. The reference numeral 43 designates a downstream plan repository, that is, downstream information associated with software to be developed, which information includes research information having high estimation accuracy. The reference numeral 44 designates a downstream future repository, that is, downstream information relating to software associated with information outside the company, which information includes only a small amount of research data, and has low estimation accuracy.

In FIG. 21, an upstream document 11a and a downstream document 31a associated with another software are documents that are referred to if the processed candidate does not satisfy background knowledge adoption decision rules 74.

The repository generation procedure will be described referring to FIGS. 19A–20B.

First, the upstream work file 14 and upstream file deletion decision rules 25 are inputted into the upstream characteristic extraction unit 81 at step SJ1, so that information worthy to be examined, excluding information that may be eliminated, is extracted as a processed candidate at step SJ2. Subsequently, the following processings are carried out until no more processed candidate is found at step SJ3.

At step SJ4, terms in the processed candidate are compared with the term dictionary, and it is decided whether there is any corresponding term at step SJ5. In this case, similar information, that is, synonyms are also searched. If there is no corresponding term, the terms in the processed candidate are stored into the term dictionary to be adopted as new terms at step SJ6. If corresponding terms are found at step SJ6, the processed candidate is compared with the background knowledge at step SJ7, and if corresponding knowledge is found at step SJ8, the processing proceeds from step SJ8 to step SJ13 which will be described later.

If no corresponding knowledge is found at step SJ8, or after storing the terms in the processed candidate into the term dictionary at step SJ6, the processed candidate is decided whether or not it belongs to the background knowledge, under the background knowledge adoption decision rules at step SJ9. If the processed candidate passes this test, it is stored into the background knowledge at step SJ10, and the processing proceeds to step SJ15 which will be described later.

The decision whether or not the processed candidate is adopted as the background knowledge is carried out by eliminating new but unusable information under the decision rules. More specifically, information such as "oscillation has occurred under the PI control" is unworthy to be adopted as the background knowledge. This is because since the oscillation will occur with a particular object under a particular condition, information on a combination of the object and the condition should be stored together with the software. On the other hand, new information such as "the temperature range of a domestic hot water heater is 0–100 degrees in Celsius" is adopted as the background knowledge.

If no more processed candidate is found at step SJ3, the processing results are outputted at step SJ11, and the work files are cleared at step SJ12.

If the corresponding knowledge of the processed candidate has already been present in the background knowledge at step SJ8, or if it does not pass the test at step SJ9 even if the corresponding knowledge is absent in the background knowledge, the processed candidate is compared with the documents of another software at step SJ13 in FIG. 20A. If a corresponding item is present at step SJ14, or after the processed candidate has been stored into the background knowledge at step SJ10, the processed candidate is stored into the existence repository at step SJ15, considering the processed candidate as one generated in the existence repository. Then, the processed candidate is eliminated from the work file at step SJ21, and the processing results are stored at step SJ22. Thus, the processing returns to step SJ2.

The fact that the processed candidate is present in the work file associated with the software of interest means that the processed candidate is absent in the document of that software or is not contained in the repository. Accordingly, if the corresponding item to the processed candidate is found in another software document at step SJ14, it should be stored into the existence repository as a new expression that can be used as the repository.

If no corresponding item is found at step SJ14, the processed candidate is compared with a development plan of software at step SJ16. If any corresponding item is found at step SJ17, the processed candidate is stored into the plan repository at step SJ18, and the processing proceeds to step SJ21.

In other words, if the processed candidate is not included in the existence software, the processed candidate is compared with the software preparing plan, and is stored into the plan repository if it is within that plan so that it will be contained into the plan.

If no corresponding item is found at step SJ17, the processed candidate is decided whether it is convertible into software or not under the decision rules at step SJ19. If it is impossible, the processing proceeds to step SJ21. On the other hand, if the processed candidate is convertible into software, the processed candidate is stored into the future repository at step SJ20, and then, the processing proceeds to step SJ21.

In other words, if the processed candidate is absent in the contents of the software development plan, the convertibility of the processed candidate into software is tested, and the processed candidate is stored into the future repository as a future material if it is decided as convertible. On the other hand, if the processed candidate is decided as inconvertible into software, it may be adopted as the background knowledge if it is versatile information, but will be deleted otherwise.

In FIGS. 19A–20B, steps SJ1–SJ22 correspond to the 32nd aspect of the present invention, steps SJ1–SJ15 correspond to the 33rd, 34th and 35th aspects of the present invention, steps SJ1–SJ14 and SJ16–SJ18 correspond to the 36th aspect of the present invention, steps SJ1–SJ14, SJ16, SJ17, and SJ19 correspond to the 37th aspect of the present invention, and the processings associated with the downstream information in the downstream work file correspond to the 38th aspect of the present invention.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A two-level document processing method preparing a downstream document on the basis of an upstream document, said upstream document being a document associated with a product and placed near a user, and said downstream document being a document associated with the product and placed near a maker, said method comprising the steps of:

comparing the upstream document with an upstream deletion document including information which is particular to the upstream document and is unnecessary for the downstream document;

selecting, from the upstream document and based on results of the step of comparing, a deletion candidate to be deleted from the upstream document until no more deletion candidate is found; and preparing the downstream document by performing deletion or non-deletion of the deletion candidate from the upstream document in accordance with results of the step of selecting.

2. The two-level document processing method as claimed in claim 1, wherein said step of preparing comprises the steps of:

searching said upstream deletion document for corresponding information corresponding to the deletion candidate;

displaying, if the corresponding information is present in the upstream deletion document, the deletion candidate and the corresponding information to have approval of deletion;

deleting the deletion candidate from the upstream document if the deletion of the deletion candidate is approved; and storing the deletion candidate and the corresponding information into a deletion file.

3. The two-level document processing method as claimed in claim 1, wherein said step of preparing comprises the steps of:

searching in said upstream deletion document for corresponding information corresponding to the deletion candidate;

displaying, if the corresponding information is present in the upstream deletion document, the deletion candidate and the corresponding information to have approval of deletion;

storing the deletion candidate and the corresponding information into a non-deletion file without deleting the deletion candidate from the upstream document if the deletion of the deletion candidate is not approved.

4. The two-level document processing method as claimed in claim 1, wherein said step of preparing comprises the steps of:

searching in said upstream deletion document for corresponding information corresponding to the deletion candidate; and storing the deletion candidate into an upstream special candidate file without deleting the deletion candidate from the upstream document, if the corresponding information corresponding to the deletion candidate is absent in the upstream deletion document.

5. A two-level document processing method preparing a downstream document on the basis of an upstream document, said method comprising the steps of:

comparing the upstream document with a downstream addition document including information which is particular to the downstream document and is unnecessary for the upstream document;

selecting, from the downstream addition document and based on the results of the step of comparing, an addition candidate to be added to the upstream document until no more addition candidate is found; and preparing the downstream document by performing addition or non-addition of the addition candidate to the upstream document in accordance with results of the step of selecting.

6. The two-level document processing method as claimed in claim 5, wherein said step of preparing comprises the steps of:

searching said downstream addition document for corresponding information corresponding to the addition candidate;

displaying, if the corresponding information is present in the downstream addition document, the addition candidate and the corresponding information to have approval of addition;

adding the addition candidate to the upstream document if the addition of the addition candidate is approved; and storing the addition candidate and the corresponding information into an addition file.

7. The two-level document processing method as claimed in claim 5, wherein said step of preparing comprises the steps of:

searching said downstream addition document for corresponding information corresponding to the addition candidate;

displaying, if the corresponding information is present in the downstream addition document, the addition candidate and the corresponding information to have approval of addition; and storing the addition candidate and the corresponding information into a non-addition file without adding the addition candidate to the upstream document, if the addition of the addition candidate is not approved.

8. The two-level document processing method as claimed in claim 5, wherein said step of preparing comprises the steps of:

searching said downstream addition document for corresponding information corresponding to the addition candidate; and storing the addition candidate into a downstream special candidate file without adding the addition candidate to the upstream document, if the corresponding information corresponding to the addition candidate is absent in the downstream addition document.

9. A two-level document processing method preparing a downstream document on the basis of an upstream document, and an upstream document on the basis of a downstream document, said method comprising the steps of:

comparing the upstream document with an upstream deletion document including information which is particular to the upstream document and is unnecessary for the downstream document;

selecting, from the upstream document and based on results of the step of comparing, a deletion candidate to be deleted from the upstream document until no more deletion candidate is found;

searching said upstream deletion document for corresponding information corresponding to the deletion candidate;

displaying, if the corresponding information is present in the upstream deletion document, the deletion candidate and the corresponding information to have approval of deletion;

deleting the deletion candidate from the upstream document if the deletion of the deletion candidate is approved;

storing the deletion candidate and the corresponding information into a deletion file after the deletion of the deletion candidate;

storing the deletion candidate and the corresponding information into a non-deletion file without deleting the deletion candidate from the upstream document if the deletion of the deletion candidate is not approved;

storing the deletion candidate into an upstream special candidate file without deleting the deletion candidate from the upstream document, if the corresponding information corresponding to the deletion candidate is absent in the upstream deletion document;

comparing the upstream document with a downstream addition document including information which is particular to the downstream document and is unnecessary for the upstream document;

selecting, from the downstream addition document and based on the results of the step of comparing, an addition candidate to be added to the upstream document until no more addition candidate is found;

searching said downstream addition document for corresponding information corresponding to the addition candidate;

displaying, if the corresponding information is present in the downstream addition document, the addition candidate and the corresponding information to have approval of addition;

adding the addition candidate to the upstream document if the addition of the addition candidate is approved;

storing the addition candidate and the corresponding information into an addition file;

storing the addition candidate and the corresponding information into a non-addition file without adding the addition candidate to the upstream document, if the addition of the addition candidate is not approved;

storing the addition candidate into a downstream special candidate file without adding the addition candidate to the upstream document, if the corresponding information corresponding to the addition candidate is absent in the downstream addition document; and outputting the input upstream document and the output downstream document contrastively in order to clarify the addition and deletion portions.

10. A two-level document processing method preparing an upstream document on the basis of a downstream document, said method comprising the steps of:

comparing the downstream document with a downstream deletion document including information which is particular to the downstream document and is unnecessary for the upstream document;

selecting, from the downstream deletion document and based on results of the step of comparing, a deletion candidate to be deleted from the downstream document until no more deletion candidate is found; and preparing the upstream document by performing deletion or non-deletion of the deletion candidate from the downstream document in accordance with results of the step of selecting.

11. The two-level document processing method as claimed in claim 10, wherein said step of preparing comprises the steps of:

searching the downstream deletion document for corresponding information corresponding to the deletion candidate;

displaying, if the corresponding information is present in the downstream deletion document, the deletion candidate and the corresponding information to have approval of deletion;

deleting the deletion candidate from the downstream document if the deletion of the deletion candidate is approved; and storing the deletion candidate and the corresponding information into a deletion file.

12. The two-level document processing method as claimed in claim 10, wherein said step of preparing comprises the steps of:

searching the downstream deletion document for corresponding information corresponding to the deletion candidate;

displaying, if the corresponding information is present in the downstream deletion document, the deletion candidate and the corresponding information to have approval of deletion; and storing the deletion candidate and the corresponding information into a non-deletion file without deleting the deletion candidate from the downstream document, if the deletion of the deletion candidate is not approved.

13. The two-level document processing method as claimed in claim 10, wherein said step of preparing comprises the steps of:

searching the downstream deletion document for corresponding information corresponding to the deletion candidate; and storing the deletion candidate into a downstream special candidate file without deleting the deletion candidate from the downstream document, if the corresponding information corresponding to the deletion candidate is absent in the downstream deletion document.

14. A two-level document processing method preparing an upstream document on the basis of a downstream document, said method comprising the steps of:

comparing the downstream document with an upstream addition document including information which is particular to the upstream document and is unnecessary for the downstream document;

selecting, from the upstream addition document and based on results of the step of comparing, an addition candidate to be added to the downstream document until no more addition candidate is found; and preparing the upstream document by performing addition or non-addition of the addition candidate to the downstream document in accordance with results of the step of selecting.

15. The two-level document processing method as claimed in claim 14, wherein said step of preparing comprises the steps of:

searching the upstream addition document for corresponding information corresponding to the addition candidate;

displaying, if the corresponding information is present in the upstream addition document, the addition candidate and the corresponding information to have approval of addition;

adding the addition candidate to the downstream document if the addition of the addition candidate is approved; and storing the addition candidate and the corresponding information into an addition file.

16. The two-level document processing method as claimed in claim 14, wherein said step of preparing comprises the steps of:

searching the upstream addition document for corresponding information corresponding to the addition candidate;

displaying, if the corresponding information is present in the upstream addition document, the addition candidate and the corresponding information to have approval of addition; and storing the addition candidate and the corresponding information into a non-addition file without adding the addition candidate to the downstream document if the addition of the addition candidate is not approved.

17. The two-level document processing method as claimed in claim 14, wherein said step of preparing comprises the steps of:

searching the upstream addition document for corresponding information corresponding to the addition candidate; and storing the addition candidate into an upstream special candidate file without adding the addition candidate to the downstream document, if the corresponding information corresponding to the addition candidate is absent in the upstream addition document.

18. A two-level document processing method preparing an upstream document on the basis of a downstream document, and a downstream document on the basis of an upstream document, said method comprising the steps of:

comparing the downstream document with a downstream deletion document including information which is particular to the downstream document and is unnecessary for the upstream document;

selecting, from the downstream deletion document and based on results of the step of comparing, a deletion candidate to be deleted from the downstream document until no more deletion candidate is found;

searching the downstream deletion document for corresponding information corresponding to the deletion candidate;

displaying, if the corresponding information is present in the downstream deletion document, the deletion candidate and the corresponding information to have approval of deletion;

deleting the deletion candidate from the downstream document if the deletion of the deletion candidate is approved;

storing the deletion candidate and the corresponding information into a deletion file;

storing the deletion candidate and the corresponding information into a non-deletion file without deleting the deletion candidate from the downstream document, if the deletion of the deletion candidate is not approved;

storing the deletion candidate into a downstream special candidate file without deleting the deletion candidate from the downstream document, if the corresponding information corresponding to the deletion candidate is absent in the downstream deletion document;

comparing the downstream document with an upstream addition document including information which is particular to the upstream document and is unnecessary for the downstream document;

selecting, from the upstream addition document and based on results of the step of comparing, an addition candidate to be added to the downstream document until no more addition candidate is found;

searching the upstream addition document for corresponding information corresponding to the addition candidate;

displaying, if the corresponding information is present in the upstream addition document, the addition candidate and the corresponding information to have approval of addition;

adding the addition candidate to the downstream document if the addition of the addition candidate is approved;

storing the addition candidate and the corresponding information into an addition file;

storing the addition candidate and the corresponding information into a non-addition file without adding the addition candidate to the downstream document if the addition of the addition candidate is not approved;

storing the addition candidate into an upstream special candidate file without adding the addition candidate to the downstream document, if the corresponding information corresponding to the addition candidate is absent in the upstream addition document; and outputting the input downstream document and the output upstream document contrastively in order to clarify the addition and deletion portions.

19. A two-level document processing method comprising:

inputting an upstream document and a downstream document, comparing the upstream document with the downstream document to extract differences between the two documents;

storing information, which is present in the upstream document and absent in the downstream document, as an upstream addition/deletion document; and storing information, which is present in the downstream document and absent in the upstream document, as a downstream addition/deletion document.

20. A two-level document processing method comprising the steps of:

selecting shortage candidate from an upstream document under shortage decision rules used as a reference to decide whether some kinds of information are lacking or not;

searching an upstream addition/deletion document for corresponding information corresponding to the shortage candidate;

repeating the steps of selecting and searching until no more shortage candidate is found in said upstream document; and performing addition or non-addition of said corresponding information to said upstream document in accordance with results of the step of searching.

21. The two-level document processing method as claimed in claim 20, wherein said step of performing comprises the steps of:

storing the shortage candidate and the corresponding information into an excessive deletion file under a decision that an excessive deletion has been made if the corresponding information corresponding to the shortage candidate is present in the upstream addition/deletion document; and adding the corresponding information to the upstream document, and deleting the corresponding information from the upstream addition/deletion document.

22. The two-level document processing method as claimed in claim 20, wherein said step of performing comprises the steps of:

searching a repository for the corresponding information corresponding to the shortage candidate if the corresponding information is not present in the upstream addition/deletion document, said repository being resources of information; and adding the corresponding information to the upstream document, and storing the shortage candidate and the corresponding information to an addition file, if the corresponding information is present in the repository, and if the addition of the corresponding information is decided to be reasonable.

23. The two-level document processing method as claimed in claim 20, wherein said step of performing comprises the steps of:

searching a repository for the corresponding information corresponding to the shortage candidate if the corresponding information is not present in the upstream addition/deletion document; and storing the shortage candidate and the corresponding information into a non-addition file without adding the corresponding information to the upstream document, if the corresponding information is present in the repository, and the addition of the corresponding information is decided to be unreasonable.

24. The two-level document processing method as claimed in claim 20, wherein said step of performing comprises the steps of:

searching a repository for the corresponding information corresponding to the shortage candidate if the corresponding information is not present in the upstream addition/deletion document; and storing the shortage candidate into an upstream shortage candidate file without adding the corresponding information to the upstream document, if the corresponding information is absent in the repository.

25. A two-level document processing method comprising the steps of:

selecting an excessive candidate from an upstream document under excess decision rules used as a reference to decide whether some kinds of information are excessive or not, after no more shortage candidate is found in the upstream document under shortage decision rules;

searching an upstream addition/deletion document for corresponding information corresponding to the excessive candidate, said upstream addition/deletion document storing information which is present in the upstream document and is absent in the downstream document;

repeating the steps of selecting and searching until no more excessive candidate is found in said upstream document; and performing deletion or non-deletion of said excessive candidate to said upstream document in accordance with results of the step of searching.

26. The two-level document processing method as claimed in claim 25, wherein said performing comprises the steps of:

storing the excessive candidate and the corresponding information into an excessive addition file under a decision that an excessive addition has been made, if the corresponding information corresponding to the excessive candidate is present in the upstream addition/deletion document; and deleting the excessive candidate from the upstream document, and deleting the corresponding information from the upstream addition/deletion document.

27. The two-level document processing method as claimed in claim 25, wherein said step of performing comprises the step of:

deleting the excessive candidate from the upstream document and storing the excessive candidate into a deletion file, if the corresponding information corresponding to the excessive candidate is absent in the upstream addition/deletion document, and if the deletion of the excessive candidate is decided to be reasonable.

28. The two-level document processing method as claimed in claim 25, wherein said step of performing comprises the step of:

storing the excessive candidate into a non-deletion file without deleting the excessive candidate from the upstream document, if the corresponding information corresponding to the excessive document is absent in the upstream addition/deletion document, and the deletion of the excessive candidate is decided to be unreasonable.

29. A two-level document processing method comprising the steps of:

selecting shortage candidate from an upstream document under shortage decision rules used as a reference to decide whether some kinds of information are lacking or not;

searching an upstream addition/deletion document for corresponding information corresponding to the shortage candidate;

repeating the steps of selecting and searching until no more shortage candidate is found in said upstream document;

storing the shortage candidate and the corresponding information into an excessive deletion file under a decision that an excessive deletion has been made if the corresponding information corresponding to the shortage candidate is present in the upstream addition/deletion document;

adding the corresponding information to the upstream document, and deleting the corresponding information from the upstream addition/deletion document, searching a repository for the corresponding information corresponding to the shortage candidate if the corresponding information is not present in the upstream addition/deletion document, said repository being resources of information;

adding the corresponding information to the upstream document, and storing the shortage candidate and the corresponding information to an addition file, if the corresponding information is present in the repository, and if the addition of the corresponding information is decided to be reasonable;

storing the shortage candidate and the corresponding information into a non-addition file without adding the corresponding information to the upstream document, if the corresponding information is present in the repository, and the addition of the corresponding information is decided to be unreasonable;

storing the shortage candidate into an upstream shortage candidate file without adding the corresponding information to the upstream document, if the corresponding information is absent in the repository;

selecting an excessive candidate from an upstream document under excess decision rules used as a reference to decide whether some kinds of information are excessive or not, after no more shortage candidate is found in the upstream document under shortage decision rules;

searching an upstream addition/deletion document for corresponding information corresponding to the excessive candidate, said upstream addition/deletion document storing information which is present in the upstream document and is absent in the downstream document;

repeating the steps of selecting and searching until no more excessive candidate is found in said upstream document;

storing the excessive candidate and the corresponding information into an excessive addition file under a decision that an excessive addition has been made, if the corresponding information corresponding to the excessive candidate is present in the upstream addition/deletion document;

deleting the excessive candidate from the upstream document, and deleting the corresponding information from the upstream addition/deletion document after storing the excessive addition;

deleting the excessive candidate from the upstream document and storing the excessive candidate into a deletion file, if the corresponding information corresponding to the excessive candidate is absent in the upstream addition/deletion document, and if the deletion of the excessive candidate is decided to be reasonable;

storing the excessive candidate into a non-deletion file without deleting the excessive candidate from the upstream document, if the corresponding information corresponding to the excessive document is absent in the upstream addition/deletion document, and the deletion of the excessive candidate is decided to be unreasonable; and outputting the upstream document and the upstream addition/deletion document contrastively in order to clarity the addition and deletion portions before and after refinement.

30. A two-level document processing method comprising the steps of:

selecting shortage candidate from an downstream document under shortage decision rules used as a reference to decide whether some kinds of information are lacking or not;

searching an downstream addition/deletion document for corresponding information corresponding to the shortage candidate;

repeating the steps of selecting and searching until no more shortage candidate is found in said downstream document;

storing the shortage candidate and the corresponding information into an excessive deletion file under a decision that an excessive deletion has been made if the corresponding information corresponding to the shortage candidate is present in the downstream addition/deletion document;

adding the corresponding information to the downstream document, and deleting the corresponding information from the downstream addition/deletion document, searching a repository for the corresponding information corresponding to the shortage candidate if the corresponding information is not present in the downstream addition/deletion document, said repository being resources of information;

adding the corresponding information to the downstream document, and storing the shortage candidate and the corresponding information to an addition file, if the corresponding information is present in the repository, and if the addition of the corresponding information is decided to be reasonable;

storing the shortage candidate and the corresponding information into a non-addition file without adding the corresponding information to the downstream document, if the corresponding information is present in the repository, and the addition of the corresponding information is decided to be unreasonable;

storing the shortage candidate into an downstream shortage candidate file without adding the corresponding information to the downstream document, if the corresponding information is absent in the repository;

selecting an excessive candidate from an downstream document under excess decision rules used as a reference to decide whether some kinds of information are excessive or not, after no more shortage candidate is found in the downstream document under shortage decision rules;

searching an downstream addition/deletion document for corresponding information corresponding to the excessive candidate, said downstream addition/deletion document storing information which is present in the downstream document and is absent in the downstream document;

repeating the steps of selecting and searching until no more excessive candidate is found in said downstream document;

storing the excessive candidate and the corresponding information into an excessive addition file under a decision that an excessive addition has been made, if the corresponding information corresponding to the excessive candidate is present in the downstream addition/deletion document;

deleting the excessive candidate from the downstream document, and deleting the corresponding information from the downstream addition/deletion document after storing the excessive addition;

deleting the excessive candidate from the downstream document and storing the excessive candidate into a deletion file, if the corresponding information corresponding to the excessive candidate is absent in the downstream addition/deletion document, and if the deletion of the excessive candidate is decided to be reasonable;

storing the excessive candidate into a non-deletion file without deleting the excessive candidate from the downstream document, if the corresponding information corresponding to the excessive document is absent in the downstream addition/deletion document, and the deletion of the excessive candidate is decided to be unreasonable; and outputting the downstream document and the downstream addition/deletion document contrastively in order to clarity the addition and deletion portions before and after refinement.

31. A two-level document processing method comprising the steps of:

deciding whether a query about a product relates to upstream information or downstream information;

searching an upstream document, upstream addition/deletion document, upstream repository, downstream document, downstream addition/deletion document, and downstream repository, for an answering candidate, in accordance with results of the step of deciding until non-searched portion remains;

presenting the answering candidate if it is found; and storing an unsatisfied answering candidate, or a fact that no answering candidate is found, into a non-answering file.

32. A two-level document processing method preparing a downstream document on the basis of an upstream document, and an upstream document on the basis of a downstream document, said method comprising the steps of:

comparing the upstream document with an upstream deletion document including information which is particular to the upstream document and is unnecessary for the downstream document;

selecting, from the upstream document and based on results of the step of comparing, a deletion candidate to be deleted from the upstream document until no more deletion candidate is found;

searching said upstream deletion document for corresponding information corresponding to the deletion candidate;

displaying, if the corresponding information is present in the upstream deletion document, the deletion candidate and the corresponding information to have approval of deletion;

deleting the deletion candidate from the upstream document if the deletion of the deletion candidate is approved;

storing the deletion candidate and the corresponding information into a deletion file after the deletion of the deletion candidate;

storing the deletion candidate and the corresponding information into a non-deletion file without deleting the deletion candidate from the upstream document if the deletion of the deletion candidate is not approved;

storing the deletion candidate into an upstream special candidate file without deleting the deletion candidate from the upstream document, if the corresponding information corresponding to the deletion candidate is absent in the upstream deletion document;

comparing the upstream document with a downstream addition document including information which is particular to the downstream document and is unnecessary for the upstream document;

selecting, from the downstream addition document and based on the results of the step of comparing, an addition candidate to be added to the upstream document until no more addition candidate is found;

searching said downstream addition document for corresponding information corresponding to the addition candidate;

displaying, if the corresponding information is present in the downstream addition document, the addition candidate and the corresponding information to have approval of addition;

adding the addition candidate to the upstream document if the addition of the addition candidate is approved;

storing the addition candidate and the corresponding information into an addition file;

storing the addition candidate and the corresponding information into a non-addition file without adding the addition candidate to the upstream document, if the addition of the addition candidate is not approved;

storing the addition candidate into a downstream special candidate file without adding the addition candidate to the upstream document, if the corresponding information corresponding to the addition candidate is absent in the downstream addition document;

outputting the input upstream document and the output downstream document contrastively in order to clarify the addition and deletion portions;

comparing the downstream document with a downstream deletion document including information which is particular to the downstream document and is unnecessary for the upstream document;

selecting, from the downstream deletion document and based on results of the step of comparing, a deletion candidate to be deleted from the downstream document until no more deletion candidate is found;

searching the downstream deletion document for corresponding information corresponding to the deletion candidate;

displaying, if the corresponding information is present in the downstream deletion document, the deletion candidate and the corresponding information to have approval of deletion;

deleting the deletion candidate from the downstream document if the deletion of the deletion candidate is approved;

storing the deletion candidate and the corresponding information into a deletion file;

storing the deletion candidate and the corresponding information into a non-deletion file without deleting the deletion candidate from the downstream document, if the deletion of the deletion candidate is not approved;

storing the deletion candidate into a downstream special candidate file without deleting the deletion candidate from the downstream document, if the corresponding information corresponding to the deletion candidate is absent in the downstream deletion document;

comparing the downstream document with an upstream addition document including information which is particular to the upstream document and is unnecessary for the downstream document;

selecting, from the upstream addition document and based on results of the step of comparing, an addition candidate to be added to the downstream document until no more addition candidate is found;

searching the upstream addition document for corresponding information corresponding to the addition candidate;

displaying, if the corresponding information is present in the upstream addition document, the addition candidate and the corresponding information to have approval of addition;

adding the addition candidate to the downstream document if the addition of the addition candidate is approved;

storing the addition candidate and the corresponding information into an addition file;

storing the addition candidate and the corresponding information into a non-addition file without adding the addition candidate to the downstream document if the addition of the addition candidate is not approved;

storing the addition candidate into an upstream special candidate file without adding the addition candidate to the downstream document, if the corresponding information corresponding to the addition candidate is absent in the upstream addition document;

outputting the input downstream document and the output upstream document contrastively in order to clarify the addition and deletion portions;

selecting shortage candidate from an upstream document under shortage decision rules used as a reference to decide whether some kinds of information are lacking or not;

searching an upstream addition/deletion document for corresponding information corresponding to the shortage candidate;

repeating the steps of selecting and searching until no more shortage candidate is found in said upstream document;

storing the shortage candidate and the corresponding information into an excessive deletion file under a decision that an excessive deletion has been made if the corresponding information corresponding to the shortage candidate is present in the upstream addition/deletion document;

adding the corresponding information to the upstream document, and deleting the corresponding information from the upstream addition/deletion document, searching a repository for the corresponding information corresponding to the shortage candidate if the corresponding information is not present in the upstream addition/deletion document, said repository being resources of information;

adding the corresponding information to the upstream document, and storing the shortage candidate and the corresponding information to an addition file, if the corresponding information is present in the repository, and if the addition of the corresponding information is decided to be reasonable;

storing the shortage candidate and the corresponding information into a non-addition file without adding the corresponding information to the upstream document, if the corresponding information is present in the repository, and the addition of the corresponding information is decided to be unreasonable;

storing the shortage candidate into an upstream shortage candidate file without adding the corresponding information to the upstream document, if the corresponding information is absent in the repository;

selecting an excessive candidate from an upstream document under excess decision rules used as a reference to decide whether some kinds of information are excessive or not, after no more shortage candidate is found in the upstream document under shortage decision rules;

searching an upstream addition/deletion document for corresponding information corresponding to the excessive candidate, said upstream addition/deletion document storing information which is present in the upstream document and is absent in the downstream document;

repeating the steps of selecting and searching until no more excessive candidate is found in said upstream document;

storing the excessive candidate and the corresponding information into an excessive addition file under a decision that an excessive addition has been made, if the corresponding information corresponding to the excessive candidate is present in the upstream addition/deletion document;

deleting the excessive candidate from the upstream document, and deleting the corresponding information from the upstream addition/deletion document after storing the excessive addition;

deleting the excessive candidate from the upstream document and storing the excessive candidate into a deletion file, if the corresponding information corresponding to the excessive candidate is absent in the upstream addition/deletion document, and if the deletion of the excessive candidate is decided to be reasonable;

storing the excessive candidate into a non-deletion file without deleting the excessive candidate from the upstream document, if the corresponding information corresponding to the excessive document is absent in the upstream addition/deletion document, and the deletion of the excessive candidate is decided to be unreasonable;

outputting the upstream document and the upstream addition/deletion document contrastively in order to clarity the addition and deletion portions before and after refinement;

selecting shortage candidate from an downstream document under shortage decision rules used as a reference to decide whether some kinds of information are lacking or not;

searching an downstream addition/deletion document for corresponding information corresponding to the shortage candidate;

repeating the steps of selecting and searching until no more shortage candidate is found in said downstream document;

storing the shortage candidate and the corresponding information into an excessive deletion file under a decision that an excessive deletion has been made if the corresponding information corresponding to the shortage candidate is present in the downstream addition/deletion document;

adding the corresponding information to the downstream document, and deleting the corresponding information from the downstream addition/deletion document, searching a repository for the corresponding information corresponding to the shortage candidate if the corresponding information is not present in the downstream addition/deletion document, said repository being resources of information;

adding the corresponding information to the downstream document, and storing the shortage candidate and the corresponding information to an addition file, if the corresponding information is present in the repository, and if the addition of the corresponding information is decided to be reasonable;

storing the shortage candidate and the corresponding information into a non-addition file without adding the corresponding information to the downstream document, if the corresponding information is present in the repository, and the addition of the corresponding information is decided to be unreasonable;

storing the shortage candidate into an downstream shortage candidate file without adding the corresponding information to the downstream document, if the corresponding information is absent in the repository;

selecting an excessive candidate from an downstream document under excess decision rules used as a reference to decide whether some kinds of information are excessive or not, after no more shortage candidate is found in the downstream document under shortage decision rules;

searching an downstream addition/deletion document for corresponding information corresponding to the excessive candidate, said downstream addition/deletion document storing information which is present in the downstream document and is absent in the downstream document;

repeating the steps of selecting and searching until no more excessive candidate is found in said downstream document;

storing the excessive candidate and the corresponding information into an excessive addition file under a decision that an excessive addition has been made, if the corresponding information corresponding to the excessive candidate is present in the downstream addition/deletion document;

deleting the excessive candidate from the downstream document, and deleting the corresponding information from the downstream addition/deletion document after storing the excessive addition;

deleting the excessive candidate from the downstream document and storing the excessive candidate into a deletion file, if the corresponding information corresponding to the excessive candidate is absent in the downstream addition/deletion document, and if the deletion of the excessive candidate is decided to be reasonable;

storing the excessive candidate into a non-deletion file without deleting the excessive candidate from the downstream document, if the corresponding information corresponding to the excessive document is absent in the downstream addition/deletion document, and the deletion of the excessive candidate is decided to be unreasonable;

outputting the downstream document and the downstream addition/deletion document contrastively in order to clarity the addition and deletion portions before and after refinement;

deciding whether a query about a product relates to upstream information or downstream information;

searching an upstream document, upstream addition/deletion document, upstream repository, downstream document, downstream addition/deletion document, and downstream repository, for an answering candidate, in accordance with results of the step of deciding until non-searched portion remains;

presenting the answering candidate if it is found;

storing an unsatisfied answering candidate, or a fact that no answering candidate is found, into a non-answering file;

deciding information value of information associated with the upstream under upstream file elimination decision rules, said information associated with the upstream being stored in the deletion file, non-deletion file, addition file, non-addition file, special candidate file, document shortage file, excessive deletion file, excessive addition file, and non-answering file;

extracting valuable information as a processing candidate;

comparing the processing candidate with technical information as past results, until the last processing candidate; and storing the processing candidate into the repository in accordance with results of comparison.

33. The two-level document processing method as claimed in claim 32, further comprising the steps of:

comparing the processing candidate with a term dictionary as technical information;

adding the processing candidate to the term dictionary if a term corresponding to the processing candidate is not present in the term dictionary; and storing the processing candidate into an existence repository as another expression of existing information if a term corresponding to the processing candidate is not present in the term dictionary.

34. The two-level document processing method as claimed in claim 32, further comprising the steps of:

comparing the processing candidate with background knowledge as technical information;

deciding whether or not the processing candidate is eligible for the background knowledge under background knowledge adoption decision rules, if information corresponding to the processing candidate is not found in the background knowledge;

adding the processing candidate to the background knowledge if the processing candidate satisfies the rules; and storing the processing candidate into an existence repository as another expression of existing information if the processing candidate satisfies the rules.

35. The two-level document processing method as claimed in claim 32, further comprising the steps of:

comparing the processing candidate with an upstream document of another product as technical information; and storing the processing candidate into an existence repository as another expression of existing information, if the processing candidate has corresponding information in the upstream document of another product.

36. The two-level document processing method as claimed in claim 32, further comprising the steps of:

comparing the processing candidate with information associated with a development plan of a product; and storing the processing candidate into a plan repository as another expression of the information associated with the development plan, if the processing candidate has corresponding information in the information associated with the development plan.

37. The two-level document processing method as claimed in claim 32, further comprising the steps of:

deciding whether or not the processing candidate is eligible for future repository under producibility decision rules; and storing the processing candidate into the future repository as another expression if the processing candidate satisfies the rules.

38. A two-level document processing method preparing a downstream document on the basis of an upstream document, and an upstream document on the basis of a downstream document, said method comprising the steps of:

comparing the upstream document with an upstream deletion document including information which is particular to the upstream document and is unnecessary for the downstream document;

selecting, from the upstream document and based on results of the step of comparing, a deletion candidate to be deleted from the upstream document until no more deletion candidate is found;

searching said upstream deletion document for corresponding information corresponding to the deletion candidate;

displaying, if the corresponding information is present in the upstream deletion document, the deletion candidate and the corresponding information to have approval of deletion;

deleting the deletion candidate from the upstream document if the deletion of the deletion candidate is approved;

storing the deletion candidate and the corresponding information into a deletion file after the deletion of the deletion candidate;

storing the deletion candidate and the corresponding information into a non-deletion file without deleting the deletion candidate from the upstream document if the deletion of the deletion candidate is not approved;

storing the deletion candidate into an upstream special candidate file without deleting the deletion candidate from the upstream document, if the corresponding information corresponding to the deletion candidate is absent in the upstream deletion document;

comparing the upstream document with a downstream addition document including information which is particular to the downstream document and is unnecessary for the upstream document;

selecting, from the downstream addition document and based on the results of the step of comparing, an addition candidate to be added to the upstream document until no more addition candidate is found;

searching said downstream addition document for corresponding information corresponding to the addition candidate;

displaying, if the corresponding information is present in the downstream addition document, the addition candidate and the corresponding information to have approval of addition;

adding the addition candidate to the upstream document if the addition of the addition candidate is approved;

storing the addition candidate and the corresponding information into an addition file;

storing the addition candidate and the corresponding information into a non-addition file without adding the addition candidate to the upstream document, if the addition of the addition candidate is not approved;

storing the addition candidate into a downstream special candidate file without adding the addition candidate to the upstream document, if the corresponding information corresponding to the addition candidate is absent in the downstream addition document;

outputting the input upstream document and the output downstream document contrastively in order to clarify the addition and deletion portions;

comparing the downstream document with a downstream deletion document including information which is particular to the downstream document and is unnecessary for the upstream document;

selecting, from the downstream deletion document and based on results of the step of comparing, a deletion candidate to be deleted from the downstream document until no more deletion candidate is found;

searching the downstream deletion document for corresponding information corresponding to the deletion candidate;

displaying, if the corresponding information is present in the downstream deletion document, the deletion candidate and the corresponding information to have approval of deletion;

deleting the deletion candidate from the downstream document if the deletion of the deletion candidate is approved;

storing the deletion candidate and the corresponding information into a deletion file;

storing the deletion candidate and the corresponding information into a non-deletion file without deleting the deletion candidate from the downstream document, if the deletion of the deletion candidate is not approved;

storing the deletion candidate into a downstream special candidate file without deleting the deletion candidate from the downstream document, if the corresponding information corresponding to the deletion candidate is absent in the downstream deletion document;

comparing the downstream document with an upstream addition document including information which is particular to the upstream document and is unnecessary for the downstream document;

selecting, from the upstream addition document and based on results of the step of comparing, an addition candidate to be added to the downstream document until no more addition candidate is found;

searching the upstream addition document for corresponding information corresponding to the addition candidate;

displaying, if the corresponding information is present in the upstream addition document, the addition candidate and the corresponding information to have approval of addition;

adding the addition candidate to the downstream document if the addition of the addition candidate is approved;

storing the addition candidate and the corresponding information into an addition file;

storing the addition candidate and the corresponding information into a non-addition file without adding the addition candidate to the downstream document if the addition of the addition candidate is not approved;

storing the addition candidate into an upstream special candidate file without adding the addition candidate to the downstream document, if the corresponding information corresponding to the addition candidate is absent in the upstream addition document;

outputting the input downstream document and the output upstream document contrastively in order to clarify the addition and deletion portions;

selecting shortage candidate from an upstream document under shortage decision rules used as a reference to decide whether some kinds of information are lacking or not;

searching an upstream addition/deletion document for corresponding information corresponding to the shortage candidate;

repeating the steps of selecting and searching until no more shortage candidate is found in said upstream document;

storing the shortage candidate and the corresponding information into an excessive deletion file under a decision that an excessive deletion has been made if the corresponding information corresponding to the shortage candidate is present in the upstream addition/deletion document;

adding the corresponding information to the upstream document, and deleting the corresponding information from the upstream addition/deletion document, searching a repository for the corresponding information corresponding to the shortage candidate if the corresponding information is not present in the upstream addition/deletion document, said repository being resources of information;

adding the corresponding information to the upstream document, and storing the shortage candidate and the corresponding information to an addition file, if the corresponding information is present in the repository, and if the addition of the corresponding information is decided to be reasonable;

storing the shortage candidate and the corresponding information into a non-addition file without adding the corresponding information to the upstream document, if the corresponding information is present in the repository, and the addition of the corresponding information is decided to be unreasonable;

storing the shortage candidate into an upstream shortage candidate file without adding the corresponding information to the upstream document, if the corresponding information is absent in the repository;

selecting an excessive candidate from an upstream document under excessive decision rules used as a reference to decide whether some kinds of information are excessive or not, after no more shortage candidate is found in the upstream document under shortage decision rules;

searching an upstream addition/deletion document for corresponding information corresponding to the excessive candidate, said upstream addition/deletion document storing information which is present in the upstream document and is absent in the downstream document;

repeating the steps of selecting and searching until no more excessive candidate is found in said upstream document;

storing the excessive candidate and the corresponding information into an excessive addition file under a decision that an excessive addition has been made, if the corresponding information corresponding to the excessive candidate is present in the upstream addition/deletion document;

deleting the excessive candidate from the upstream document, and deleting the corresponding information from the upstream addition/deletion document after storing the excessive addition;

deleting the excessive candidate from the upstream document and storing the excessive candidate into a deletion file, if the corresponding information corresponding to the excessive candidate is absent in the upstream addition/deletion document, and if the deletion of the excessive candidate is decided to be reasonable;

storing the excessive candidate into a non-deletion file without deleting the excessive candidate from the upstream document, if the corresponding information corresponding to the excessive document is absent in the upstream addition/deletion document, and the deletion of the excessive candidate is decided to be unreasonable;

outputting the upstream document and the upstream addition/deletion document contrastively in order to clarity the addition and deletion portions before and after refinement;

selecting shortage candidate from an downstream document under shortage decision rules used as a reference to decide whether some kinds of information are lacking or not;

searching an downstream addition/deletion document for corresponding information corresponding to the shortage candidate;

repeating the steps of selecting and searching until no more shortage candidate is found in said downstream document;

storing the shortage candidate and the corresponding information into an excessive deletion file under a decision that an excessive deletion has been made if the corresponding information corresponding to the shortage candidate is present in the downstream addition/deletion document;

adding the corresponding information to the downstream document, and deleting the corresponding information from the downstream addition/deletion document, searching a repository for the corresponding information corresponding to the shortage candidate if the corresponding information is not present in the downstream addition/deletion document, said repository being resources of information;

adding the corresponding information to the downstream document, and storing the shortage candidate and the corresponding information to an addition file, if the corresponding information is present in the repository, and if the addition of the corresponding information is decided to be reasonable;

storing the shortage candidate and the corresponding information into a non-addition file without adding the corresponding information to the downstream document, if the corresponding information is present in the repository, and the addition of the corresponding information is decided to be unreasonable;

storing the shortage candidate into an downstream shortage candidate file without adding the corresponding information to the downstream document, if the corresponding information is absent in the repository;

selecting an excessive candidate from an downstream document under excessive decision rules used as a reference to decide whether some kinds of information are excessive or not, after no more shortage candidate is found in the downstream document under shortage decision rules;

searching an downstream addition/deletion document for corresponding information corresponding to the excessive candidate, said downstream addition/deletion document storing information which is present in the downstream document and is absent in the downstream document;

repeating the steps of selecting and searching until no more excessive candidate is found in said downstream document;

storing the excessive candidate and the corresponding information into an excessive addition file under a decision that an excessive addition has been made, if the corresponding information corresponding to the excessive candidate is present in the downstream addition/deletion document;

deleting the excessive candidate from the downstream document, and deleting the corresponding information from the downstream addition/deletion document after storing the excessive addition;

deleting the excessive candidate from the downstream document and storing the excessive candidate into a deletion file, if the corresponding information corresponding to the excessive candidate is absent in the downstream addition/deletion document, and if the deletion of the excessive candidate is decided to be reasonable;

storing the excessive candidate into a non-deletion file without deleting the excessive candidate from the downstream document, if the corresponding information corresponding to the excessive document is absent in the downstream addition/deletion document, and the deletion of the excessive candidate is decided to be unreasonable;

outputting the downstream document and the downstream addition/deletion document contrastively in order to clarity the addition and deletion portions before and after refinement;

deciding whether a query about a product relates to upstream information or downstream information;

searching an upstream document, upstream addition/deletion document, upstream repository, downstream document, downstream addition/deletion document, and downstream repository, for an answering candidate, in accordance with results of the step of deciding until non-searched portion remains;

presenting the answering candidate if it is found;

storing an unsatisfied answering candidate, or a fact that no answering candidate is found, into a non-answering file;

deciding information value of information associated with the downstream, said information associated with the downstream being stored in the deletion file, non-deletion file, addition file, non-addition file, special candidate file, document shortage file, excessive deletion file, excessive addition file, and non-answering file;

extracting valuable information as a processing candidate;

comparing the processing candidate with technical information as past results, until the last processing candidate;

storing the processing candidate into the repository in accordance with results of comparison;

comparing the processing candidate with a term dictionary as technical information;

adding the processing candidate to the term dictionary if a term corresponding to the processing candidate is not present in the term dictionary;

storing the processing candidate into an existence repository as another expression of existing information if a term corresponding to the processing candidate is not present in the term dictionary;

comparing the processing candidate with background knowledge as technical information;

deciding whether or not the processing candidate is eligible for the background knowledge under background knowledge adoption decision rules, if information corresponding to the processing candidate is not found in the background knowledge;

adding the processing candidate to the background knowledge if the processing candidate satisfies the rules;

storing the processing candidate into an existence repository as another expression of existing information if the processing candidate satisfies the rules;

comparing the processing candidate with a downstream document of another product as technical information;

storing the processing candidate into an existence repository as another expression of existing information, if the processing candidate has corresponding information in the downstream document of another product;

comparing the processing candidate with information associated with a development plan of a product;

storing the processing candidate into a plan repository as another expression of the information associated with the development plan, if the processing candidate has corresponding information in the information associated with the development plan;

deciding whether or not the processing candidate is eligible for future repository under producibility decision rules; and storing the processing candidate into the future repository as another expression if the processing candidate satisfies the rules.

* * * * *